(12) United States Patent
Raab

(10) Patent No.: US 11,675,924 B2
(45) Date of Patent: Jun. 13, 2023

(54) CONTENT AGGREGATION SYSTEM FOR INTELLIGENT SEARCHING OF INDEXED CONTENT BASED ON EXTRACTED SECURITY IDENTIFIERS

(71) Applicant: SquelchAI, LLC, Orem, UT (US)

(72) Inventor: Ilan Raab, Redwood City, CA (US)

(*) Notice: Subject to any disclaimer, the term of this patent is extended or adjusted under 35 U.S.C. 154(b) by 169 days.

(21) Appl. No.: 16/886,719

(22) Filed: May 28, 2020

(65) Prior Publication Data

US 2020/0380157 A1 Dec. 3, 2020

Related U.S. Application Data

(60) Provisional application No. 62/853,623, filed on May 28, 2019.

(51) Int. Cl.
| | |
|---|---|
| *G06F 16/00* | (2019.01) |
| *G06F 21/62* | (2013.01) |
| *G06N 20/00* | (2019.01) |
| *G06F 21/10* | (2013.01) |
| *G06F 21/41* | (2013.01) |
| *G06F 16/951* | (2019.01) |
| *G06F 16/25* | (2019.01) |
| *G06F 16/22* | (2019.01) |

(52) U.S. Cl.
CPC ...... *G06F 21/6227* (2013.01); *G06F 16/2228* (2019.01); *G06F 16/258* (2019.01); *G06F 16/951* (2019.01); *G06F 21/105* (2013.01); *G06F 21/41* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,129,227 | B1* | 9/2015 | Yee | G06N 3/0472 |
| 9,294,485 | B2* | 3/2016 | Allain | H04L 63/104 |
| 9,576,029 | B2* | 2/2017 | Berkhim | G06F 16/24578 |
| 10,043,025 | B2* | 8/2018 | Ibel | H04L 63/102 |
| 2013/0326640 | A1* | 12/2013 | Nun | H04L 63/105 |
| | | | | 726/30 |

(Continued)

*Primary Examiner* — Jean M Corrielus
(74) *Attorney, Agent, or Firm* — Hamilton, Brook, Smith & Reynolds, P.C.

(57) ABSTRACT

Systems and methods are provided for a content aggregation system for intelligent searching of indexed content based on extracted security identifiers. An example method includes obtaining content items from content providers based on authorization information associated with one or more users. Collectors are configured to transform content items into articles representing a normalized form associated with a content item. The method includes obtaining a plurality of articles and storing them in one or more databases. The method includes assigning security identifiers to the articles. A security identifier represents an abstraction of a discrete access right or permission associated with user access to an article. The method includes generating respective indexing messages for execution. The indexing messages are included in a queue and each indexing message includes a reference to an article. A method includes indexing the articles referenced in the indexing messages to enable searching of the indexed articles.

20 Claims, 35 Drawing Sheets

(56) References Cited

U.S. PATENT DOCUMENTS

| | | | | |
|---|---|---|---|---|
| 2014/0108393 A1* | 4/2014 | Angwin | ................ | G06Q 50/01 |
| | | | | 707/731 |
| 2014/0330857 A1* | 11/2014 | Hunter | ................ | G06F 16/951 |
| | | | | 707/767 |
| 2014/0365555 A1* | 12/2014 | Jwalanna | ................ | H04L 67/01 |
| | | | | 709/203 |
| 2015/0112995 A1* | 4/2015 | Elyada | ................ | G06Q 10/103 |
| | | | | 707/738 |
| 2016/0150038 A1* | 5/2016 | Sacheti | ................ | H04L 67/025 |
| | | | | 709/224 |
| 2019/0102372 A1* | 4/2019 | Hailpern | ............... | G06F 40/103 |
| 2020/0293669 A1* | 9/2020 | Wetherall | ............. | G06F 21/604 |

* cited by examiner

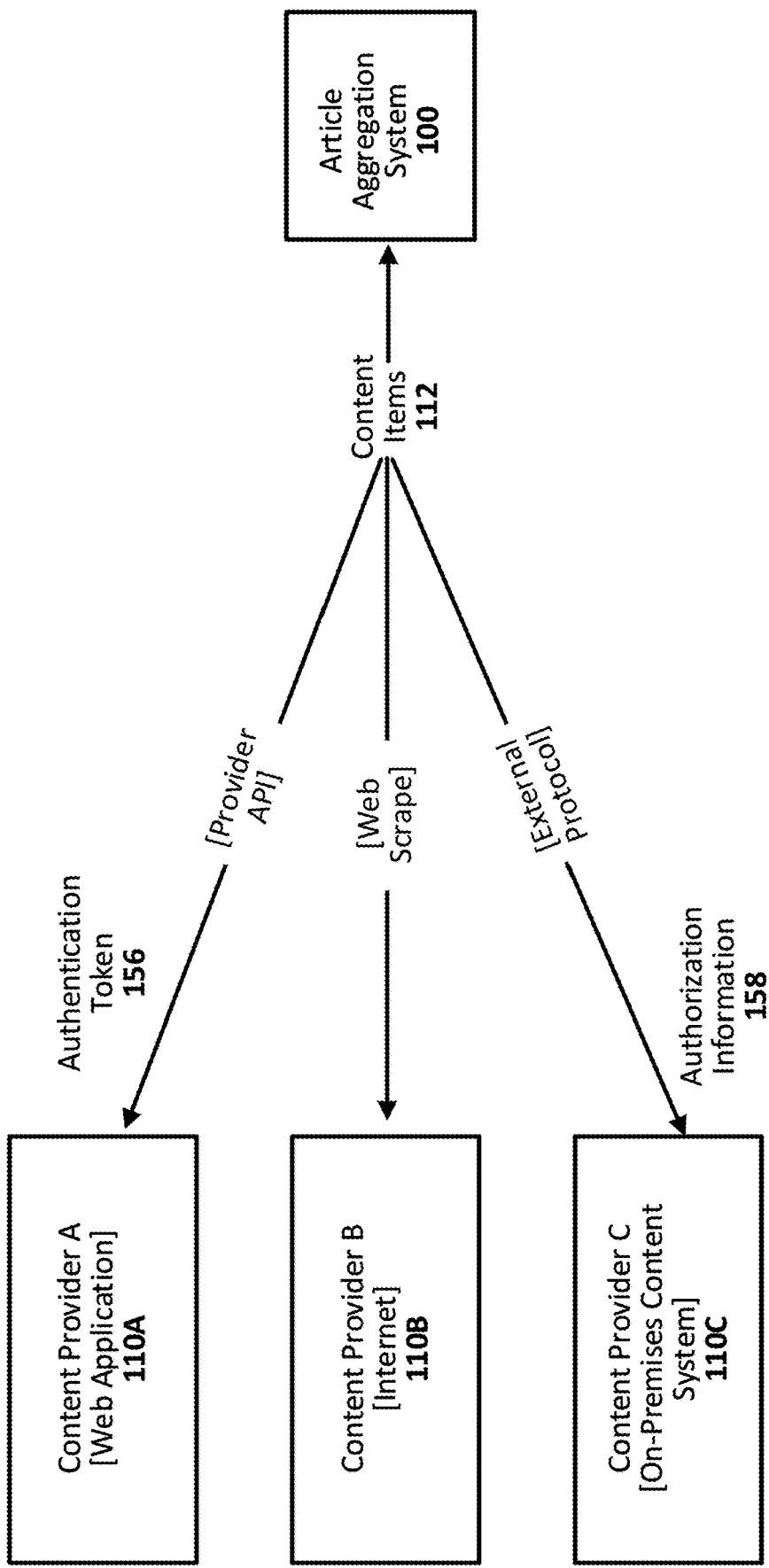

CONTENT AGGREGATION SYSTEM FOR INTELLIGENT SEARCHING OF INDEXED CONTENT BASED ON EXTRACTED SECURITY IDENTIFIERS

CROSS-REFERENCE TO RELATED APPLICATION

This application claims the benefit of U.S. Provisional Patent Application No. 62/853,623 entitled "CONTENT AGGREGATION SYSTEM FOR INTELLIGENT SEARCHING OF INDEXED CONTENT BASED ON EXTRACTED SECURITY IDS" and filed on May 28, 2019 for Ilan Raab, which is incorporated herein by reference in its entirety for all purposes.

TECHNICAL FIELD

The present disclosure relates to systems and techniques for indexing of content. More specifically, this disclosure relates to techniques for the indexing of content aggregated from different content providers.

BACKGROUND

With the proliferation of applications, such as mobile or web applications, people are increasingly relying upon a plethora of applications in their day to day lives. Indeed, a person may use different applications during his/her workday with each application being assigned for use with some aspect of the person's work. An entity, such as a business, may provide these applications to their employees. It is to be appreciated that each application may include functionality to create, store, modify, and/or share, content. Example content may include files, images, support tickets, notes, videos, bug tracking reports, and so on. This content may be stored according to a format unique to the application. Additionally, certain applications may cause the content to be stored in external servers which are used by publishers of the applications.

As an example, a first application may provide a front-end interface for the use of email. An entity may leverage a third-party email service or may operate their own email server. In some cases, the entity may use both a third-party email service and their own server. Therefore, certain emails may be stored by servers operated by the third-party email service while certain other emails may be stored via the entity's email server. However, while email may be a commonplace communication technique, there are an increasing number of additional communication tools which are being leveraged.

For example, a second application may provide for more team-based, and casual, communication. In this example, users of the second application may share content with other users, such as messages, audio, images, video, and so on. The second application may provide for communication via different channels to which users may join or subscribe. This sharing of content may be performed between users in a more continual manner as compared to emails. In this way, the second application may provide for communication between users which is more akin to chatting as compared to email. All content which is shared by users via the second application may be stored in external servers by a publisher of the second application.

Additional applications may provide for file storage, issue-tracking, and so on. For example, an entity may use a third application for cloud-storage purposes. In this example, employees may use the third application for rapid access to, and sharing of, content. As another example, a development team may rely upon an issue-tracking application to track bugs with respect to software being developed. Developers included in the development team may use the application to record information regarding specific bugs. These bugs may then be resolved by the team. Similar to the above, a publisher of the issue-tracking application may store the recorded information in servers external to the development team. In this way, the development team may be able to view the specified bugs through a web interface or via a mobile application.

In the examples described above, it may be appreciated that content created by application users may therefore be spread throughout different external servers. The content may additionally be inaccessible to users outside of using the different applications. This may present technological challenges to users.

SUMMARY OF CERTAIN EMBODIMENTS

Particular embodiments of the subject matter described in this specification can be implemented so as to realize one or more of the following advantages. A system described herein can integrate with a multitude of content providers and securely index all stored content items associated with a multitude of users. As will be described, a user of the system may provide a search query to the system. The system may then identify content items responsive to the search query. Advantageously, the identified content items may have been stored by any of the multitude of content providers. Additionally, the system may enforce user access rights associated with the content items. Thus, the identified content items may be assured to be authorized for access by the querying user. For example, the querying user may have created one or more of the content items, been shared one or more of the content items, and so on.

In this way, the system may provide a holistic viewpoint into all content which the user is authorized to access. The user may therefore rapidly surface any content items, such as files, images, videos, messages, emails, and so on, regardless of the content platform, mobile application, web application, and so on, which was used for the content's creation.

As will be described, the system may, as an example, provide a software as a service (SaaS) platform which easily integrates with content providers and provides a single front-end interface into all content items which have been created, stored, modified, shared, by the content providers. As described above, the system may additionally extract all access and/or authorization rights associated with the content items. Therefore, user access to specific content items may be constrained in a manner at least as secure as that of the content providers themselves.

A content provider may, as an example, include a publisher or developer of software (e.g., a cloud-based platform, mobile or desktop application, and so on). Via the software, content items may be provided by users or otherwise obtained based on one or more actions of users. An example content provider may include a cloud-storage provider (e.g., GOOGLE). Another example content provider may include a developer of a team communication tool (e.g., SLACK). Another example content provider may include a developer of an issue-tracking tool (e.g., JIRA, ZENDESK). Another example content provider may include a developer of a music generation tool. Further examples are described below; however, it may be appreciated that a content provider is to be construed broadly. Thus, in some embodiments any system which enables network access to stored content items may fall within the scope of the disclosure described herein.

The above-described example content providers may store content which is uploaded, created, shared and/or generated in response to an action, by users of the content providers. With respect to the cloud-storage provider, users may cause the provider to store arbitrary files. With respect to the team communication tool, the associated content provider may store messages, images, video, hashtags, and so on, which are provided by users of the tool. With respect to the issue-tracking tool, the associated content provider may store bug reports, customer support tickets, and so on, which are generated by users. Similarly, the developer of the music generation tool may store musical notations, instrument selections, audio generated by the tool, and so on.

It may be appreciated that each content provider may be associated with one or more front-end interfaces which enable this storage of content. For example, a content provider may develop one or more applications for use by users. An application may include a mobile application, for example an application (e.g., an 'app') obtained via an online application store. An application may also include a web application, for example an application accessible via a web interface. With respect to the team communication tool, a mobile or desktop application may be used by users to communicate with other users. Additionally, a web application may be accessed by users using a browser. Since the developer of the tool may store messages communicated between users, a user may rapidly switch between the web application, mobile application, and/or desktop application, and access all of their communications.

A user may use these front-end interfaces to access a multitude of content providers in their daily routine. For example, a user may use a cloud-storage provider to obtain content items shared by other users. Thus, a team of users may readily share files, such as large files, amongst themselves. As another example, the user may then transition to a team communication tool to message other users. If the user prefers to share a content item with members of this team, then the user may generate a message which includes a reference (e.g., a link) to the shared content item as stored by the cloud-storage provider. The user may alternatively use an application associated with the cloud-storage provider to directly share the content item with the team of users. The user may then use the issue-tracking tool to review any bugs which have been assigned to the user or to create a new bug report.

In the above example daily routine, the user may thus access a multitude of content items. As an example, the user may access content items which the user has uploaded to the cloud-storage provider or which have been shared with the user. Furthermore, the user may access communication channels which include messages generated by the user or by other users in the team. Emails may additionally be sent and received by the user.

As time progresses, the user may forget which content provider was used to store certain information. For example, the user may remember that a particular piece of information, such as a customer complaint, was discussed at some point in the past. Due to the volume of content created or viewed by the user, and the number of content providers which stores such content, it may be impossible for the user to quickly surface the discussion. Indeed, the discussion may have been discussed via email, the team communication tool, recorded in a document stored by the cloud-storage provider, included in a customer support ticket, and so on.

Furthermore, even if the user decides to access each content provider and perform searching via a front-end interface associated with the content provider, the user is constrained according to the provider's search capabilities. It is to be appreciated that search capabilities may vary widely. For example, a first content provider may enable searching of content item file names and associated metadata. As another example, a second content provider may enable searching of content item file names, any text within the content items (e.g., documents, PDFs), and so on. As another example, a third content provider may enable searching of text included in messages, but not searching of content items (e.g., documents, PDFs) which are referenced or attached to the messages.

Therefore, in the above-described scenario, it may be impractical for the user to timely surface the specific discussion at issue. Indeed, the user may need to become an expert with respect to each content provider's search capabilities. As described above, certain content providers may not enable complex enough search functionality to timely surface desired information.

Advantageously, the system described herein may obtain the content items which are stored by each content provider. As an example, the system may leverage application programming interfaces which are provided by each content provider. In this example, the system may use authorization information associated with a user to retrieve the content items accessible to the user. The system may then index each obtained content item, optionally using enhanced machine-learning based techniques. For example, the system may leverage deep-learning techniques to determine one or more topics associated with each obtained content item. In this example, the system may thus assign one or more topics to an email, a document, a message or a collection of messages, and so on. The indexing may advantageously be performed in accordance with enhanced search techniques, such as Elasticsearch techniques. For example, inverted indices may be used.

It may be appreciated that each of the obtained content items may be associated with access rights assigned by the content provider storing the content item. For example, if the user uploads a content item to the cloud-storage provider then the cloud-storage provider may limit access to just the uploading user. In this example, the content item may thus be only visible to the user via a front-end interface associated with the cloud-storage provider. Similarly, messages shared between users of the team communication tool may be visible to only certain users. For example, the users who subscribed to a channel which includes the messages may have access rights to these messages.

Advantageously, and as will be described, the system described herein may determine the access rights associated with each content item. For example, the system may use application programming interfaces which are provided by a content provider to determine access rights. As another example, the system may use authentication information associated with a user to ascertain the visibility of the user with respect to content items. In this example, and with respect to a cloud-storage provider, the system may obtain an authentication token (e.g., OAuth token) associated with a user. The system may then access the cloud-storage provider and, using the innovations described herein, may determine the access rights via the user's visibility of the stored content items. Therefore, each user of the system may have the same determined access rights as compared to their access rights assigned by each content provider.

In this way, the above-described user may use a single interface described herein to search for the above-described desired discussion. The system may thus search all of its stored content items to identify the specific discussion. Advantageously, any surfaced discussion may be assured to be authorized for access by the user. Since the all content items accessible to the user are indexed according to similar techniques, the user may rely upon the enhanced search capabilities of the system. For example, the user may specify an example query, 'discussion with [customer A]'. The system may use the deep-learning techniques described herein to identify that one or more content items, such as an email, message, document, and so on, are directed to this topic. In this way, even if the content items do not identify the specific sequence of terms in the query, the system may still rapidly surface the relevant content items.

Upon surfacing, the user may then select one or more of the responsive content items for viewing. In some embodiments, selection of a content item may cause activation of application, software, web-interface, and so on, associated with a content provider which stored the selected content item. Thus, if the user selects a note (e.g., an EVERNOTE note), then the selected note may be opened in a corresponding application. In some embodiments, the user may be presented with a visual representation of the selected content item within a same interface used for searching.

Therefore, the techniques described herein address technological shortcomings and improve upon prior technological techniques. Prior techniques failed to aggregate content from a multitude of content providers while ensuring that user access rights are properly implemented. Additionally, prior techniques failed to provide for a single interface from which searching across the multitude of content providers may be performed. Advantageously, in some embodiments the techniques described herein may be integrated into front-end interfaces associated with the content providers. For example, a desktop application associated with a team communication tool may include a module associated with the system. Thus, a user may use the team communication tool while quickly leveraging the power of the search techniques described herein.

The systems, methods, and devices of this disclosure each have several innovative aspects, no single one of which is solely responsible for all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 1B is another block diagram illustrating the example article aggregation system.

FIG. 7E is an example user interface to adjust collection methods of content providers.

FIG. 9B is an example user interface in which certain search results are excluded.

Like reference numbers and designations in the various drawings indicate like elements.

DETAILED DESCRIPTION

Figure 1A:
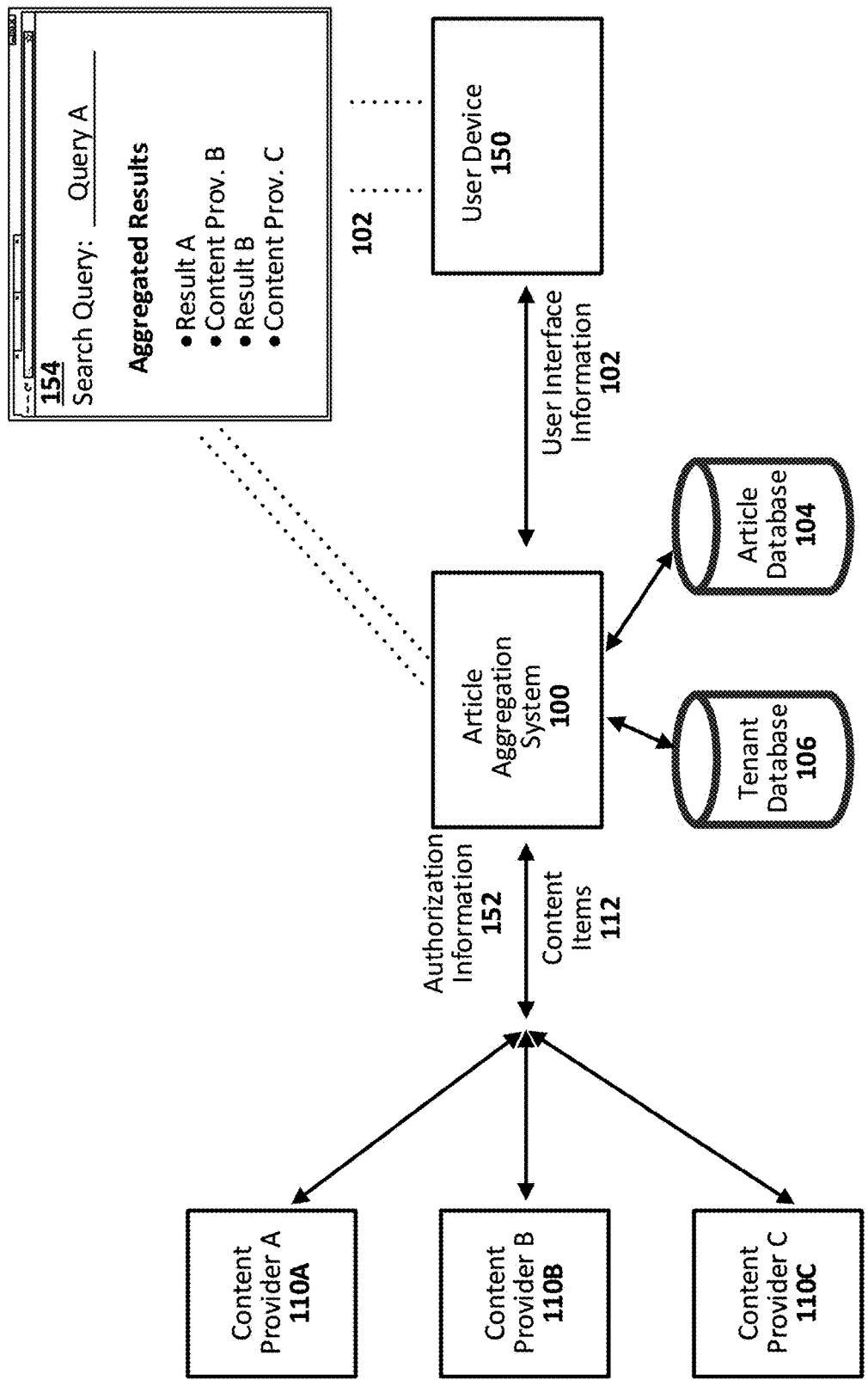
FIG. 1A is a block diagram illustrating an example article aggregation system in communication with content providers.

This specification describes, among other things, techniques for the indexing of content items aggregated from multitudes of content providers. As will be described, a system described herein (e.g., the article aggregation system 100) may determine all content items across the content providers which each user of the system is authorized to access. For example, the system may associate each user of the system with a multitude of user accounts at respective content providers (e.g., a '1-to-N' mapping). The system may obtain the content items associated with the users and transform them into articles for storage. Since the content items may be obtained from a multitude of content providers with varying purpose and functionality, the system may normalize the obtained content items into a common form. This common form is referred to herein as an article.

As will be described, when transforming a content item into an article the system may enrich the article with determined information. For example, the article may be tagged with metadata determined by the system. Example metadata may include a content provider associated with the article, file types associated with the article, and information determined based on machine learning techniques.

Additionally, each article may be assigned access rights information. The access rights information is referred to herein as a 'security ID.' The security ID may be a unique value which represents permissions. For example, a cloud-storage provider may store a particular content item (e.g., a document) in a nested folder. As may be appreciated, the cloud-storage provider store permissions identifying one or more users authorized to access the document and/or group membership information. The system may determine a respective security ID for each of the users and a security ID corresponding to the group membership information. Thus, when the document is transformed into an article by the system, the system may assign these security IDs to the article.

The articles may then be indexed for searching, and the system may enable users to provide search queries. As an example, a particular user may provide a search query. In this example, the system may identify security IDs associated with the user. For example, the system may identify the user accounts of the user with a multitude of content providers. The system may access mapping information identifying security IDs associated with each of the user accounts. As an example, the system may store information identifying access rights of each user account. When searching, the system may then use the identified security IDs as a filter. Thus, the surfaced articles will be ensured to be accessible by the particular user.

These features, among other innovative features, will be described in more detail below with respect to FIGS. 1A-12F.

As described herein, a content provider may represent an entity which provides an application, platform, and/or service, that enables the creation, sharing, modification, generation, deletion, and so on, of content items by users. Example content providers may include an entity associated with an email platform, a team communication tool, an issue-tracking tool, a word processing tool, an image or graphics editor, a note-taking tool, and so on. A content item may include any information which is representable in digital form. Example content items may include types of content such as documents, emails, images, videos, messages, text, audio, augmented or virtual reality content, and so on. As will be described, a content item may comprise multiple types of content. As an example, a message may include text, audio, video, and/or a document attached or referenced in the message.

Reference herein will be made to obtaining content or content items from a content provider. Additionally, reference herein will be made to accessing a content provider of using application programming interfaces (APIs) of a content provider. It is to be appreciated that such references may, in some embodiments, be interpreted as referring to servers managed, operated, or otherwise controlled, by an entity. For example, content or content items may be obtained from servers associated with a content provider. As another example, access may be made to servers associated with a content provider.

As described above, with respect to the Summary portion, people are increasingly relying upon different content providers during their daily schedule. For example, a person may use a mobile application executing on his/her mobile device, tablet, wearable device, or augmented or virtual reality device, to perform certain functions enabled by a content provider. As an example, the mobile application may relate to document processing. Thus, the user may use the mobile application to access documents, create documents, share documents, and/or edit documents. Similarly, the person may use a web application (e.g., via a browser) or a desktop application to perform document processing.

In the above-described example, the content provider may provide the application, web application, software as a service (SaaS), and/or platform as a service (PaaS), for use by users. As may be appreciated, the users may create user accounts which are specific to this content provider. When creating a document, the user may thus leverage, for example, an application which provides functionality to create documents for editing. The user may provide authentication information, such as a username and password, for verification by the content provider. In this way, documents which are created by the user may be stored by the content provider as being associated with the user. Additionally, documents which are shared with the user (e.g., by other users) may be stored as also being associated with the user. For example, the content provider may assign certain access rights, such as a read, write, and/or deletion, access rights. In this example, the content provider may maintain information identifying access rights associated with each content item. The content provider may also maintain information identifying access rights associated with each user account.

Thus, each person may have a multitude of user accounts associated with respective content providers. As each person uses, for example, an application associated with content provider, the content provider may store any content which is received via the application. Similar to the above, the content providers may associate the store content with certain access rights. These access rights may vary according to content provider. Indeed, each content provider may define a unique schema or mechanism associated with defining access rights.

For example, a first content provider may use an access-control list (ACL) to define permissions associated with the received content. With respect to the first content provider being a cloud-storage provider, the access rights may comprise an identification of specific user accounts and the associated access rights (e.g., read, write, execute, delete, and so on). The first content provider may additionally provide for users, or content, to be associated with groups. For example, a set of user accounts may be included in a particular group. Each user account included in the particular group may be assigned a same set of permissions.

As another example, a second content provider may include additional permissions as compared to a standard access-control list. For example, a cloud-provider may allow for its users to create references (e.g., links) to stored files. In this example, a user may access a front-end interface of the cloud-provider and select a particular content item (e.g., particular file). The user may then request that the cloud-provider generate a reference to this particular content item. In response, the user may receive a reference to a network location at which the particular content item is accessible. This second content provider may maintain access rights which identify any explicit authorizations, such as the access rights of specific user accounts as described above. The second content provider may additionally maintain access rights identifying that the particular content item may be accessible by anyone who uses the reference. For example, any logged-in user of the cloud-provider may access the particular content item via the reference. As another example, any non-logged in person may optionally access the particular content item via the reference.

It may be appreciated that access rights may thus be enforced by the content providers. In this way, such back-end processing may be masked from the users of front-end interfaces associate with the content providers. Thus, a user may simply log-into a note-taking application and view all recorded notes which the user has created or which have been shared with the user.

As will be described in more detail below, the system described herein may determine these access rights. For example, the system may determine access rights of a user of the system with respect to any of the content providers at which the user has a user account. In this way, the system may ensure that a user has complete visibility into the user's accessible content items, while also ensuring that the user has no greater visibility than would be expected.

While the above described use of an access-control list, it is to be appreciated that any access control technique may be employed by a content provider and fall within the present scope of disclosure. For example, discretionary access controls, mandatory access controls, role-based access controls, attribute-based access controls, host-based access controls, and so on, may be used.

As described above, the system aggregates content items from content providers used by users of the system. As will be described, the system may enforce content security at all times. For example, it may be appreciated that the content items stored by the system may originate from many content providers. As described above, these content providers may assign various access rights (e.g., permissions) to their stored content items and/or user accounts. Additionally, the access rights may be dynamically varied. As an example, the access rights may change over time. Therefore, there is a need for techniques which ensure that such varying access rights are continuously, or substantially continuously, monitored.

Advantageously, the system may, in some embodiments, separate techniques for (1) associating a user with one or more content providers and (2) determining access rights of the user with respect to the content providers. For example, the system may confirm that each user of the system has a valid user account with respect to one or more content providers. This confirmation is referred to herein as proof of identity. As described below, proof of identity may enable the system to receive authentication information, such as an access token, associated with each user account of a user.

The system may then determine access rights of each user. As described below, with respect to at least FIGS. 5A-5C, the system may obtain access rights information according to one or more techniques. For example, the system may use an admin or IT-enabled user account to ingest access rights metadata for all users who have been validated according to proof of identity techniques. In this way, the system may rapidly determine access rights for each content provider. As another example, the system may use the authentication information for each user of the system to access a content provider. The system may then determine actual visibility rights for each of the users.

As will be described, the system may index the content items and enable complex searching functionality to be performed. For a search query submitted by a user, the provided results may thus be ensured to be current with respect to both the user's (1) proof of identity and (2) proof of access. That is, the user's ability to access the content providers associated with the responsive search results may be validated. Additionally, the user will be determined to have permissions to access the specific content items responsive to the search query.

As described above, the system may identify the user accounts with which each user of the system is associated. As will be described below, with respect to at least FIGS. 7B-7C, the system may enable each user to specify the content providers used by the user. For example, and as illustrated in FIG. 7B, a user interface may be presented which identifies a multitude of content providers. A user may select from among the content providers with which the user has associated user accounts. Thus, if the user uses a note-taking tool, a team communication tool, a cloud-storage provider, and so on, the user may select the corresponding content providers via the user interface.

Upon selection or specification of a content provider, the system may then cause the user to authenticate with the content provider. For example, it may be appreciated that a content provider may enable outside applications or systems to integrate with the content provider. With respect to a cloud-storage provider, a user may specify that an outside application, agent, or system, is authorized to access certain aspects of the user's user account. As an example, the user may specify authorization to view and manage the stored content items. As another example, the user may specify authorization to view certain user profile information (e.g., language preference, city of residence, and so on).

As one example, the user may authenticate against the content provider. A user interface, an example of which is illustrated in FIG. 7C, may be presented to the user. This user interface may allow the user to authenticate with the content provider. In this example, the user interface may be provided by the content provider and the user may specify a username and password. The content provider may then authenticate the user. If the user is already logged in, the user interface may request that the user confirm access rights are to be provided to the system. The system may then receive authorization information associated with the user. Example authorization information may include an access token, such as an OAuth or OAuth 2.0 token. The system may then store the authorization information as a long-lived access credential to the content provider. Optionally, the system may advantageously not store any usernames and passwords for the users of the system. Instead, the system may use the received authorization information to confirm each user's identity.

Upon receipt of the authorization information, the system may identify that the user has confirmed proof of identity with respect to the content provider. The user may repeat this step for each of the remaining content providers with which the user has a user account. The system may optionally confirm proof of identity for each of user of the system periodically or in response to particular events or actions. As an example, the system may confirm proof of identity for all user accounts of a user when the user logs-onto the system described herein.

As described above, the system may obtain all content items associated with any user of the system. In some embodiments, the system may be a multi-tenant system hosted in a public or hybrid cloud. In these embodiments, the system may obtain all content items associated with a particular tenant. An example tenant may represent a company, and the system may obtain all content items associated with content providers used by employees of the company.

Proof of access may ensure that each user is able to access content items which they would ordinarily be authorized to access via front-end interfaces of content providers. To determine each user's visibility into accessible content items, the system may optionally access a content provider via an admin or IT-provisioned user account. It may be appreciated that certain content providers may enable such an account to obtain metadata describing access rights of other user accounts. For example, a content provider may enable an entity, such as a company, to provide user accounts, or licenses, with the content provider for each employee. Thus, the company may use a particular admin or IT user account assigned by the content provider for administrative tasks. In this example, the system may access the content provider via this admin or IT user account to obtain all access rights of the employees.

However, certain content providers may disallow for such admin or IT user accounts. Furthermore, certain entities may disallow for such admin or IT user accounts to have full visibility into the content items stored by a content provider. As an example, certain security or legal reasons may cause an entity to disallow or disfavor providing administrative access to all content items.

Thus, and as will be described, the system may access a content provider using each, or a subset, of the users' authorization information. As described above, the system may store authorization information (e.g., an access token) for each user with a user account at a content provider. Thus, the system may access each user's account with the content provider. The system may then determine the user's access rights. For example, and with respect to a cloud-storage provider, the system may identify which content items are visible to the user. As another example, and with respect to a team communication tool, the system may identify the channels to which the user is subscribed, the messages the user has received and/or sent, the files which have been attached to messages, and so on.

As described above, the system may therefore identify the content providers with which each user of the system has a user account. The system may additionally determine each user's access rights with respect to the identified content providers. As will be described in more detail below, the system may obtain the content items from the content providers. In some embodiments, the system may use a multitude of collectors to increase a speed at which content items may be ingested. Each collector optionally be assigned for use with a particular content provider. As an example, there may be a threshold number of collectors for each content provider. As will be described, these collectors may be hosted in a public or hybrid cloud. Thus, in some embodiments additional collectors may be spun up to increase a rate at which content items may be ingested in parallel.

Upon receipt of the content items, the system may transform the content items into articles for storage by the system. As described above, the articles may represent a normalized form. It may be appreciated that different content providers may store content in a variety of ways. For example, a cloud-storage provider may store images, documents, and so on. As another example, a team communication tool may store messages. Since the messages may be included in a continuous chat environment, it may be unclear as to a demarcation of messages to identify as a content item. In some embodiments, the system may identify each discrete message as an article. In some embodiments, the system may use machine learning techniques to group messages into a same article. Thus, the system may transform the raw content received from each content provider into articles to provide a standard form on which searching may be performed.

As described above, each article may be enriched with information determined by the system. For example, the system may use machine learning techniques to identify a topic associated with each article. As another example, the system may enrich a document content item with metadata extracted from the document. In this example, the metadata may indicate the users who created, reviewed, and/or modified, the document.

Furthermore, each article may be assigned permissions determined according to the content security model described above. As described herein, permissions may optionally be represented using security IDs. Each security ID may be a unique value associated with a specific set or permissions. For example, a security ID may indicate that a certain user account of a content provider is authorized to access a content item. As another example, a security ID may indicate that a group of user accounts is authorized to access a content item. In this way, each article may be assigned, or otherwise associated with, one or more security IDs.

The system may then index the articles. In some embodiments, the articles may be indexed using Elasticsearch. These indexed articles may be searched by users of the system. As will be described, the system may identify security IDs associated with a user searching the system. These security IDs may then be sued as a filter when searching. Thus, the surfaced articles may be authorized for access by the user.

FIG. 1A is a block diagram illustrating an example article aggregation system 100 in communication with content providers 110A-110C. As described above, the article aggregation system 100 may obtain content items 112 from content providers 110A-110C. The article aggregation system 100 may then enable searching of the obtained content items 112. For example, the article aggregation system 100 may communicate with users using respective user devices (e.g., user device 150). Example user devices may include a mobile device, a tablet, a wearable device, a laptop or desktop, an augmented or virtual reality device, and so on.

The article aggregation system 100 may be a system of one or more computers, one or more virtual machines executing on a system of one or more computers, and so on. In some embodiments, the article aggregation system 100 may be implemented in a public or hybrid cloud. For example, the article aggregation system 100 may be implemented using cloud computing resources. In this example, and as will be described, the article aggregation system 100 may optionally be replicated for multitudes of tenants. For example, the article aggregation system 100 may be a multi-tenant system in which each tenant represents a particular entity (e.g., a business, group or team within a business, a governmental agency, a university, and so on).

The user device may be used by a user of the article aggregation system 100. The user may create a user account, such as a username and/or password, with the article aggregation system 100. In some embodiments, the user may receive a notification generated by the article aggregation system 100. Example notifications may include an email, a text message, a message via a social network platform, and so on. The notification may include a reference (e.g., a link) associated with the article aggregation system 100. Upon selection of the reference, the user may create his/her user account. For example, the reference may cause the user's user device to present a web page associated with creation of a user account. As another example, the reference may cause an application associated with the system 100 to be obtained and/or execute on the user's user device.

Similarly, other users associated with a same tenant may create respective user accounts. The article aggregation system 100 may thus store user account information, such as user profile information, for each user of the system 100. Thus, while the illustrated example of FIG. 1A includes one user device 150, it may be appreciated that the article aggregation system 100 may be in communication with a multitude of user devices.

FIG. 1A illustrates the article aggregation system 100 receiving authorization information 152. As described above, a user of the user device 150 may identify content providers 110A-110C with which the user has user accounts. For example, the user may use the user interface illustrated in FIG. 7B to specify the content providers. The user may then be prompted (e.g., by each content provider) to confirm that the article aggregation system 100 is authorized to access the content provider on behalf of the user. Each of the content providers 110A-110C may then provide respective authorization information 152 associated with the user of the user device 150.

The authorization information 152 may be used by the article aggregation system 100 to validate the user's association with user accounts of the content providers 110A-110C. As described, herein, this validation may be referred to as a proof of identity. The user's user profile information may be updated to reflect the association with these user accounts. For example, a '1-to-N' mapping may be made between the user of the system 100 and the user accounts of the content providers 110A-110C.

In some embodiments, the article aggregation system 100 may receive access token from the content providers 110A-110C. Example access tokens may include an OAuth, an OAuth 2.0 token, a JavaScript Object Notation (JSON) web token, and so on. In some embodiments, the article aggregation system 100 may allow for single sign-on techniques. Without being constrained by way of example, one example may include the received authorization information 152 comprising a ticket-granting ticket. An additional example may include the authorization information 152 comprising a cookie or access token. In this example, the article aggregation system 100 may provide the cookie or access token to a central authority. The central authority may then provide access to one or more content providers which use the single sign-on.

In this way, the article aggregation system 100 may obtain authorization information 152 for each user associated with a tenant. As an example, a tenant may represent a business. In this example, the article aggregation system 100 may obtain authorization information 152 for each employee of the business. The obtained authorization information 152 may be associated with each of the users. For example, user profile information of each user may be updated to include respective authorization information 152. In some embodiments, the article aggregation system 100 may store the user profile information according to one or more database formats. As an example, authorization information 152 (e.g., access tokens) may be stored using Redis.

In some embodiments, the article aggregation system 100 may obtain authorization information 152 associated with an administrative user account. As an example, content provider A 110A may enable an administrative user account. This administrative user account may be able to access all content items stored by the content provider A 110A. As will be described, the article aggregation system 100 may use the authorization information 152 associated with the administrative user account to obtain all content items 112 associated with the tenant's users.

As illustrated in the example of FIG. 1A, the article aggregation system 100 has received content items 112 from the content providers 110A-110C. For example, the article aggregation system 100 may use the received authorization information 152 to access each content provider. The article aggregation system 100 may then obtain content items 112 via leveraging application programming interfaces (APIs) associated with each content provider. The content items 112 may thus be ingested by the article aggregation system 100.

In some embodiments, and as will be described, the article aggregation system 100 may generate articles from the obtained content items 112. These articles may then be stored in an article database 104 accessible to the article aggregation system 100. For example, the articles may comprise information determined by the article aggregation system 100. As an example, the information may include a content provider which stored the content item. As another example, the information may include an identification of the users who have created, viewed, modified, and/or shared, the content item. Additional examples will be described in more detail below.

As another example, the article aggregation system 100 may use machine-learning techniques to supplement the content item. For example, the article aggregation system 100 may determine a vectorized representation of the content item. In this example, deep-learning techniques may be leveraged to generate a learned encoding of the content item. As will be described, the article aggregation system 100 may determine use the vectorized representations when performing a search of the generated articles. The article aggregation system 100 may additionally determine one or more topics associated with each content item. For example, a topic modeler may be leveraged to assign a topic to each of the content items. In some embodiments, the system 100 may analyze the obtained content items 112 and determine a set of topics to be assigned to each of the content items. Examples of topic modelers may include latent Dirichlet allocation, LDA2vec, and so on.

In this way, the article aggregation system 100 may store articles for searching by users of the system 100. As will be described in more detail below, with respect to FIGS. 5A-6C, access rights for each article may be determined. For example, security IDs may be assigned to each article. A security ID may each represent a portion of access rights associated with an article. Thus, a security ID may identify that a particular user account with a content provider is authorized to access an article. In some embodiments, a security ID may additionally identify types of access. For example, the user of the user device 150 may be able to read a first article. As another example, the user of the user device 150 may be authorized to read and edit a second article.

Thus, the security IDs assigned to the first article and second article may reflect these respective types of access.

The articles may then be indexed by the article aggregation system 100. For example, inverted indices may be generated to enable rapid searching of the articles. In some embodiments, an Elasticsearch index may be used, such that articles may be searched according to Elasticsearch techniques.

In the illustrated example, the user device is presenting a user interface 154 associated with the article aggregation system 100. The user interface 154 may represent a web application associated with the article aggregation system 100. For example, the article aggregation system 100, or a presentation system in communication with the system 100, may provide a web application accessible to users. In some embodiments, the user interface 154 may be rendered by an application executing on the user device 150. For example, the application may be a mobile application, a desktop application, or software executing on the user device 150. In these embodiments, the application may receive information from the article aggregation system 100 for inclusion in the user interface 154.

The user interface 154, in this example, has received a search query from the user of the user device 150. The example search query, 'Query A,' has been routed to the article aggregation system 100. In response, the article aggregation system 100 has identified example search results, 'Result A' and 'Result B.' Advantageously, the user interface 154 is illustrated as presenting a source associated with each of the search results. For example, 'Result A' is illustrated as being from content provider B 110B. In this way, the article aggregation system 100 may provide a single vantage point into all content items which are accessible to the user of the user device 150.

As will be described in more detail, search functionality may be customized according to preferences of the tenant. These preferences may be stored in the tenant database 106 illustrated in FIG. 1A. For example, a tenant preference may indicate a strategy used to boost certain articles when determining search results. In this example, the tenant may provide preference information indicative of various weightings and/or instructions for how the actual search query may be composed by the system 100. Thus, each tenant of the article aggregation system 100 may advantageously improve upon the system's 100 search capabilities.

FIG. 1B is another block diagram illustrating the example article aggregation system 100. As described above, the article aggregation system 100 may obtain content items 112 from a multitude of content providers 110A-110C. In some embodiments, the article aggregation system 100 may obtain content items 112 from web applications or platforms, on-premise systems or devices, and/or via the internet.

In the example of FIG. 1B, the article aggregation system 100 is illustrated as obtaining content items from content provider A 110A. This content provider 110A may represent a publisher or developer of an application or software as a service (SaaS) platform accessible to users of the system 100. For example, the content provider 110A may provide an application which enables chart and/or diagram creation. The creation may be performed via a mobile application or web application.

To obtain content items from this content provider A 110A, the article aggregation system 100 may use one or more application programming interfaces (APIs) associated with the content provider A 110A. It may be appreciated that content providers may design their own APIs for use in retrieving content which is created by users of the content provider. An example API may include a call or endpoint associated with obtaining one or more content items. The example API may additionally include a call associated with permissions associated with stored content items. Advantageously, the article aggregation system 100 may leverage these APIs to rapidly obtain content items 112 from content provider A 110A.

The article aggregation system 100 may use authorization information associated with one or more user accounts when using the APIs. For example, content provider A 110A may allow for an administrative or IT-provisioned user account. Thus, the article aggregation system 100 may obtain authorization information, such as an access token, for this administrative or IT user account. The article aggregation system 100 may then provide one or more calls according to the specific API implementation of content provider A 110A. As an example, a hypertext transfer protocol (HTTP) POST and/or HTTP GET requests may be provided by the article aggregation system 100. Optionally, and with respect to this example, arguments required by the APIs may be included in JavaScript Object Notation (JSON).

In some embodiments, the article aggregation system 100 may be able to integrate with a new content provider. For example, a tenant may use a content provider to which the article aggregation system 100 has not yet been exposed. That is, the system 100 may not have obtained content items from this new content provider. Thus, the article aggregation system 100 may lack APIs for this new content provider. In some embodiments, the article aggregation system 100 may obtain documentation associated with the content provider's APIs. For example, the article aggregation system 100 may use search techniques, or a third-party search engine, to locate one or more web pages which describe the APIs.

The article aggregation system 100 may then use natural language processing techniques to identify one or more APIs which are directed to obtaining of content (e.g., 'download', 'get', 'obtain', and so on). In some embodiments, the article aggregation system 100 may use deep learning techniques to search for synonyms of words which are indicative of obtaining content. For example, word2vec may be leveraged to determine a distance between words included in the one or more web pages and words indicative of obtaining content. Similarly, the article aggregation system 100 may locate specific API call or endpoints which are directed to obtaining access rights or permissions associated with content.

Upon locating a portion of a webpage describing an API call or endpoint associated with obtaining content items, the article aggregation system 100 may parse the portion. For example, the portion may identify a particular HTTP POST form which is to be used. The article aggregation system 100 may then generate a request which is in conformance with this form.

As illustrated, the article aggregation system 100 has provided an authentication token 156 to content provider A 110A. As described above, with respect to FIG. 1A, the authentication token 156 may be used to access a content provider. For example, the authentication token 156 (e.g., an OAuth 2.0 token) may have been provided by content provider A 110A in response to a user of the system 100 authenticating with the content provider A 110A. Examples of a user authenticating with a content provider, such as with respect to onboarding the user, are described below with respect to FIGS. 7A-7E.

The authentication token 156 may thus be used to obtain content items 112 which are accessible to a user of the article aggregation system 100 associated with the token 156. For example, the user may represent an employee of a tenant of the article aggregation system 100. Thus, the user may have a user account with content provider A 110A. The obtained content items 112 may therefore represent content items which are accessible to this user. The authentication token 156 may additionally represent an administrative or IT account with the content provider A 110A. The obtained content items 112 may therefore represent content items which are accessible to this administrative or IT account. Certain content providers may enable full visibility with respect to the content items associated with a same tenant. Thus, the content items 112 may be content items accessible to any employee of the tenant.

In the illustrated example, the article aggregation system 100 is illustrated as receiving content items 112 from content provider B 110B. In some embodiments, the article aggregation system 100 may obtain web content. For example, content provider B 110B may represent one or more web servers which the article aggregation system 100 is obtaining content from. In this example, the article aggregation system 100 may use web scraping or web crawling techniques to obtain content items 112.

In some embodiments, a tenant associated with the article aggregation system 100 may specify preferences regarding content items to be crawled or scraped form the internet. As illustrated in FIG. 1A, the tenant may specify preferences which may be stored in a tenant database 106. With respect to crawling content items, the tenant may indicate that the article aggregation system 100 is to obtain content from the internet which uses certain terms. For example, the article aggregation system 100 may identify that content items (e.g., web pages) which mention a name of the tenant (e.g., a name of a company or business) are to be indexed by the article aggregation system 100.

The tenant may further indicate that the article aggregation system 100 is to obtain content items (e.g., web pages) which are directed to certain topics. For example, a topic modeler may be used by the article aggregation system 100 to ascertain one or more topics described in a web page. In this example, the tenant may thus specify that a particular topic (e.g., a review of a product or service provided by the tenant) is to be searched. The article aggregation system 100 may thus index content items which describe this particular topic.

Furthermore, and as will be described, certain content items 112 received from content provider A 110A may reference, or otherwise include, a link to a web page or internet content. As an example, content provider A 110A may represent a team communication tool. As may be appreciated, links to web page or internet content may be shared between users of the team communication tool. For example, a particular user may share a link to a web page which discusses something relevant to a current conversation or to an aspect of work.

The article aggregation system 100 may follow these links and obtain the associated content. For example, a link may be of the form http://www.[webaddress].com. In this example, the article aggregation system 100 may access the associated web page. The article aggregation system 100 may then obtain a copy of this web page. As an example, the article aggregation system 100 may obtain a printed version of the web page. In this example, the article aggregation system 100 may store the web page with the included text being readable. Thus, this text may be indexed by the article aggregation system 100. As another example, the article aggregation system 100 may store the complete web page. In this example, the underlying code may be captured by the article aggregation system 100. As another example, the text, images, and any metadata, may be saved. These may then be indexed by the article aggregation system 100. If the web page is included in search results, for example in response to a user query, the stored text, images, and metadata, may be used for the searching. If a user then selects the web page, the system 100 may cause a browser on a user device of the user to open the link, http://www.[webaddress].com.

The article aggregation system 100 may additionally be in communication with an on-premises system or device. For example, content provider C 110C is illustrated as being an on-premises system which is providing content items 112 to the article aggregation system 100. An example of an on-premises system or device may include an email server. Another example of an on-premises system or device may include an EXCHANGE server.

It may be appreciated that content provider C 110C may use an external protocol. This external protocol may vary according to the software being used on content provider C 110C. Example external protocols may include NFS, FTP, SFTP, and so on. With respect to an EXCHANGE server, the article aggregation system 100 may use one or more usernames and passwords associated with user accounts of content provider C 110C. For example, content provider C 110C may execute an Exchange Web Server. This server may require that usernames and passwords be used to access the server. Thus, an authentication token may not be allowed. In some embodiments, the article aggregation system 100 may therefore obtain one or more administrative or IT user accounts. The article aggregation system 100 may use corresponding usernames and passwords to obtain content items 112 from the Exchange Web Server.

In this way, the article aggregation system 100 may obtain content items 112 from systems or devices which are local to a tenant. For example, the tenant may use local servers to store content for employees of the tenant. The content may represent documents, images, videos, graphics files, and so on, which are being used by the employees. Furthermore, in some embodiments the article aggregation system 100 may obtain content items 112 directly from cloud-storage resources. As an example, a public cloud may provide for substantial store of content. In this example, the public cloud may not provide an application for use by users. For example, certain third-party cloud storage providers may provide mobile applications, desktop applications, web interfaces, and so on, to enable end-users to easily store and share content. However, a tenant may directly provision cloud-storage for back-end use. Thus, the article aggregation system 100 may obtain content items 112 from this back-end provisioned cloud storage. In this way, the article aggregation system 100 may leverage the power of a hybrid cloud in which public cloud resources and private resources are combined.

Therefore, the article aggregation system 100 may obtain content items 112 from a variety of sources. As will be described, for each obtained content item the article aggregation system 100 may assign access rights or permissions to the content item. For example, a content item obtained from content provider A 110A may be assigned access rights or permissions which are based on access rights assigned by the content provider A 110A. In this example, if the content provider A 110A is a document editor, then a user of the system 100 who created the document may be assigned access rights to the document. Similarly, any user of the system 100 who was shared the document may additionally be assigned access rights. Similarly, a content item obtained provider C 110C may be based on access rights determined by content provider C 110C. For example, content provider C 110C may represent an EXCHANGE server. In this example, the EXCHANGE server may store emails, documents, presentation files, and so on. Similar to the above, a user of the system 100 who creates a document may be assigned access rights to the document.

As another example, a content item obtained from content provider B 110B may be accessible to any user of the article aggregation system 100. For example, a web page which is crawled or scraped may be considered to be public. Thus, any user of the system 100 may be presented with the web page. In some embodiments, the article aggregation system 100 may assign access rights to web pages which were obtained in response to associated links being included in a message, document, email, and so on. As an example, a user of the system 100 may provide an email to another user of the system 100 which includes a link to a web page. In some embodiments, the article aggregation system 100 may obtain a copy of this web page and assign access rights to the two users. Thus, the article aggregation system 100 may surface this web page in search results for only these two users.

A tenant may prefer that only the above-described two users be assigned access rights to the shared web page. For example, other users of the article aggregation system 100 may not have been exposed to this web page. Thus, if this web page surfaces in results it may not be a search result which these other users were attempting to locate. In contrast, since the two users were exposed to the web page, at some point in the future they may attempt to find the web page. Thus, one of the users may provide a search query such as, 'web page shared by [user A].' The user may additionally cause the system 100 to search emails only, and thus rapidly surface this web page.

Figure 1C:
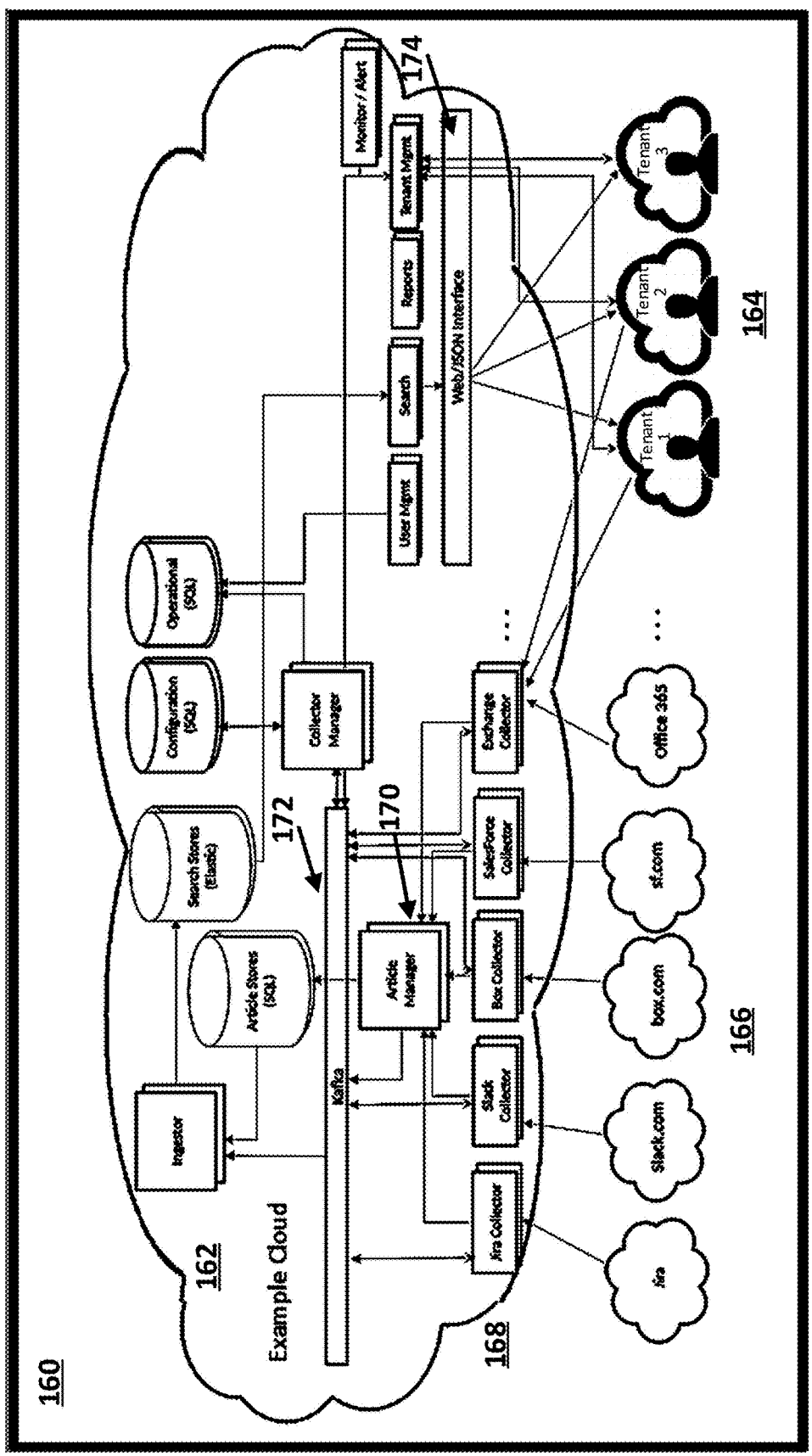
FIG. 1C is a block diagram illustrating an embodiment.

FIG. 1C illustrates an example networked computing environment 160 in which certain aspects of the disclosure herein may be performed. In the illustrated example, a cloud environment 162 is illustrated. Thus, in some embodiments the techniques described herein may be implemented via public or hybrid cloud computing resources (e.g., AWS). As described in FIG. 1A, the cloud environment 162 may be replicated for each tenant or for a threshold number of tenants. In the example of FIG. 1C, there are three tenants 164 who are using the cloud environment. These tenants 164 may represent businesses, corporations, universities, agencies, and so on, which are using the aggregated search techniques described herein.

As described above, each of the tenants 164 may enable creation of user accounts for their users. For example, and with respect to a corporation, the corporation may enable creation of user accounts for each of its employees. Additionally, each of the tenants 164 may specify certain preferences associated with their instance of the cloud environment 162.

Example content providers 166 are illustrated in FIG. 1C. As described above, and as will be described in more detail below, content items from these content providers may be obtained by collectors 168. The collectors 168 may be hosted in the cloud environment 162. As will be described below, the collectors 168 may obtain content items from the content providers, and then transform the content items into articles. For example, the collectors 168 may assign access rights to the content items.

As another example, the collectors 168 may determine additional information (referred to herein as 'enrichment' information). In this example, a collector 168 may analyze a received content item and determine information relevant to the content item. With respect to a received document, a collector may identify metadata specifying all users who modified the document. Thus, the collector may store this information such that it may be searchable. Furthermore, the collector may analyze the document and identify comments or tracked changes by users. The collector may similarly store this information such that it may be searchable. As an example, a user may search for a document which satisfies certain search terms and which includes a comment from a particular user. As another example, the user may search for a document which includes certain search terms in a comment from the particular user.

As will be described, each content provider may be associated with a particular technique for obtaining content items. Thus, the collectors 168 may implement respective techniques and may, in some embodiments, therefore be specific to a content provider. For example, a first content provider may enable the obtaining of content items and associated access rights via an administrative account. As another example, a second content provider may disallow such administrative accounts. Thus, the collector for this content provider may be required to use authentication tokens for each user associated with one of the tenants 164.

An article manager 170 is included in the example cloud environment 162. The article manager 170 may cause the articles generated by the collectors 168 to be stored. For example, an article store is illustrated in the cloud environment 162. As will be described below, in some embodiments the cloud environment 162 may use a publish-subscribe model (e.g., pub-sub messaging). The cloud environment 162 includes a Kafka queue 172, which may coordinate the publish-subscribe model. As will be described, the Kafka queue 172 may publish messages identifying articles which are ready for indexing. In response, one or more ingestors 174 may coordinate the indexing.

Advantageously, the indexing may be performed separate from that of storing an article. For example, an ingestor 174 may receive a published indexing message from the Kafka queue 172. The indexing message may include a reference to a particular article which is to be indexed. The ingestor 174 may therefore obtain the referenced article from the article store. In this way, the Kafka queue 172 may be small and efficient as queued messages are references to article information found in the article store and not the information itself. Additionally, a number of ingestors 174 may efficiently scaled as needed to address demand. That is, additional ingestors may be spun up to handle increased loads (e.g., increased published messages).

The cloud environment 162 further includes a web/JavaScript Object Notation (JSON) interface 174. This interface 174 may be used to provide a front-end interface to users of a tenant. For example, the interface 174 may be associated with a web application which users may access via a browser. Additionally, the interface 174 may respond to requests received from a mobile or desktop application associated with the techniques described herein. As will be described in more detail below, the cloud environment 162 may respond to certain API calls via the interface 174. For example, a module associated with the aggregated searching techniques described herein may be included in an application of a content provider. Thus, the application of the content provider may be modified to leverage the enhanced search functionality described herein. The interface 174 may receive these API calls provided by the module. An example of integrating with an application of a content provider is described below, with respect to FIGS. 10A-10B.

Figure 2:
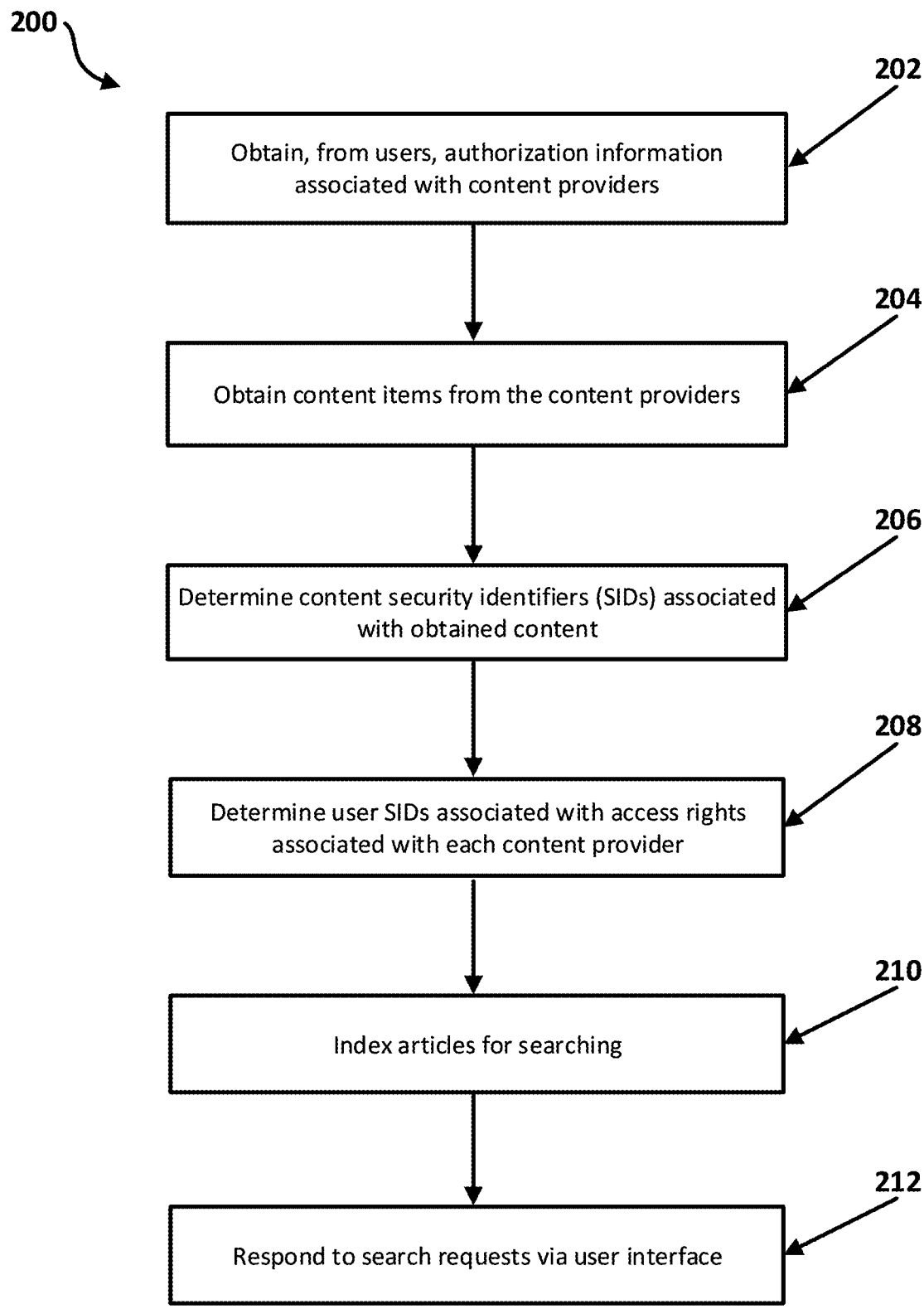
FIG. 2 is a flowchart of an example process for indexing content items obtained from content providers.

FIG. 2 is a flowchart of an example process 200 for indexing articles associated with content providers. For convenience, the process 200 will be described as being performed by a system of one or more computers (e.g., the article aggregation system 100).

At block 202, the system obtains authorization information associated with content providers. As described above, a user of the system may authorize the system to access the user's user accounts with the content providers. The system may obtain authorization information, such as access tokens, associated with the content providers.

At block 204, the system obtains content items from the content providers. As will be described in more detail below, each content provider may be associated with a respective collection method or technique. For example, a first collection method may include the system using authorization information associated with a single administrative or IT user account of a content provider. In this example, the single administrative or IT user account may thus have full read access to all content items stored by the content provider. Therefore, the system may obtain all of the content items.

As another example, a second collection method may include the system using authorization information associated with a set of user accounts. In this example, a tenant (e.g., a business or corporation) may have a threshold number of user accounts which provide full visibility into content items associated with the tenant. As an example, the tenant may have different departments (e.g., legal, engineering, sales, and so on). These different departments may prefer not to provide full visibility into their stored content items to the other departments. Thus, no single user account may have full read access to the content items associated with any of the departments. The system may thus access a content provider using a set of user accounts which provide full read access. In some embodiments, the system may identify repeat content items which are accessible to two or more user accounts. For each, there may be certain content items which are visible to any of the departments. Optionally, the system may obtain a single copy of a repeat content item.

As another example, a third collection method may include the system using each user's authorization information. For example, during onboarding of each user, the user may authenticate against a content provider. Thus, the system may obtain authorization information (e.g., access tokens) for each of the users. The system may then access the content provider using these access tokens. Each user may have unique visibility into the content items associated with a same tenant. Thus, the system may obtain the content items which are visible to each user. Similar to the above, there may be repeat content items. For example, a first user may have shared a document with a second user. Thus, in some embodiments the system may use deduplication techniques to store a single version of a repeat content item.

As described above, the system transforms each obtained content item into an article for storage by the system. The articles may represent a normalized form of the content items, and may include standard information used by the system to enhance indexing. For example, the system may categorize information included in, or otherwise associated with, a content item into distinct index fields. These index fields may be used to facilitate example boosting strategies for searching, will be described in more detail below.

When transforming a content item into an article, the system may tag the content item as being a title, body, or comment. These tags may be used by the system to categorize text of a content item in terms of how important it is to search. An example of a tag, with respect to a sales tracking content provider (e.g., SALESFORCE) may include certain properties (e.g., reviewing author). Thus, the properties may be extracted and used as tags. The tags may be used to map the content into index fields to control search importance. For example, search importance may be based on MajorText, NormalText, and/or MinorText. At search time, these index fields may be referenced with various boosting factors. For example, this may allow for improving scores for hits in titles over hits in comments.

Additionally, the system may parse text included in .pdfs, images, and so on. For example, a convolutional neural network may be leveraged to transform an image into constituent text. This text may then be stored with the article, such that it may be indexed. In some embodiments, the system may analyze audio and generate corresponding text. For example, deep learning techniques may be employed (e.g., convolutional neural networks, recurrent neural networks, and so on). In some embodiments, images may be classified according to a classifier. For example, a narrative description may be generated based on an image. Thus, if an image depicts a person performing an action the system may generate a description of the action. The system may additionally use custom training information to classify objects included in an image. For example, a tenant may provide examples of products which the tenant produces. In this example, the system may update a machine learning model to recognize these products in images. Thus, a user may search for 'images of [product A],' and be presented with images which are determined to include product A.

Optionally, the system may generate a multitude of articles from a content item obtained from a content provider. For example, in a content provider which stores bug tracking, the content provider may store a body of the bug as specified by a first user and a resolution of the bug as made by a second user. In this example, the content provider may provide a content item which includes both the body and resolution in the same content item. The system may optionally separate these into two articles. The system may optionally associate these articles with each other. For example, the system may maintain information identifying that the article generated from the response is associated with the article generated from the body.

Similarly, a word document or portion of text may be separated according to authorship. Thus, the system may generate a multitude of articles for a received word document. Similar to the above, these articles may be associated with each other. In this way, at search time a user may request information authored by a certain user which satisfies particular search terms. In response, the system may present a specific article generated from the received word document. In this way, the user may be presented with the specific bit of information for which the user is searching. Additionally, in some embodiments the comments included in a word document may be associated with their own articles.

A team communication tool may include channels with substantially continuous text being specified by users. For example, users may communicate in real-time via the team communication tool. In some embodiments, the system may separate the included messages into different articles. Optionally, the system may cluster a set of messages into a same article. For example, the system may use time stamp information associated with the messages. In this example, the system may cluster a set of messages which are within a threshold time of each other as being included in a same article. As another example, the system may determine topics associated with the messages. For example, and as will be described below with respect to FIG. 3C, a topic modeler may be leveraged. Thus, the system may group messages associated with a same, or similar, topic into a same article. Additional techniques for separating conversations, or other content items, may be used and fall within the scope of the present disclosure. For example, techniques to identify specific sessions may be employed.

As will be described, the system may periodically update the obtained content items. For example, the system may periodically access each content provider and identify whether any new content items have been created. If so, the system may fetch these new content items and generate articles according to the techniques described herein. The system may additionally identify whether any content items have been deleted. If so, the system may optionally cause deletion of the associated articles of the system. In some embodiments, the system may maintain a copy of the associated articles. These articles may additionally be included in search results, but highlighted, or otherwise called out, to signify their deletion from a content provider.

Additionally, certain content items may have adjustments to their access rights or permissions. The system may therefore adjust content SIDs associated with articles generated form these content items. In some embodiments, the system may subscribe to updates regarding access rights changes. For example, a content provider may provide one or more API calls which provide updates regarding any new, modified, or canceled, access rights for a user of the content provider. Since the system has authorization information, such as access tokens, for users, the system may similarly subscribe to such updates. In this way, the system may dynamically adjust access rights outside of periodically interrogating each content provider.

However, in some embodiments the search results presented to a user may include only respective snippets of the responsive articles. If a user selects a particular article, an application associated with a content provider which stored the particular article may be activated. For example, if the particular article was generated from a content item stored by a team communication tool, upon selection the team communication tool may be activated. If the user's permissions have been changed, the team communication tool will block full access to the associated content item.

At block 206, the system determines content security identifiers (SIDs) for the obtained content. As described above, a content SID indicates a unique value associated with access rights or permissions. For example, a content item obtained by the system may have been created by a particular user. Thus, only this particular user may have visibility into the content item. The content provider which stored this content item may have specified access rights indicating that only the particular user may access the content item. Thus, the system may assign a content SID indicative of the particular user. Further description related to determining a content SID is included below, with respect to at least FIG. 6A.

At block 208, the system determines a user security identifier (SID) for each of the users. Similar to the above, each user may be assigned access rights to the articles stored by the system. For example, a particular user may have access to a threshold number of articles associated with a first content provider and a second content provider. As described above, the particular user may be associated with a first user account with the first content provider and a second user account with the second content provider. The system may determine the access rights associated with the first user account and the second user account. These access rights may be based on the content SIDs described above.

For example, the above-described first user account may have access rights to a threshold number of articles associated with the first content provider. The system may store information identifying first content SIDs which are associated with this first user account. Similarly, the system may store information identifying second content SIDs which are associated with the above-described second user account. The first content SIDs and second content SIDs may then be associated with the particular user. For example, these content SIDs may be assigned as the user SIDs for the particular user. If the particular user provides a search query, the system may use the assigned user SIDs as a filter. Thus, only articles which are assigned these SIDs will be surfaced. Additional description related to determining user SIDs is included below, with respect to at least FIG. 6A.

At block 210, the system indexes the article for searching. The system may index the articles according to the techniques described herein. For example, one or more Elasticsearch indices may be used. Additionally, and as will be described in FIGS. 3C and 4B, the system may use machine learning techniques to enhance indexing. For example, a topic modeler may be used to determine one or more topics associated with an article. As another example, word or sentence embeddings may be used to generate a learned encoding of text included in an article.

At block 212, the system responds to search queries. The system may respond to a search query received via an interface associated with the system. For example, an application may be used by a user to provide search queries. The application may route the search query to the system via a network interface (e.g., interface 174 described above).

At block 212, the system responds to received search queries. The system may use example search techniques, such as Elasticsearch, to respond to a search query. As described above, in some embodiments a tenant may specify certain unique search features. For example, a tenant may specify synonyms of certain terms which may not be otherwise known to the system. In this example, the tenant may indicate that certain proper nouns, such as names of products or internal services, may be synonyms for other proper nouns. Thus, if a name of an internal service is changed over time these changes may be represented in the search functionality.

Furthermore, the tenant may specify certain boosting techniques or strategies. For example, the tenant may have access to the Elasticsearch back-end search functionality. In this example, the tenant may thus directly modify the search functionality. As another example, the tenant may indicate that certain types of files, certain types of information, or certain terms, are to be boosted. Thus, the tenant may indicate that search terms included in a title associated with an article are to be weighted greater than if the search terms are found in a body of the article.

These supplements may optionally leverage 'should' clauses of Elasticsearch. For example, these clauses may act to increase or decrease relative relevance scores. As an example, scores may be increased if all user terms are found exactly in the order provided, or scores may be increased to a lesser extent if bigrams are found to match, and so on.

The system may then cause presentation of the search results to a querying user. For example, a user interface being used by the querying user may be updated to reflect a threshold number of the search results. In some embodiments, the system may highlight, or otherwise call out, portions of each article which were responsive to a search query. One or more of these portions may optionally be included in the user interface. Thus, the user may rapidly scan through the search results until a particular article is found.

Figure 3A:
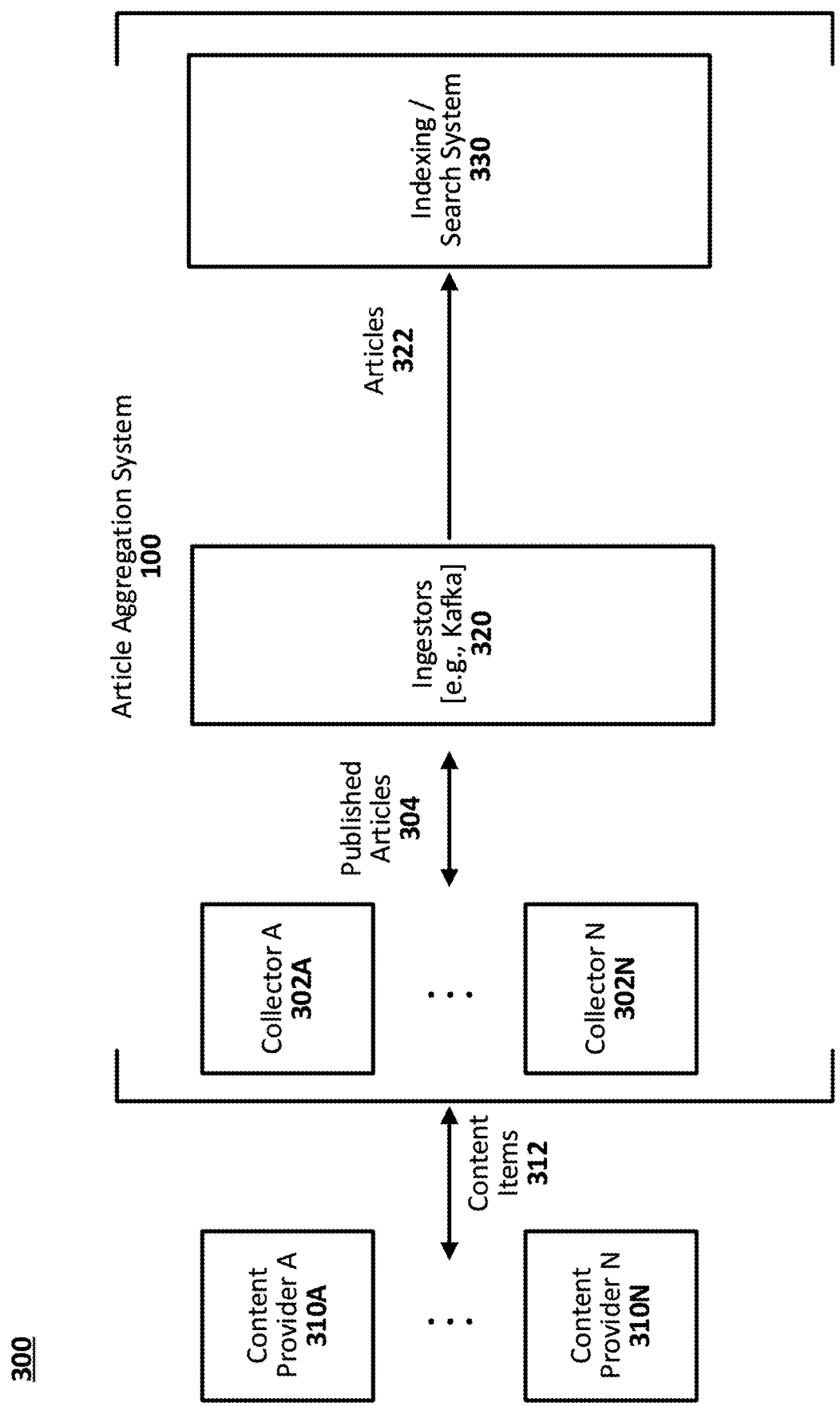
FIG. 3A is a block diagram illustrating example components of an article aggregation system.

FIG. 3A is a block diagram 300 illustrating example components of an article aggregation system 100. In the illustrated example, example content providers 310A-310N are illustrated as providing content items 312 to the article aggregation system 100. As described above, the article aggregation system 100 may use authorization information associated with users of the system 100 to access content items stored by the content providers 310A-310N. To obtain content items 312, the article aggregation system 100 may use a multitude of collectors 302A-302N.

As described in FIG. 2, each collector may optionally be assigned a particular content provider. For example, collector A 302A may be assigned to retrieve content items from content provider A 310A. Each content provider may be associated with a respective collection method. For example, content provider A 310A may allow for a single administrative or IT account to have full visibility into stored content. Thus, collector A 302A may use authorization information associated with a single account to access content provider A 310A.

As another example, content provider N 310N may require that each user account associated with the provider N 310N be used. Thus, collector N 302N may use authorization information associated with each user of the system 100 who has an associated user account with content provider N 310N. In some embodiments, there may be a threshold number of collectors for a content provider. Thus, content provider N 310N may be accessed by each of the threshold number of collectors. For example, each of the collectors may access the content provider N 310N using a subset of the total user accounts.

As described above, the collectors 302A-302N may then generate articles for indexing. In some embodiments, a publish-subscribe model may be used. Thus, the collectors 302A-302N may publish articles 304 to be ingested by the system 100. For example, the collectors 302A-302N may generate articles and then store the articles in an article store (e.g., the article stored in FIG. 1C). The collectors 302A-302N may generate messages to cause indexing of these stored articles. Thus, the collectors may publish 304 messages which include references to the stored articles.

The published articles 304 may be ingested by one or more investors 320 included in the article aggregation system 100. In some embodiments, a queue may be used to receive the published articles 304. As described above, the queue may hold messages which reference an article to be indexed. Thus, the queue may be serviced by the ingestors 320 according to example techniques (e.g., Kafka). Further description of this queue is included below, with respect to FIG. 3C.

Upon receipt of a message regarding an article, the ingestors 320 may obtain the corresponding article from the article store. The ingestors 320 may obtain any information which has been determined by the collectors 302A-302N when generating the article from an associated content item. For example, and as described in FIG. 2, the collectors to generate enrichment information. In this example, the enrichment information may include categorizing certain information into distinct fields. These fields may be leveraged by the search techniques described herein, such as Elasticsearch. As described in more detail below, with respect to FIG. 3C, the ingestors 320 may additionally join machine learning information with the enrichment information described below.

In this way, articles 322 may be provided by the ingestors 320 to an indexing/search system 330. As described herein, this indexing/search system 330 may optionally represent an Elasticsearch system. A tenant associated with the article aggregation system 100 may specify certain strategies associated with boosting certain search results and/or specifying relevance modifying functions. For example, a relevance modifying function may indicate that newer articles may be weighted higher than older articles. In this example, the articles may thus be associated with one or more time stamps (e.g., a time of creation, a most recent the associated content item was modified or shared, and so on). As another example, a relevance modifying function may indicate that certain articles specified by a tenant, or articles which include certain information, are to be weighted higher.

Figure 3B:
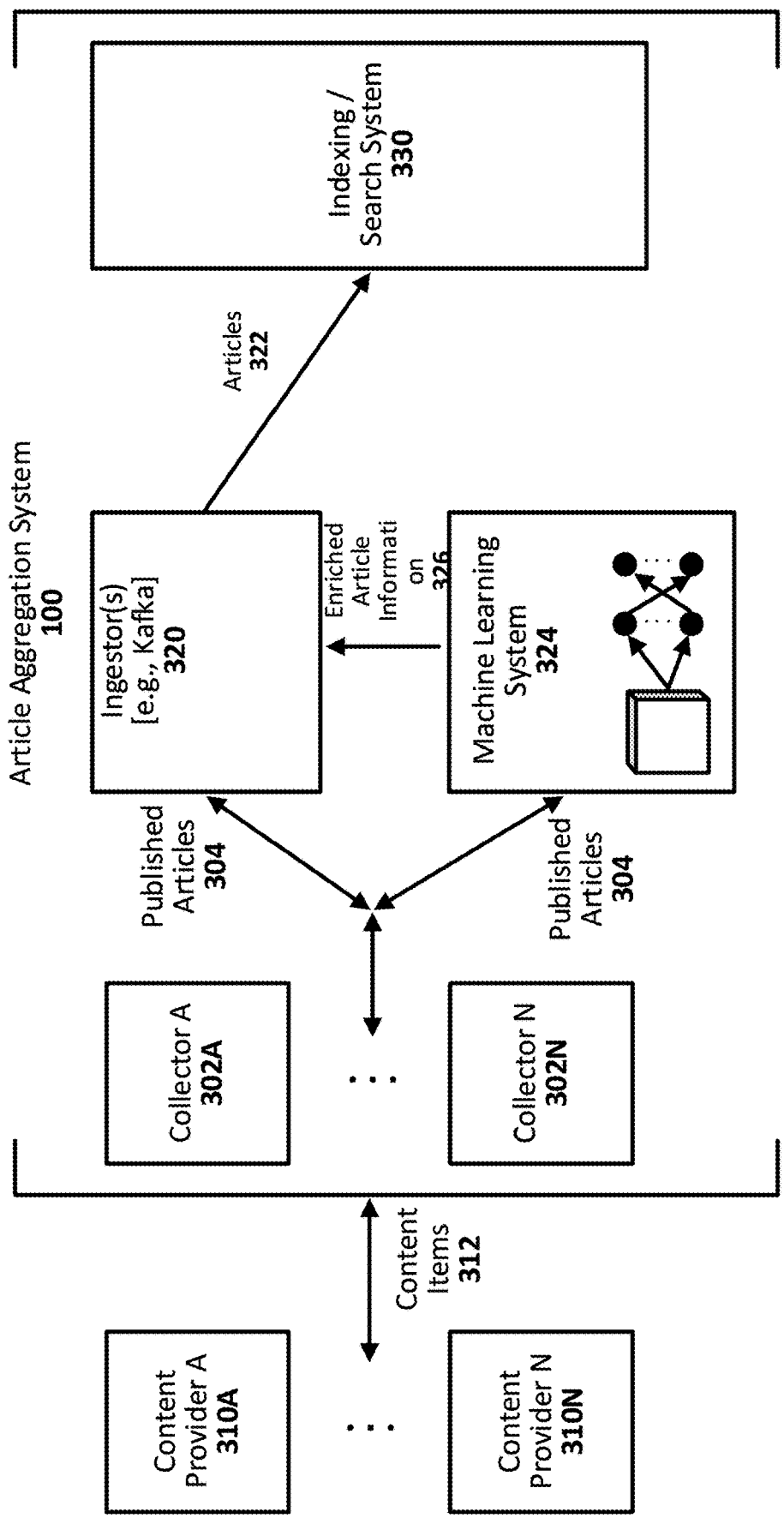
FIG. 3B is another block diagram illustrating example components of the article aggregation system.

FIG. 3B is another block diagram 300 illustrating example components of the article aggregation system 100. In the example of FIG. 3B, a machine learning system 324 is illustrated as receiving published articles 304. Similar to the description of FIG. 3A, the machine learning system 324 may subscribe to updates from the collectors A-N 302A-302N. In some embodiments, the machine learning system 324 may monitor the article store described above for any newly stored articles. The machine learning system 324 may then determine example machine learning information.

In some embodiments, the machine learning system 324 may analyze text included in an article and generate a learned encoding of the text. For example, a vectorized representation of the text may be generated with respect to a learned feature space. This learned encoding may be based, for example, on the Universal Sentence Encoder. In some embodiments, the machine learning system 324 may adjust the Universal Sentence Encoder to encompass terms and information which may be specific to a tenant. For example, the machine learning system 324 may use transfer learning techniques to update the associated machine learning model. In this example, the machine learning system 324 may obtain a pre-trained version of the Universal Sentence Encoder. The machine learning system 324 may then set one or more flags identifying that the Encoder is to be updated.

Training information specific to a tenant may then be obtained. As an example, users associated with the tenant may highlight or otherwise indicate portions of text which are similar. The Encoder may then be updated to associate these portions closer in a learned feature space. As another example, the machine learning system 324 may obtain tenant preferences regarding search strategies. As described above, example tenant preferences may include relationships between terms. As an example, the tenant may indicate that a certain proper noun (e.g., a product name) is related to one or more other terms. The machine learning system 324 may thus update the model, for example via a forward and backward pass, to update the pre-trained weights.

Additionally, the machine learning system may monitor the search queries provided by users and the corresponding selections of search results. These search queries may be used by the system 100 to generate search results, for example as described herein. The search results may be based, at least in part, on information generated by the Universal Sentence Encoder. The machine learning system 324 may identify search queries which are considered to be the same or similar. As an example, the system may determine measures of similarity between search queries. An example measure may be based on deep-learning techniques, such as word2vec. Another example measure may be based on N-gram similarity, and so on. For two same or similar search queries, the system 324 may monitor which results are selected by users. If certain search results are commonly selected, then the system 324 may update the Universal Sentence Encoder to cause the relevant portions of the certain search results to be positioned closer in the learned feature space.

Furthermore, the machine learning system 324 may determine one or more topics associated with an article. The system 324 may additionally provide a weight or confidence for each of the topics. As described above, a topic modeler may be used. Example topic modelers may include latent semantic analysis (LSA), probabilistic latent semantic analysis (PLSA), additive regularization of topic models (ARTM), and so on. In some embodiments, the machine learning system 324 may determine a set of topics. The machine learning system 324 may then assign an article as being associated with one or more of the topics. In some embodiments, a tenant associated with the article aggregation system 100 may define the topics or a subset thereof. Thus, each tenant may have an associated topic model. In this way, a user may specify a particular topic when searching and the article aggregation system 100 may identify responsive articles.

The machine learning system 324 may store the above-described information in the article store. When an ingestor operates on a message received from the queue described in FIG. 3A, the ingestor may then aggregate (e.g., join) the machine learning information with the associated article. For example, the ingestor may obtain the article referenced in the message. In this example, the ingestor may additionally obtain the machine learning information described above. Any information generated by the collectors, such as the enrichment information described above, may be joined with the machine learning information. Thus, the article may benefit from disparate sources of analyses.

For example, an ingestor may assign topics determined by the machine learning system 324 to one or more fields of an article. In this way, the index/searching system 330 may use the topics for indexing. Thus, topics which have a greater score or confidence may be used to boost search relevance. In some embodiments, the machine learning system 324 may classify topics as being latent or not. For example, a latency topic may be one which does not exist in the source article. These topics may require special relevance treatment as it may be that they should not score as well as non-latent topics. Thus, latent topics may be assigned into separate fields of the article. In this way, the index/searching system 330 may properly index the latent and non-latent topics. The ingestor may additionally store the vectorized representation of the article described above. In some embodiments, the system may store the vectorized representation in a binary form. It may be appreciated that storing an array of numbers in an index may not preserve order.

Figure 3C:
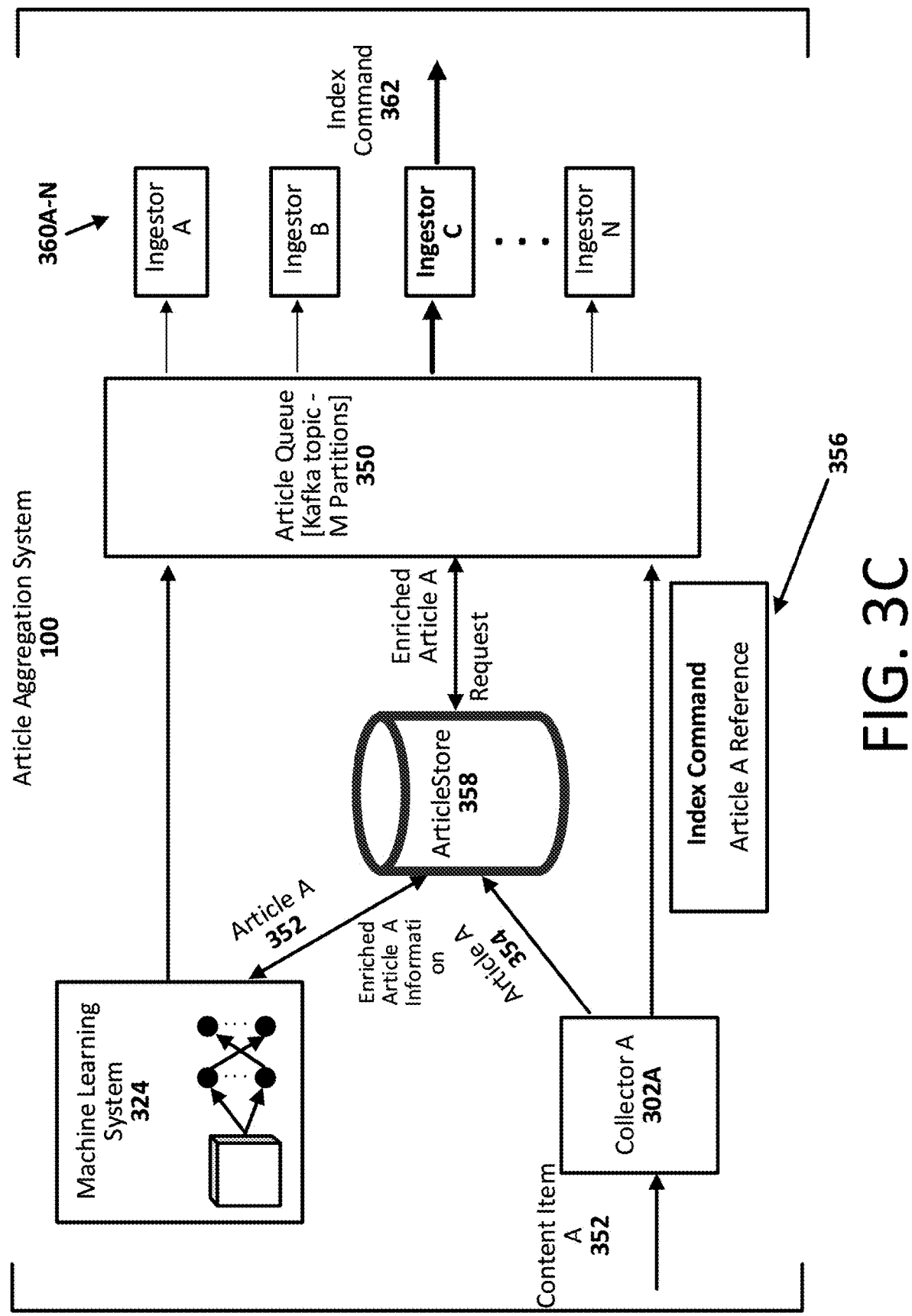
FIG. 3C is a block diagram illustrating the article aggregation system indexing an example content item.

FIG. 3C is a block diagram illustrating the article aggregation system 100 indexing an example article 352. As illustrated, collector A 302A has obtained content item A 352 from a content provider. Collector A 302A has then generated article A 354 in accordance with the techniques described herein. article A 354 is then stored in the article store 358. The machine learning system 324 has obtained article A 354 and determine machine learning information as described above. This machine learning information is then stored in article store 358.

Collector A 302A may issue a message 356 associated with indexing article A 345. As illustrated, the message 356 may include a reference to article A. For example, a hash of the article may be generated (e.g., MD5, SHA, and so on). The message 356 may then be received by the article queue 350. In some embodiments, the article queue 350 may be a Kafka topic comprising N partitions. Within a partition, messages may be serialized. A particular partition may be selected based on the reference to article A. For example, the hash of the article may be used to select the partition. In this way, a delete message associated with this article may be ensured to be processed by the same partition. Thus, the delete command will be serialized with index commands for a given article.

The ingestors 360A-N may obtain messages from the article queue, for example as described above with respect to at least FIG. 1C. In some embodiments, each ingestor may have a threshold number of threads (e.g., java virtual machine threads). Each thread may be dynamically assigned a set of partitions in the article queue 350. As an example, there may be eight ingestors with four threads each and the number of partitions may be set to 64. In this example, each thread may receive messages from two partitions. The partition management may be automatically balanced. For example, Kafka may be used to balance the partitions such that partitions may be reassigned according to demand or if an ingestor is shutdown or spun up. In this way, the ingestors may be readily scaled.

In the illustrated example, ingestor C 360C received the message from the article queue 360. In response, ingestor C 360C may obtain article A 354 and associated information (e.g., machine learning information, enrichment information) from the article store 358. Ingestor C 360C may then provide an index command, 362 for example to the indexing/search system 330 described above.

Figure 4:
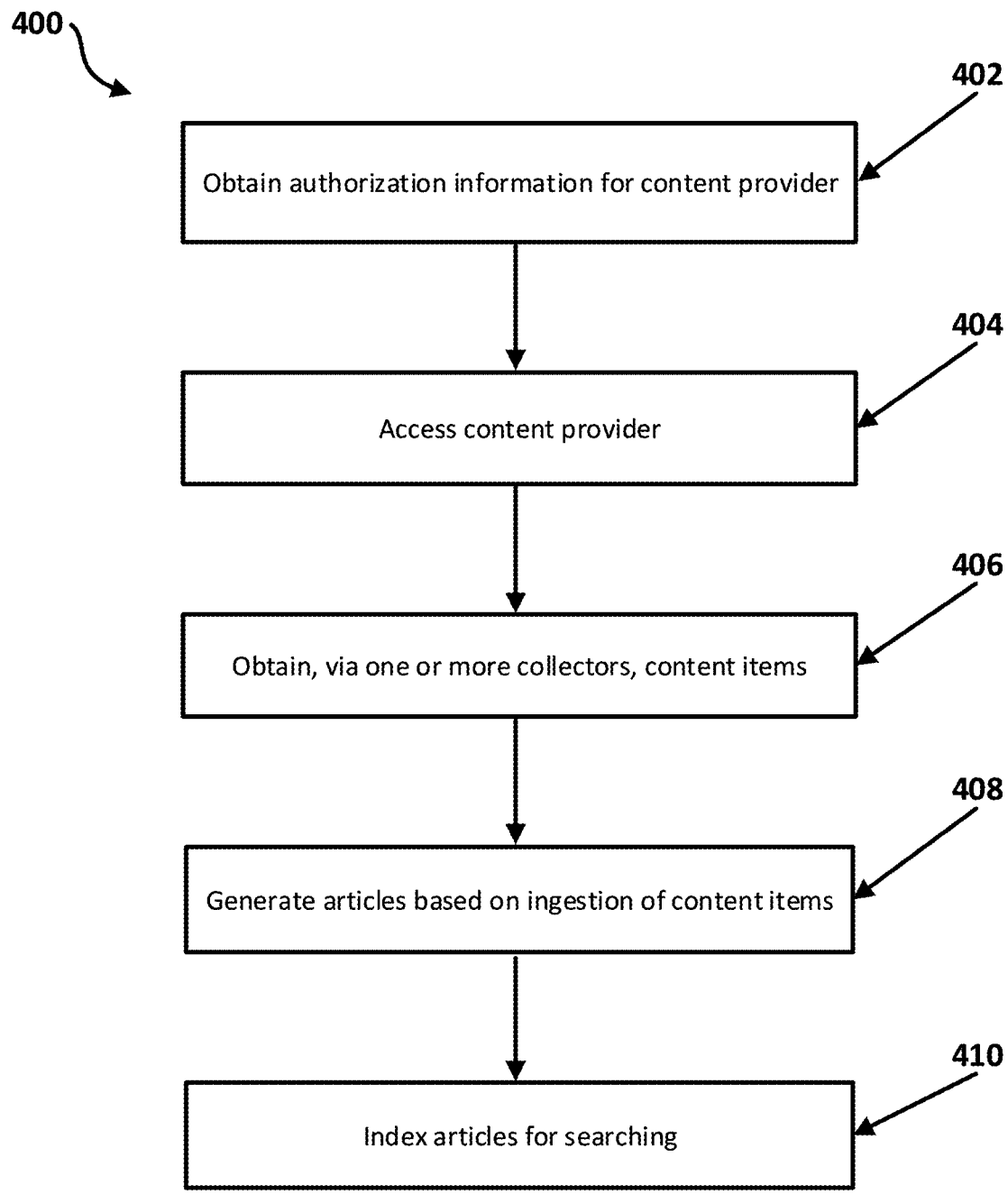
FIG. 4 is a flowchart of an example process for indexing content items using collectors.

FIG. 4 is a flowchart of an example process 400 for indexing articles using collectors. For convenience, the process will be described as being performed by a system of one or more computers (e.g., the article aggregation system 100).

At block 402, the system obtains authorization information associated with content providers. At block 404, the system accesses a content provider. At block 406, the system obtains content items via collectors. For example, one or more collectors may be assigned for use with the content provider. These collectors may obtain content items according to a collection strategy, for example as described above.

At block 408, the system generates articles based on the content items. As described above, with respect to at least FIG. 2, the system may generate an article for each content item. For example, the system may generate one or more fields comprising information for indexing. The fields may include information determined using machine learning techniques, such as topics and/or a vectorized representation of the content item. Additionally, the fields may include information identifying a source (e.g., the content provider), one or more authors (e.g., users who created or modified the content item), time stamp information, and so on.

At block 410, the articles are indexed for searching. As described above, the system may index the articles based on included text, images, audio, and the information included in the fields.

As described above, the article aggregation system 100 may determine access rights or permissions with respect to articles generated from content items. For example, a content item may represent a customer support ticket. In this example, a content provider which enables creation of such support tickets may constrain access to the customer support ticket. As an example, the content provider may only allow a user who created the ticket to have visibility of the ticket. As another example, the content provider may allow the user who created the ticket and one or more additional users to have visibility. As another example, the content provider may allow all users who are on a particular team (e.g., customer support team) to access the ticket.

It may be appreciated that such access rights or permissions are an important technique to ensure, at least, privacy amongst users. Thus, content providers may provide for varying schemes in which such privacy may be maintained. As described above, certain content providers may allow for such techniques as an access-control lists, role-based control lists, and so on.

Advantageously, the article aggregation system 100 may assign a representation of these access rights or permissions to each article stored by the system 100. As described herein, the representations are referred to as security identifiers (SIDs).

Figure 5A:
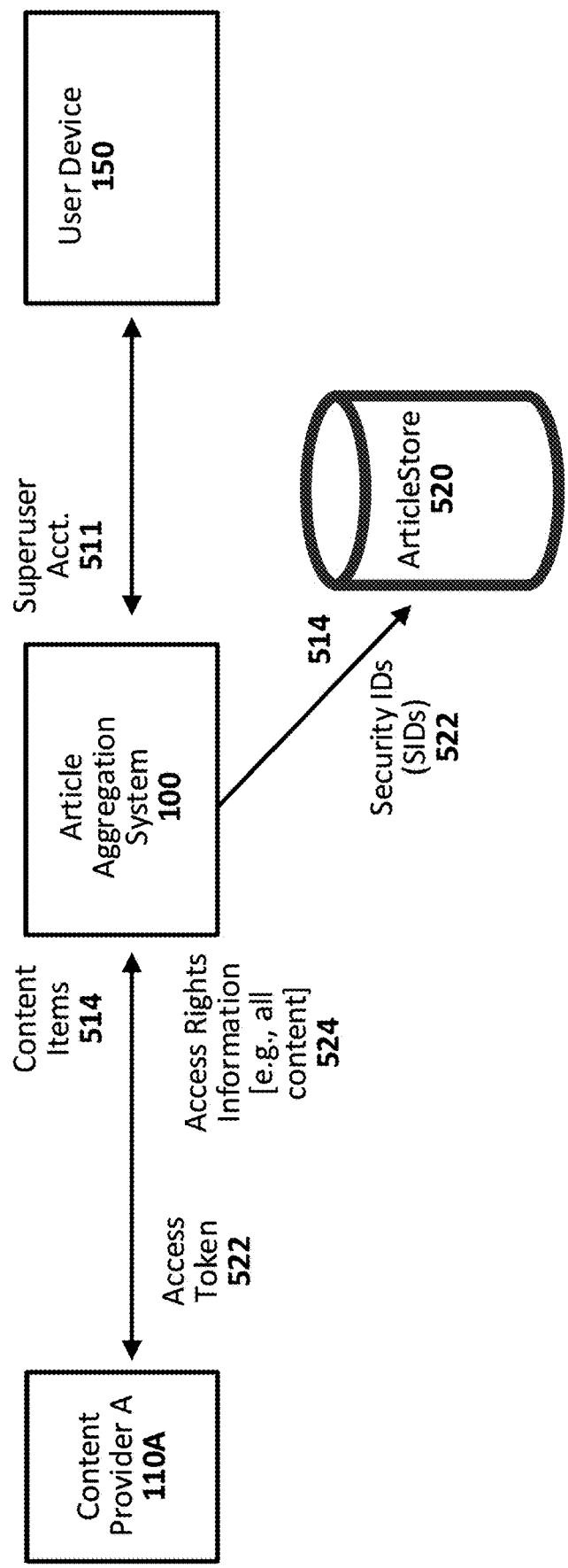
FIG. 5A is a block diagram illustrating an article aggregation system determining security identifiers.

FIG. 5A is a block diagram illustrating an article aggregation system 100 determining security identifiers. FIG. 5A illustrates a superuser account 511 being authenticated with by a user of user device 150. As described above, particular content providers may allow for an administrative or IT-provisioned account. Thus, this superuser account 511 may have full visibility with respect to content items stored by content provider A 110A.

As illustrated, the article aggregation system 100 has provided an access token associated with this superuser account 511. In response, the article aggregation system 100 may be able to access the entirety of the content items 514 associated with a tenant of the article aggregation system 100. For example, the article aggregation system 100 may access content items 514 associated with any user of the tenant (e.g., any employee of a business).

Additionally, the article aggregation system 100 may receive access rights information 524. In some embodiments, the access rights information 524 may be obtained as metadata from content provider A 110A. For example, the content provider A 110A may respond to application programming interface (API) calls or endpoints. One or more of these API calls or endpoints may be associated with access rights information 524. Thus, the article aggregation system 100 may use the APIs to rapidly obtain all content items 514 and their associated access rights information 524.

Some content providers may not provide for an API which identifies access rights associated with content items. Thus, in some embodiments the article aggregation system 100 may simulate a user using a front-end interface associated with content provider A 110A. For example, an agent may be used which leverages machine learning techniques. In this example, the agent may traverse each content item and request an indication of access rights. For example, the agent may 'right click' on a content item, and select an option to view access rights. These access rights may then be recorded. As an example, the front-end interface may specify user account names. The article aggregation system 100 may identify the corresponding users of the system 100 who have such user account names with content provider A 110A. In this way, the article aggregation system 100 may automatically extract access rights information 524.

The system may then generate articles based on the obtained content items 514. These generated articles may be stored in the article store 520. As will be described in more detail below, with respect to FIG. 6A, the article aggregation system 100 may determine security IDs for the generated articles. The security IDs may be stored with, or otherwise associated with, the articles in the article store 520.

In this way, the article aggregation system 100 may obtain content items using a single superuser account 511, but then determine individual access rights for all users associated with the tenant. This may result in an increase at which content items may be ingested by the article aggregation system 100.

Figure 5B:
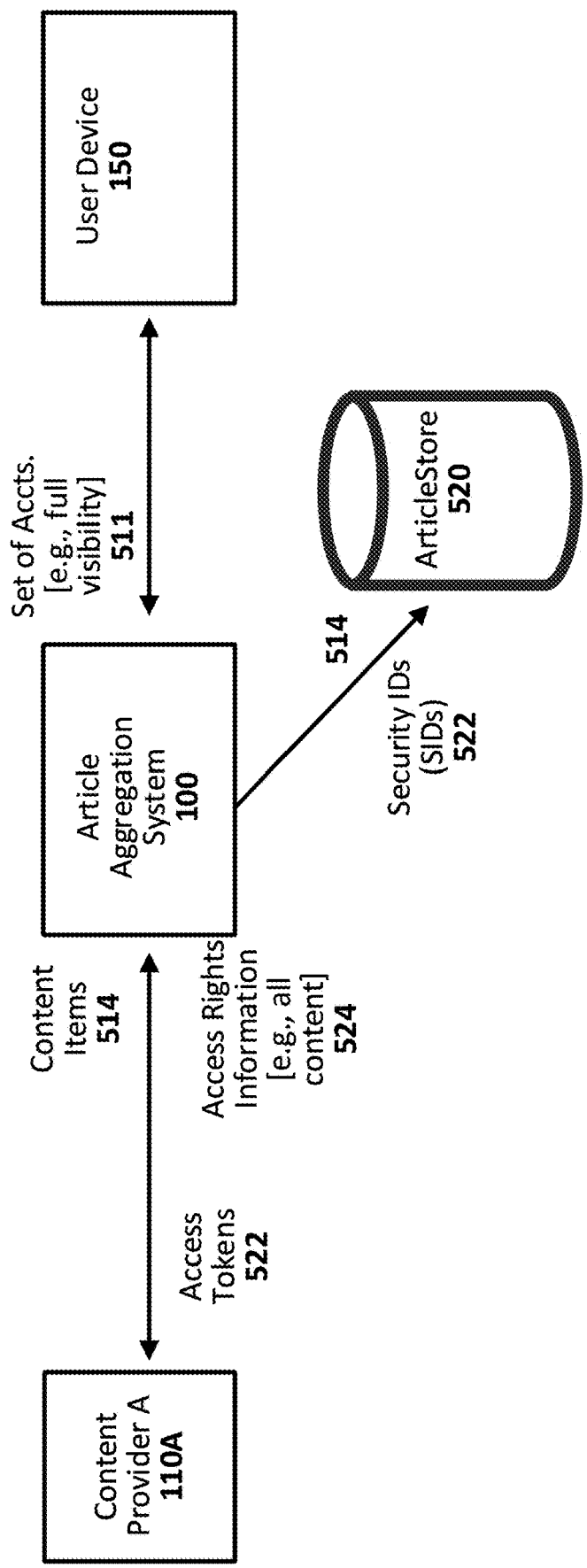
FIG. 5B is another block diagram illustrating the article aggregation system determining security identifiers.

FIG. 5B is another block diagram illustrating the article aggregation system 100 determining security identifiers. In some embodiments, full visibility into content items stored by content provider A 110A may be implemented using a set of user accounts 511. For example, the set of user accounts 511 may represent a set of administrative or IT-provisioned accounts for different departments associated with a tenant. As another example, the set of user accounts 511 may represent management or some set of user accounts which, in combination, is required to have full visibility into content items stored by content provider A 110A.

Similar to the description of FIG. 5A, the article aggregation system 100 may use access tokens 522 to obtain content items 514 from content provider A 110A. Additionally, the article aggregation system 100 may obtain access rights information associated with the content items 524. The article aggregation system 100 may then generate articles, and determine security IDs 522 for the articles. The articles and security IDs 522 may be stored in the article store 520.

Figure 5C:
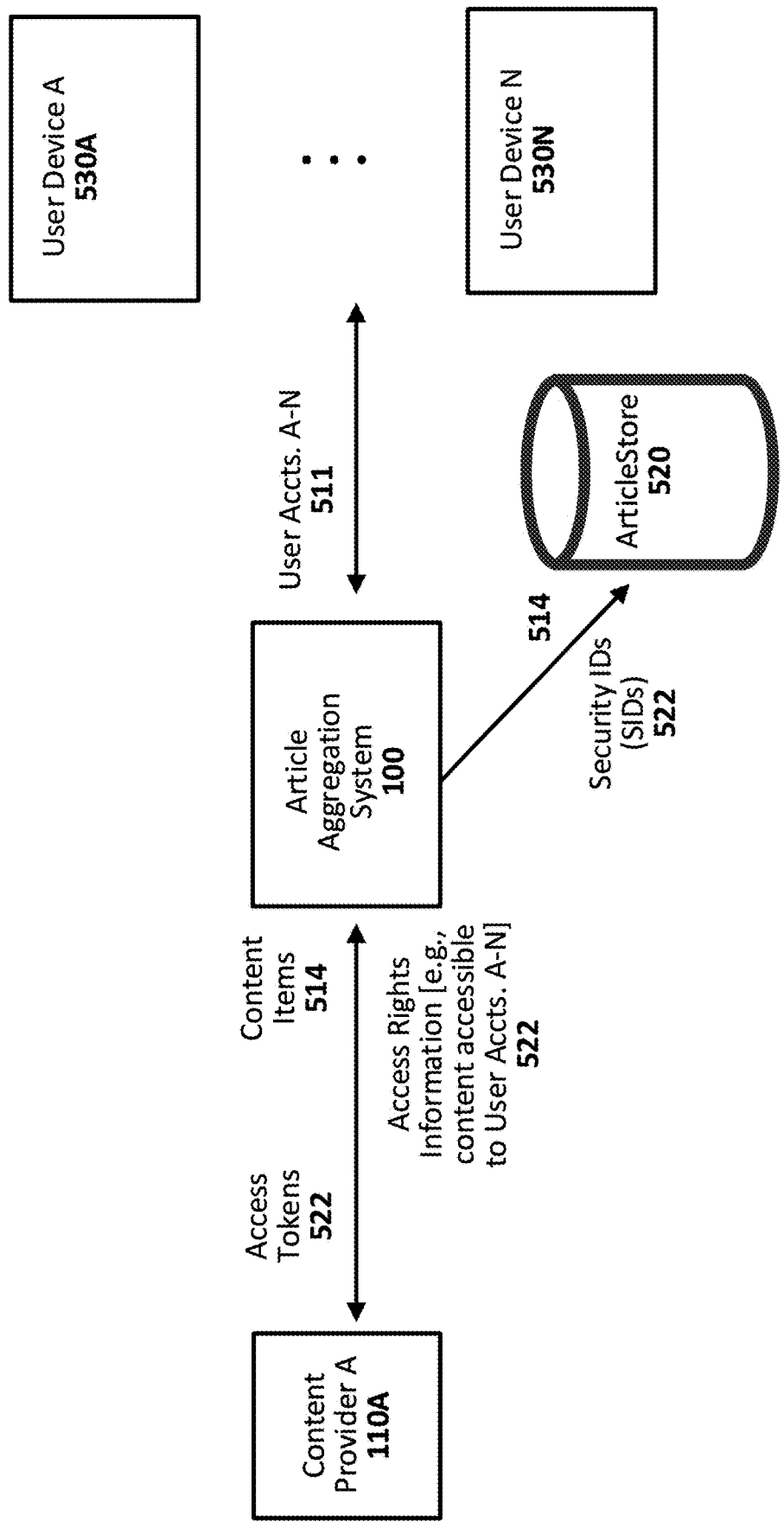
FIG. 5C is another block diagram illustrating the article aggregation system determining security identifiers.

FIG. 5C is another block diagram illustrating the article aggregation system 100 determining security identifiers. In this example, the article aggregation system 100 may use access tokens associated with any user of the system 100 who has a user account with content provider A 110A. That is, all user accounts 511 may be used. Similar to the above, the article aggregation system 100 may obtain content items 514 for the user accounts 511. Additionally, the article aggregation system 100 may obtain access rights information for each of the user accounts. It may be appreciated that particular content items may be replicated, such that multiple user accounts may have visibility into a same content item. The article aggregation system 100 may optionally store a single copy of this content item.

The article aggregation system 100 may then generate articles based on the obtained content items 514 and determine security IDs 522 for the articles. The articles and the security IDs 522 may then be stored in the article store 520.

Figure 6A:
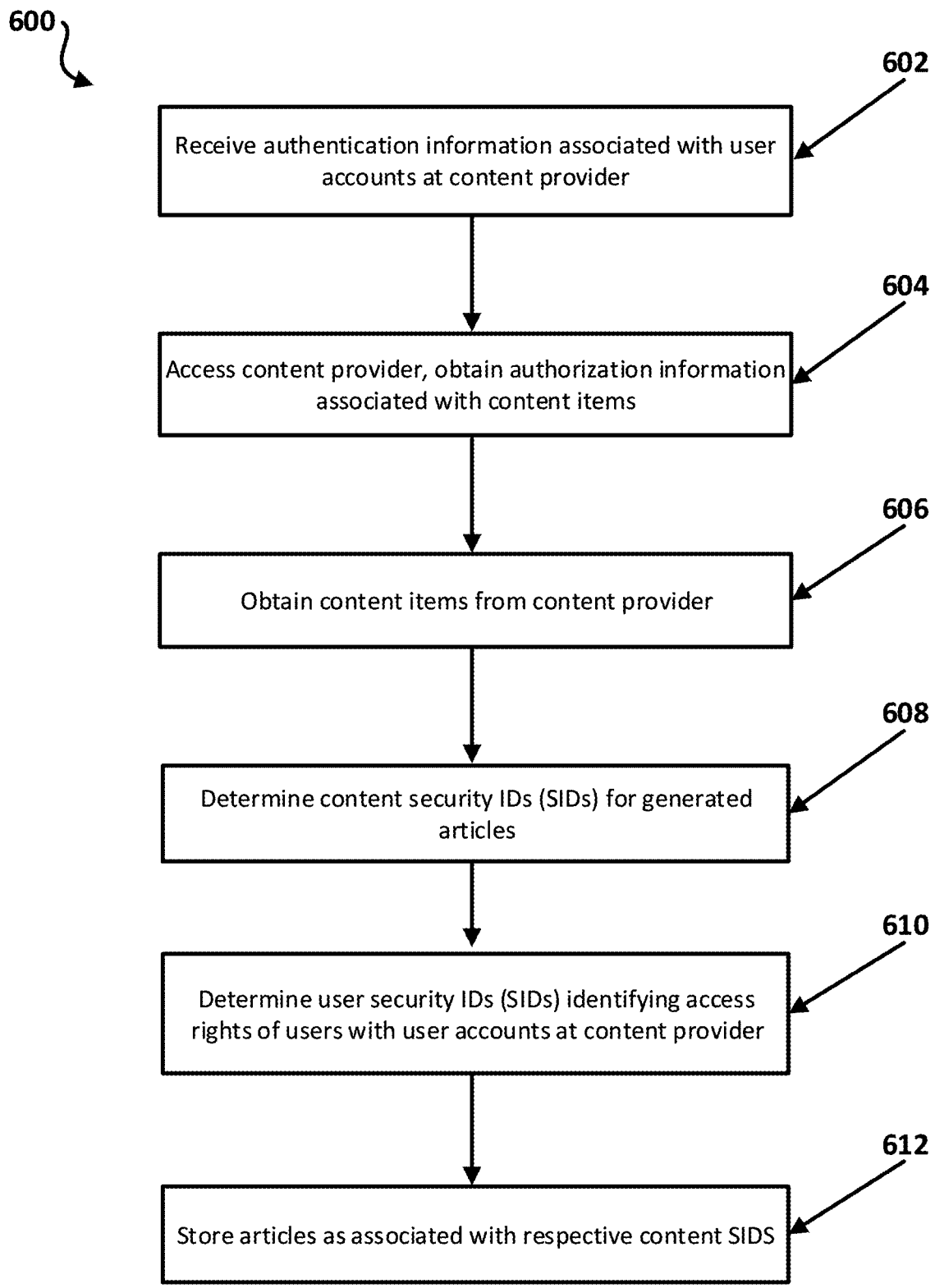
FIG. 6A is a flowchart of an example process for determining security identifiers.

FIG. 6A is a flowchart of an example process 600 for determining security identifiers. For convenience, the process 200 will be described as being performed by a system of one or more computers (e.g., the article aggregation system 100).

At block 602, the system receives authentication information associated with user accounts of a content provider. At block 604, the system accesses the content provider and obtains authorization information associated with the content items. For example, the system may use one or more application programming interface (API) calls or endpoints. At block 606, the system obtains content items and generates articles based on the content items.

At block 608, the system generates content security identifiers (SIDs) for the articles. Reference will now be made to a series of tables. However, it may be appreciated that one or more of the tables may not be used or generated by the system. For example, the system may determine content SIDs according to a different technique or may reduce a number of steps associated with determining the content SIDs. In the example below, the content provider may provide user-based permissions and group-based permissions. Additional types of permissions may be used and fall within the scope of the present disclosure.

TABLE 1

Content Provider Setup

| Resources | Explicit Group Access | Explicit User Access |
|---|---|---|
| /Taxes | G-Finance | U-Fin1 |
| /Taxes/2015 | (none, inherent from parent) | |
| /Taxes/2015/Doc1.docx | (none, inherent from parent) | |
| /Taxes/2016 | (none, inherent from parent) | |
| /Taxes/2016/Doc1.docx | (none, inherent from parent) | |
| /EngDocs | G-Eng | U-IT1 |
| /EngDocs/Git4All.pdf | (none, inherent from parent) | |

In Table 1 above, example resources are illustrated along with permission rights. For example, the folder '/Taxes' may be accessed by a particular group (e.g., G-Finance) and a particular user (U-Fin1). Thus, any user within the particular group may be authorized to access this folder. In this example, the content provider has specified that sub-folders of '/Taxes' are to inherit permissions from the parent.

TABLE 2

| User Group | Member |
|---|---|
| G-Finance | U1, U2, U-Fin1 |
| G-Eng | U-Eng1, U-Eng2, U1 |
| — | U-IT1 |

Table 2 above may be obtained from the content provider. This table may indicate which users are included in respective groups. For example, 'G-Finance' referenced above includes users, 'U1,' 'U2,' and 'U-Fin1'.

TABLE 3

SecurityGroup Hierarchy

| Id | Name | Type |
|---|---|---|
| 1 | G-Finance | SecurityGroup |
| 2 | G-Eng | SecurityGroup |
| 3 | U-Fin1 | SecurityUser |
| 4 | U1 | SecurityUser |
| 5 | U2 | SecurityUser |
| 6 | U-Eng1 | SecurityUser |
| 7 | U-Eng2 | SecurityUser |
| 8 | U-IT1 | SecurityUser |

Table 3 above describes each group and/or user along with corresponding type. For example, 'G-Finance' is illustrated as being a 'securitygroup.' Additionally, 'U-Fin1' is illustrated as being a 'securityuser.'

TABLE 4

Nested Security Groups

| Id | Left | Right |
|---|---|---|
| 1 | 1 (G-Finance) | 3 (U-Fin1) |
| 2 | 1 (G-Finance) | 4 (U1) |
| 3 | 1 (G-Finance) | 5 (U2) |

TABLE 4-continued

Nested Security Groups

| Id | Left | Right |
|---|---|---|
| 4 | 2 (G-Eng) | 6 (U-Eng1) |
| 5 | 2 (G-Eng) | 7 (U-Eng2) |
| 6 | 2 (G-Eng) | 4 (U1) |

Table 4 above captures user group memberships. That is, table 4 assigns an identifier to each mapping between a group and a user which is included in the group.

TABLE 5

| ID | Name | Email | System User ID | Comment |
|---|---|---|---|---|
| 1 | U-Fin1 | uf1@a.b | 1 | maps to SG.3 (U-Fin1) |
| 2 | U1 | u1@a.b | 2 | maps to SG.4 (U1) |
| 3 | U2 | u2@a.b | 3 | maps to SG.5 (U2) |
| 4 | U-Eng1 | ue1@a.b | 4 | maps to SG.6 (U-Eng1) |
| 5 | U-Eng2 | ue2@a.b | 5 | maps to SG.7 (U-Eng2) |
| 6 | U-IT1 | uit1@a.b | 6 | maps to SG.8 (U-IT1) |

Table 5 above identifies a unique identifier of a user of the system. That is, 'System User' is an assignment of a user of the system, which may be associated with a multitude of user accounts at different content providers. Thus, user account 'U-Fin1' at the content provider may map to 'System User ID' 1. This 'System User ID' 1 may similarly map to other user accounts at other content providers.

TABLE 6

| Id | Security Group ID | System User ID |
|---|---|---|
| 1 | 3 (SG: U-Fin1) | 1 (CU: U-Fin1) |
| 2 | 4 (SG: U1) | 2 (CU: U1) |
| 3 | 5 (SG: U2) | 3 (CU: U2) |
| 4 | 6 (SG: U-Eng1) | 4 (CU: U-Eng1) |
| 5 | 7 (SG: U-Eng2) | 5 (CU: U-Eng1) |
| 6 | 8 (SG: U-IT1) | 6 (CU: U-IT1) |

Table 6 may be used to simply mappings. For example, this table may associate each security group ID with a corresponding system user ID. As an example, 'System User ID' 1 was indicated in Table 5 as mapping 'U-Fin1'. Thus, Table 6 indicates that 'System User ID' 1 is associated with security group 3 as per Table 5.

TABLE 7

| Id | System User ID | Security Group ID |
|---|---|---|
| 1 | 1 (CNT: Taxes) | 1 (SG: G-Finance) |
| 2 | 1 (CNT: Taxes) | 3 (SG: U-Fin1) |
| 3 | 2 (CNT: 2015) | 1 (SG: G-Finance) |
| 4 | 2 (CNT: 2015) | 3 (SG: U-Fin1) |
| 5 | 4 (CNT: 2016) | 1 (SG: G-Finance) |
| 6 | 4 (CNT: 2016) | 3 (SG: U-Fin1) |
| 7 | 6 (CNT: EngDocs) | 2 (SG: G-Eng) |
| 8 | 6 (CNT: EngDocs) | 8 (SG: U-IT1) |

Table 7 above, maps folders identified in Table 1 with corresponding security group IDs. For example, 'Taxes' is mapped with both IDs '1' and '3' which correspond with 'G-Finance' and 'U-Fin1'. This example content provider has assigned the files within these folders as sharing permissions. However, it may be appreciated that the filers may be separately assignable. For example, the files may share separate permissions as that of their folders. The system may include one or more additional rows to reflect these more detailed assignments.

Based on the above information, the system may then determine content SIDs as illustrated in the following table.

TABLE 8

| Content | Security Group ID | Resultant SIDs |
|---|---|---|
| Doc1: C.3 2015 (C.2) Taxes (C.1) | G-Finance (SG.1), U-Fin1 (SG.3) | [1, 3] |
| Doc1: C.5 2016 (C.4) Taxes (C.1) | G-Finance (SG.1), U-Fin1 (SG.3) | [1, 3] |
| Git4All.pdf: C.7 EngDocs (C.6) | G-Eng (SG.2), U-IT1 (SG.8) | [2, 8] |

Table 8 illustrates the resultant content SIDs to be assigned to articles obtained from this content provider. For example, 'Doc1', folder '2015' and folder 'Taxes' are to be assigned content SIDs of [1,3].

At block 610, the system determines user security IDs (SIDs). With respect to the above described tables, the system may determine a mapping between system users and the determined SIDs. For example, the system may determine the following table.

TABLE 9

| System User | ContentUser | SecurityGroup(s) | Resultant SIDs |
|---|---|---|---|
| 1 | U-Fin1 (CU.1) | G-Finance (SG.1) U-Fin1 (SG.3) | [3, 1] |
| 2 | U1 (CU.2) | G-Finance (SG.1), G-Eng (SG.2) U1 (SG.4) | [4, 1, 2] |
| 3 | U2 (CU.3) | G-Finance (SG.1) U2 (SG.5) | [5, 1] |
| 4 | U-Eng1 (CU.4) | G-Eng (SG.2) U-Eng1 (SG.6) | [6, 2] |
| 5 | U-Eng2 (CU.4) | G-Eng (SG.2) U-Eng2 (SG.7) | [7, 2] |
| 6 | U-IT1 (CU.6) | U-IT1 (SG.8) | [8] |

Table 9 associates system users with SIDs. Thus, system user 1 may be determined by the system to correspond with 'U-Fin1' at the content provider. For example, this is illustrated in Table 5 above. Similarly, the system may then identify SIDs which are associated with 'U-Fin1'. In the illustrated example, the resultant SIDs are [1,3].

At search time, the system may determine resultant SIDs for each user account associated with a system user. For example, if system user 1 has provided a search query, then the system may identify all user accounts associated with system user 1. The system may then identify all resultant SIDs associated with any of these identified user accounts. These resultant SIDs may be used as a filter. Thus, only articles which are assigned at least one of these resultant SIDs will be surfaced for system user 1.

At block 612, the system stores the articles as being associated with the determined SIDs.

Figure 6B:
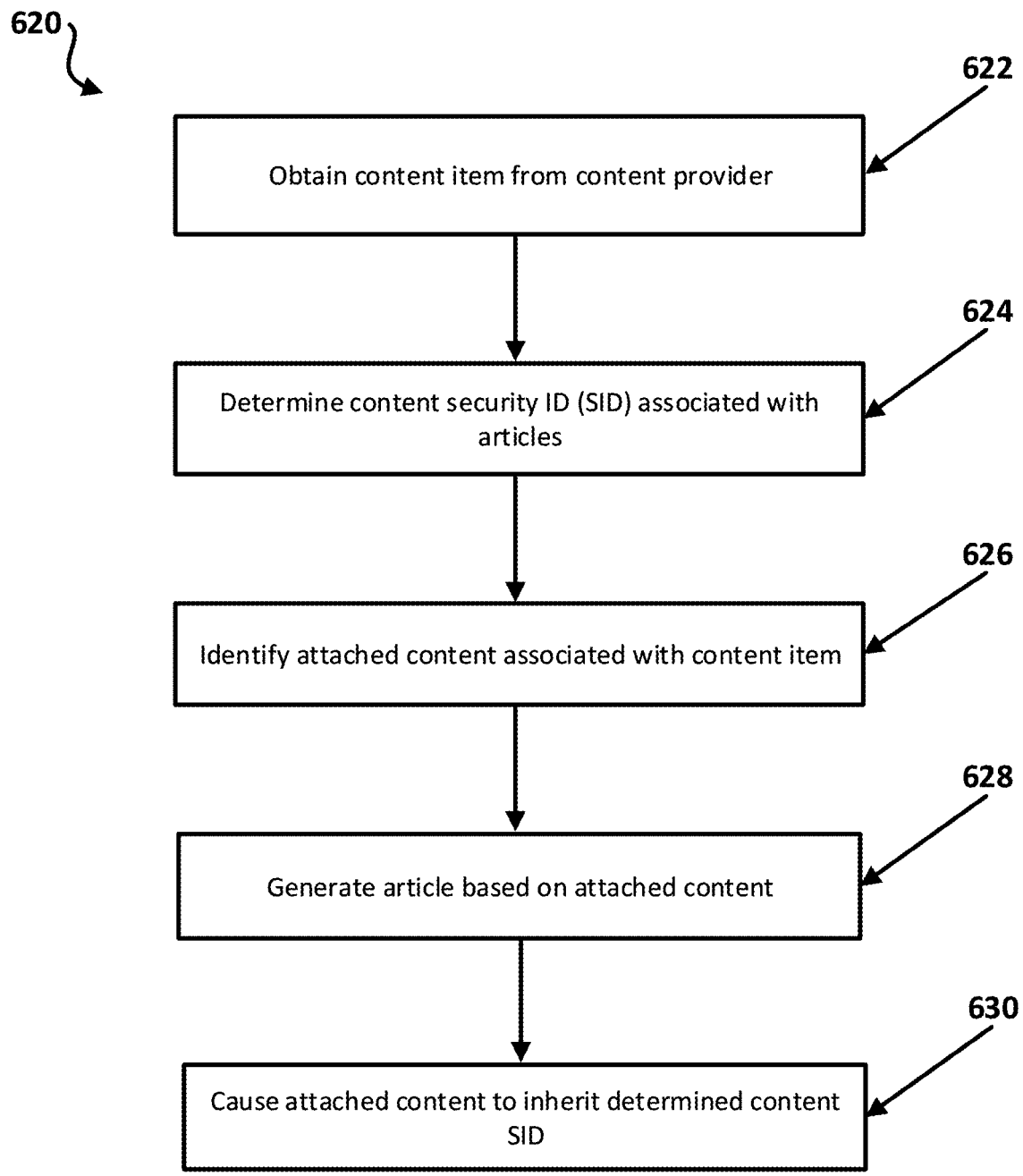
FIG. 6B is a flowchart of an example process for determining a security identifier of attached content.

FIG. 6B is a flowchart of an example process 620 for determining a security identifier of attached content. For convenience, the process 620 will be described as being performed by a system of one or more computers (e.g., the article aggregation system 100).

At block 622, the system obtains content items from a content provider. At block 624, the system determines content security IDs for articles generated from the content items.

At block 626, the system identifies that a received content item included attached content. For example, an email may have a document or .pdf attached to it. As another example, a message in a team communication tool may have an image or video attached to it.

At block 628 the system generates an article based on the attached content. Optionally, the system may generate an article separate from that of the parent content item. For example, the system may generate an article corresponding to the document attached to the email described above. In some embodiments, the system may generate a single article for the email and document.

At block 630, the system determines a content SID for the attached content. Since the content was attached, the system may assign the same permissions as the parent. For example, the system may assign the document referenced the same one or more content SIDs as the email.

Figure 6C:
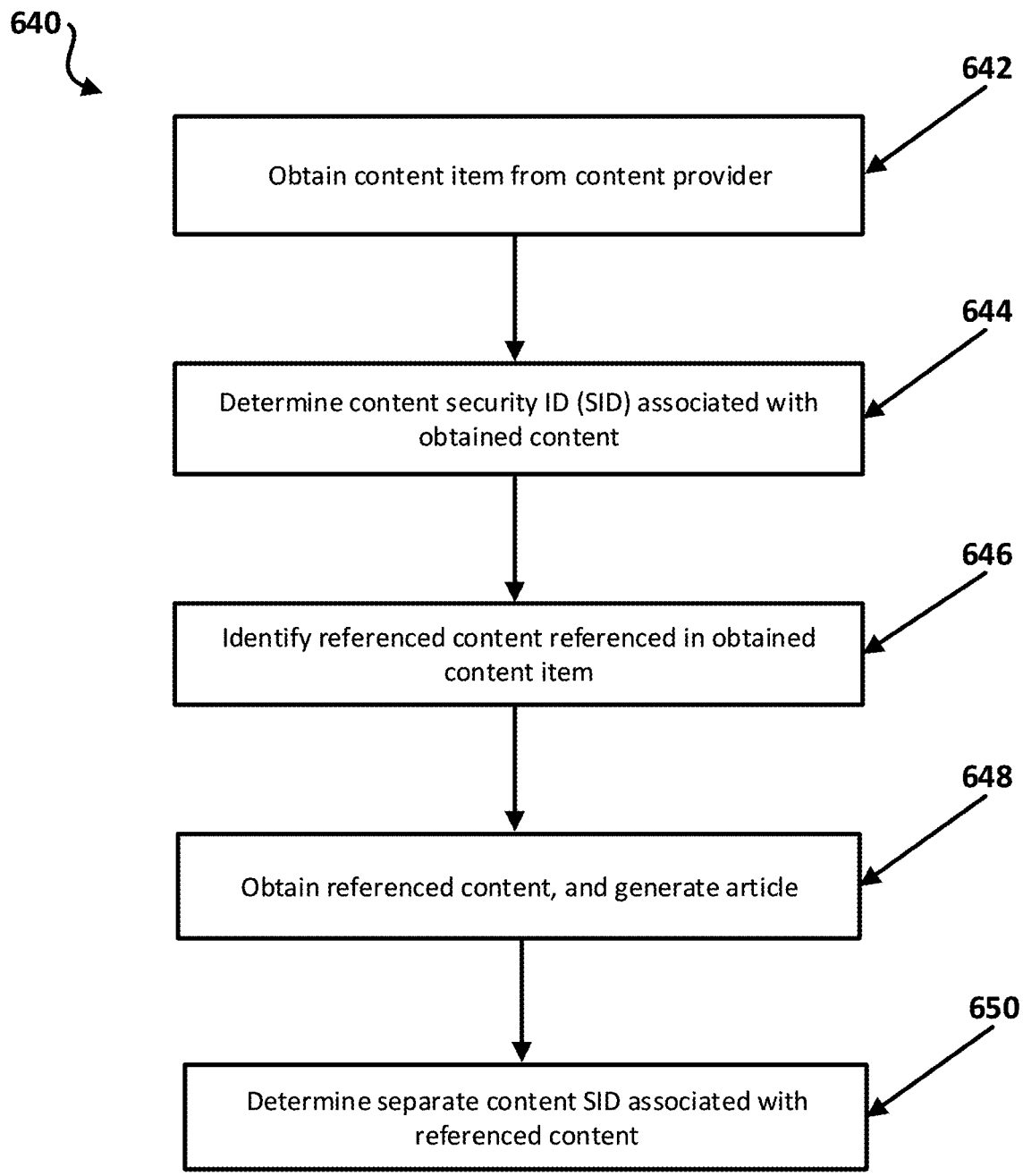
FIG. 6C is a flowchart of an example process for determining a security identifier of referenced content.

FIG. 6C is a flowchart of an example process 640 for determining a security identifier of referenced content. For convenience, the process 640 will be described as being performed by a system of one or more computers (e.g., the article aggregation system 100).

At block 642, the system obtains content items from a content provider. At block 644, the system determines content security IDs for articles generated from the content items.

At block 646, the system identifies that a received content item referenced content. For example, an email may have included a link to a document. As another example, a message in a team communication tool may have included a link from which an image may be accessible. For example, these links may be links to a cloud storage provider (e.g., BOX) or to an issue tracking application (e.g., JIRA).

At block 648 the system generates an article based on the attached content. Optionally, the system may generate an article separate from that of the parent content item. For example, the system may generate an article corresponding to the document referenced in the email described above. In some embodiments, the system may generate a single article for the email and document.

At block 650, the system determines a content SID for the attached content. Since the content was referenced, the system may assign unique content SIDs for this referenced content. For example, if the link was to a cloud storage provider, then the system may obtain the referend content. The system may then determine content SIDs for this referenced content according to the techniques described herein. Thus, the referenced content may have different content SIDs than the content item in which it was referenced.

As an example, a link to a cloud storage provider may have been included in an email or message. The email or message may have been available to a first set of users. However, only a second, smaller, set of these users may have access rights to actually open the link via the cloud storage provider. Thus, it may not make sense to assign the same content IDs to the referenced content as the email or message. In this way, the system may assign unique content IDs. In some embodiments, the system may assign a link to content which is accessible via the public internet the same content IDs as the content item in which it was referenced. In some embodiments, the system may assign a link to content which is accessible via the public internet content IDs enabling access by any user of the system.

Figure 7A:
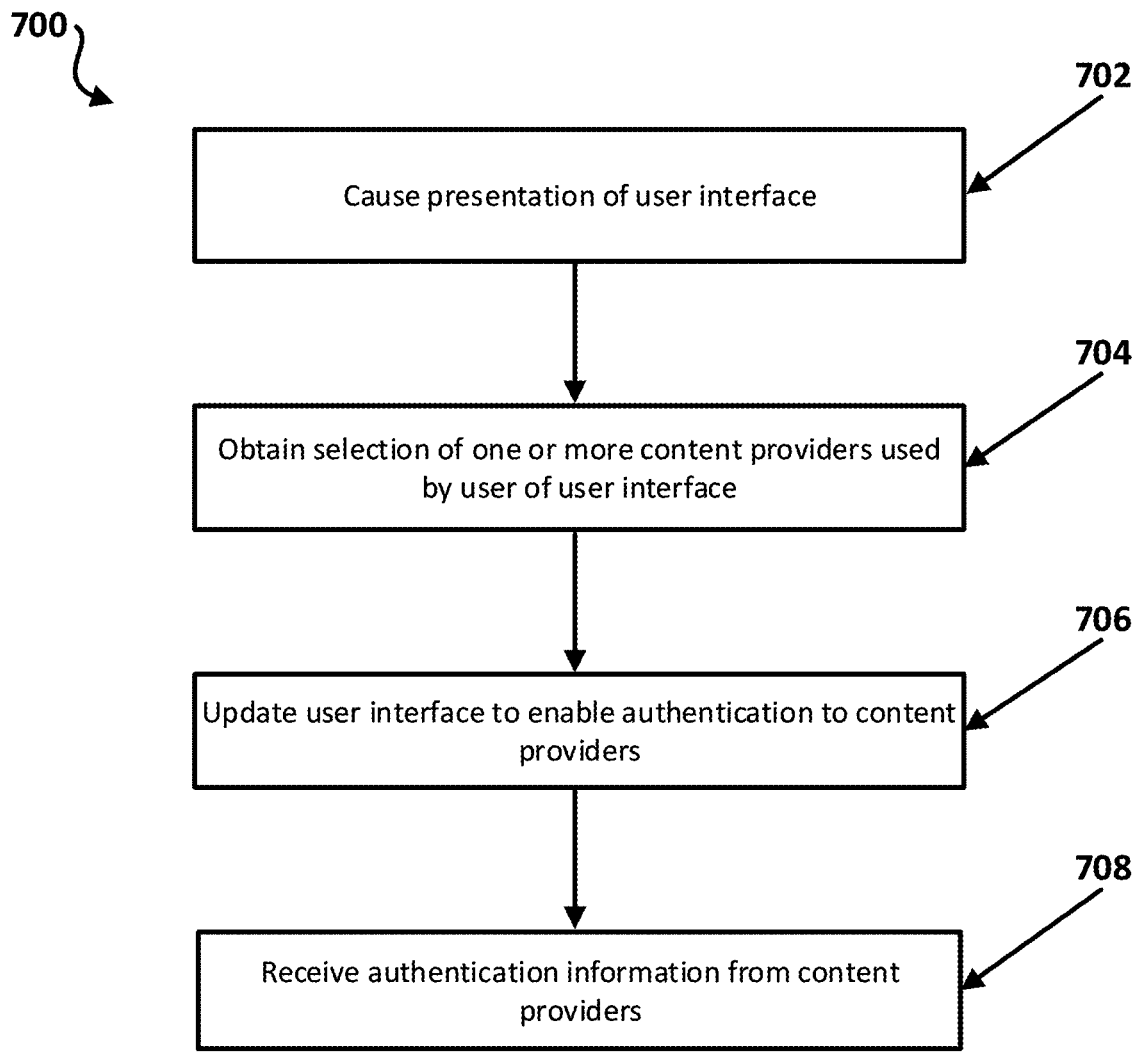
FIG. 7A is a flowchart of an example process for user onboarding.
Figure 7B:
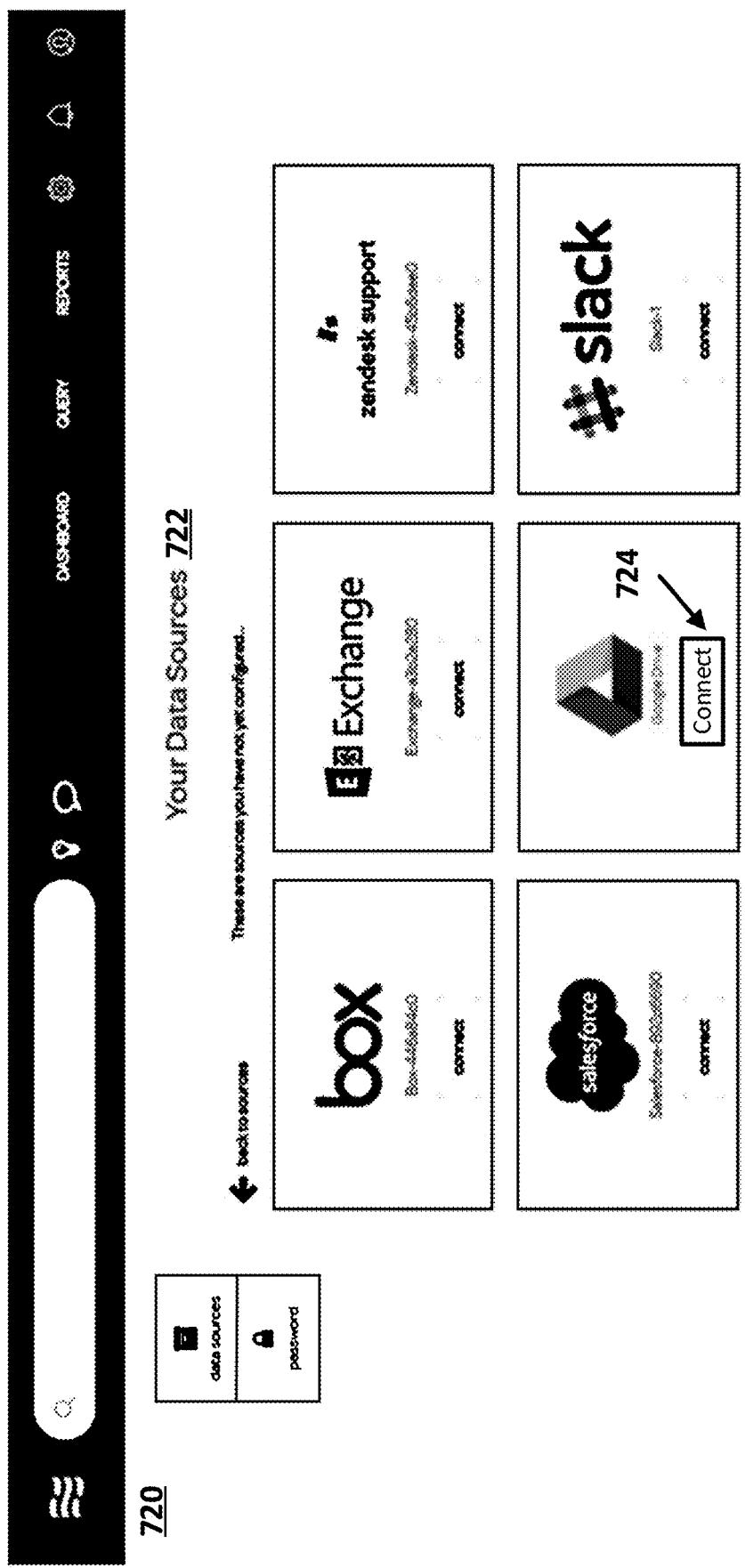
FIG. 7B is an example user interface identifying content providers for selection.
Figure 7C:
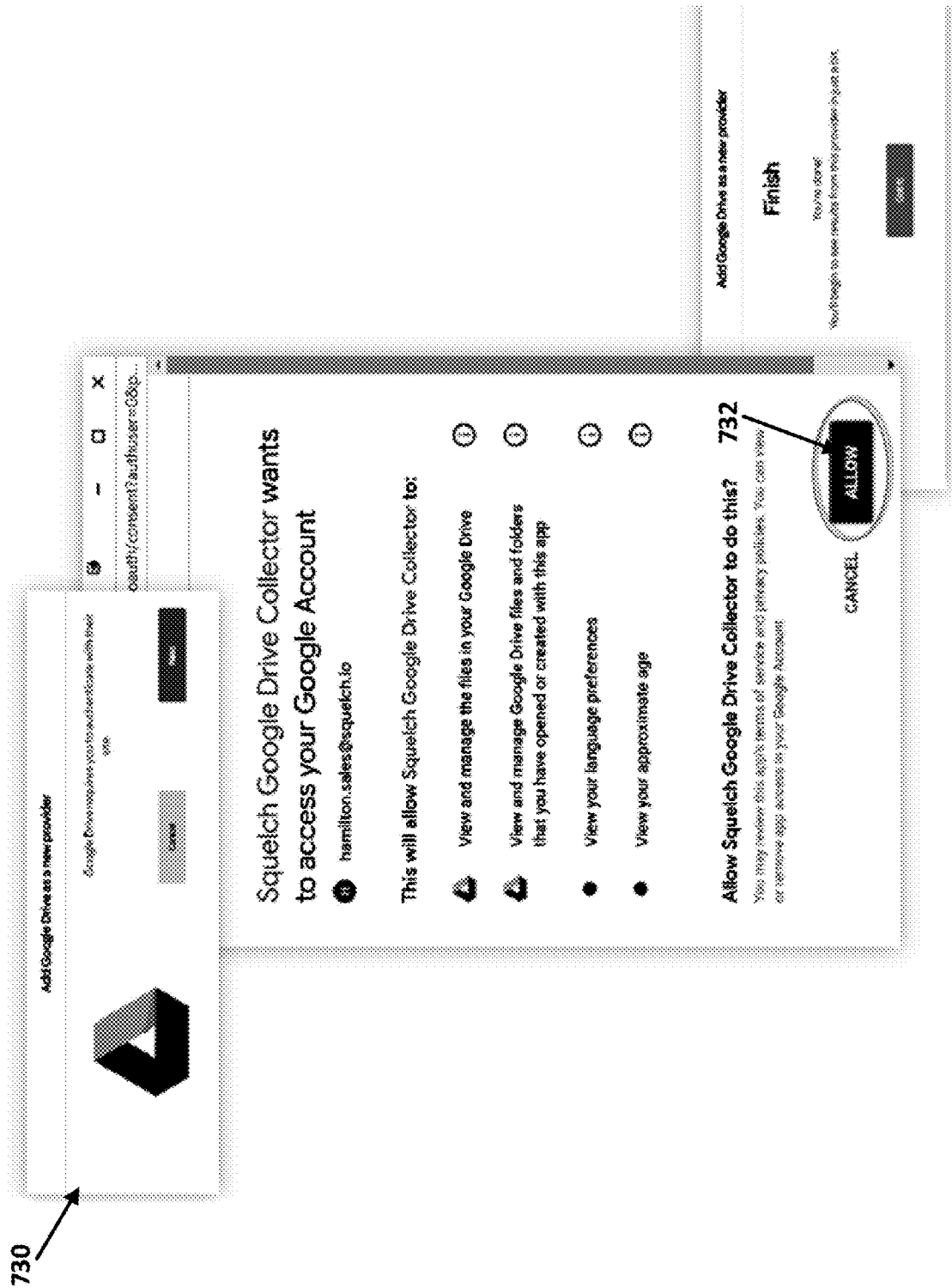
FIG. 7C is an example user interface enabling the article aggregation system to be authorized to access a selected content provider.

FIG. 7A is a flowchart of an example process 700 for user onboarding. For convenience, the process 700 will be described as being performed by a system of one or more computers (e.g., the article aggregation system 100).

At block 702, the system causes presentation of a user interface. As described above, a user of the system may access the system via an application on the user's user device. The user may also access a front-end interface via a browser on the user's user device. For example, a web application may be accessed by the browser.

At block 704, the system obtains selection of one or more content providers. Reference will now be made herein to FIG. 7B. FIG. 7B is an example user interface 720 identifying content providers 722 for selection. The user may provide input to one or more of the content providers with which the user has user accounts. In the example of FIG. 7B, the user has selected 'GOOGLE DRIVE.'

At block 706, the system updates the user interface to enable authentication to content providers. Reference will now be made herein to FIG. 7C. FIG. 7C is an example user interface 730 enabling the article aggregation system 100 to be authorized to access a selected content provider. The content provider may cause presentation of user interface 730, for example the application being used by the user may call the content provider via code associated with the content provider. In the illustrated example, the user has indicated that the system is allowed 732 to access GOOGLE DRIVE.

At block 708, the system receives authentication information from the content providers. For example, the system may receive an access token (e.g., an OAuth or OAuth 2.0 token) associated with GOOGLE DRIVE.

Figure 7D:
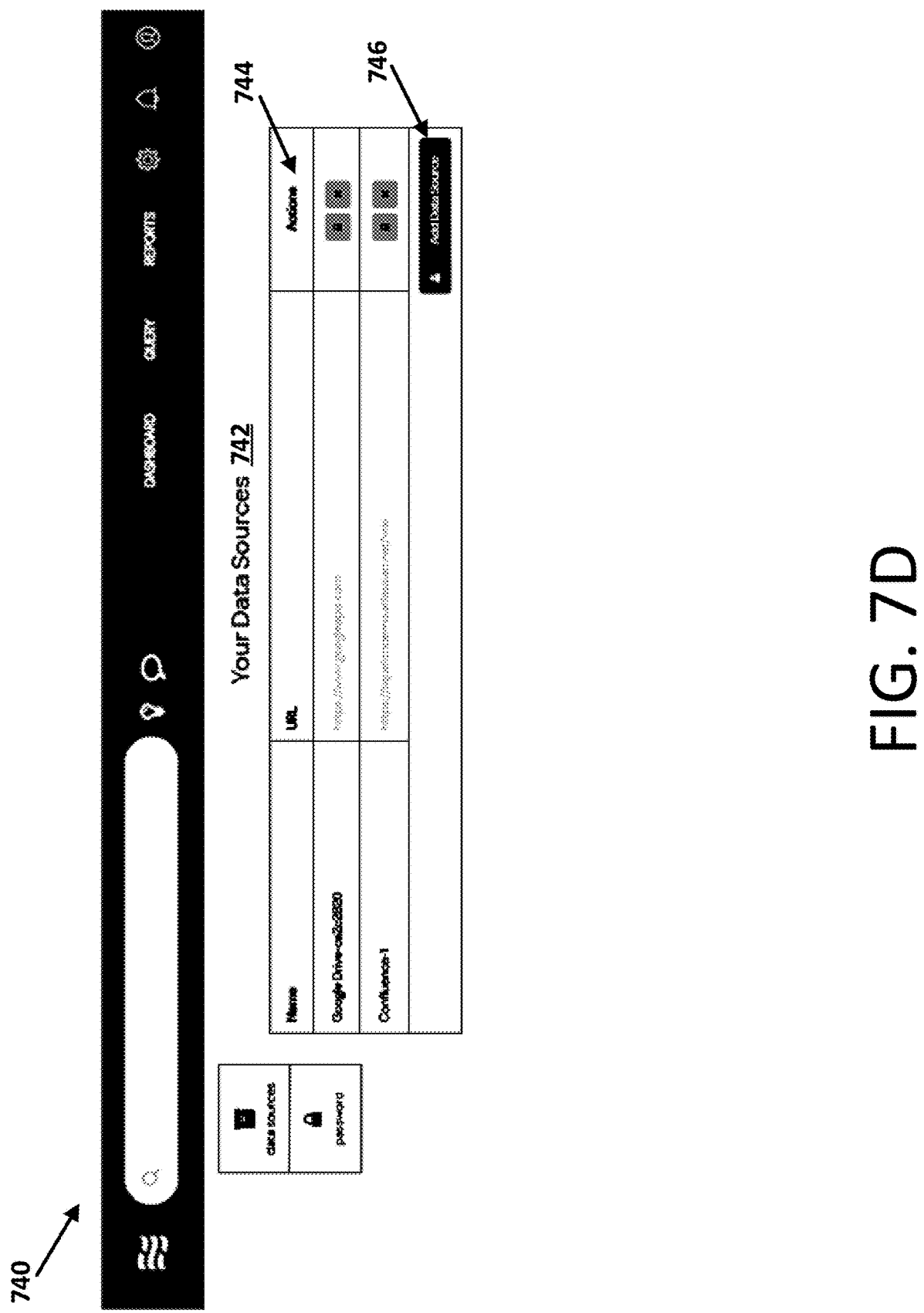
FIG. 7D is an example user interface to add content providers.

FIG. 7D is an example user interface 740 to add content providers. In the illustrated example, the user may perform one or more actions with respect to established data sources. For example, the user may remove the data sources or lock them from being used. The user may also interact with visual element 746 to add one or more additional data sources.

Figure 7E:
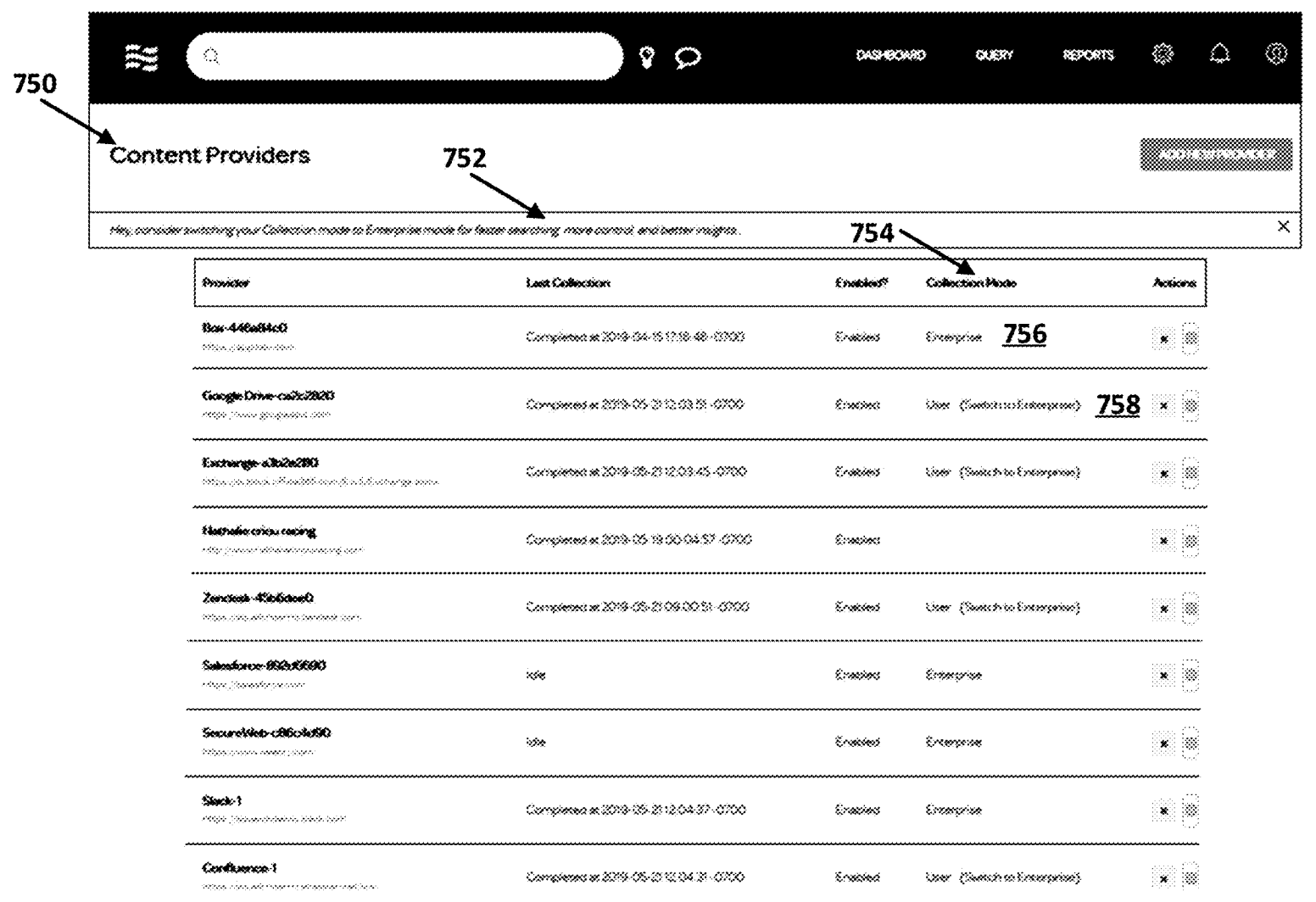

FIG. 7E is an example user interface 750 to adjust collection methods of content providers. As described above, the article aggregation system 100 may leverage different collection methods depending on the capabilities of respective content providers. For example, a first content provider may use a single IT or administrative account (e.g., method 756). As another example, a second content provider may require the system 100 to use access tokens for each user with a user account with the content provider (e.g., method 758).

User interface 750 identifies collection methods 754 for a multitude of content providers. Additionally, user interface 750 helpfully points out that adjusting the collection method to a single administrative account may increase efficiency and speed. Thus, the user of user interface 750 may adjust a particular content provider from a user-based collection method to an enterprise (e.g., administrative) collection method 758. Advantageously, the article aggregation system 100 may monitor collection methods available at content providers. Thus, if a content provider suddenly enables such an enterprise collection method, the user interface 750 may update to enable this adjustment.

Figure 8:
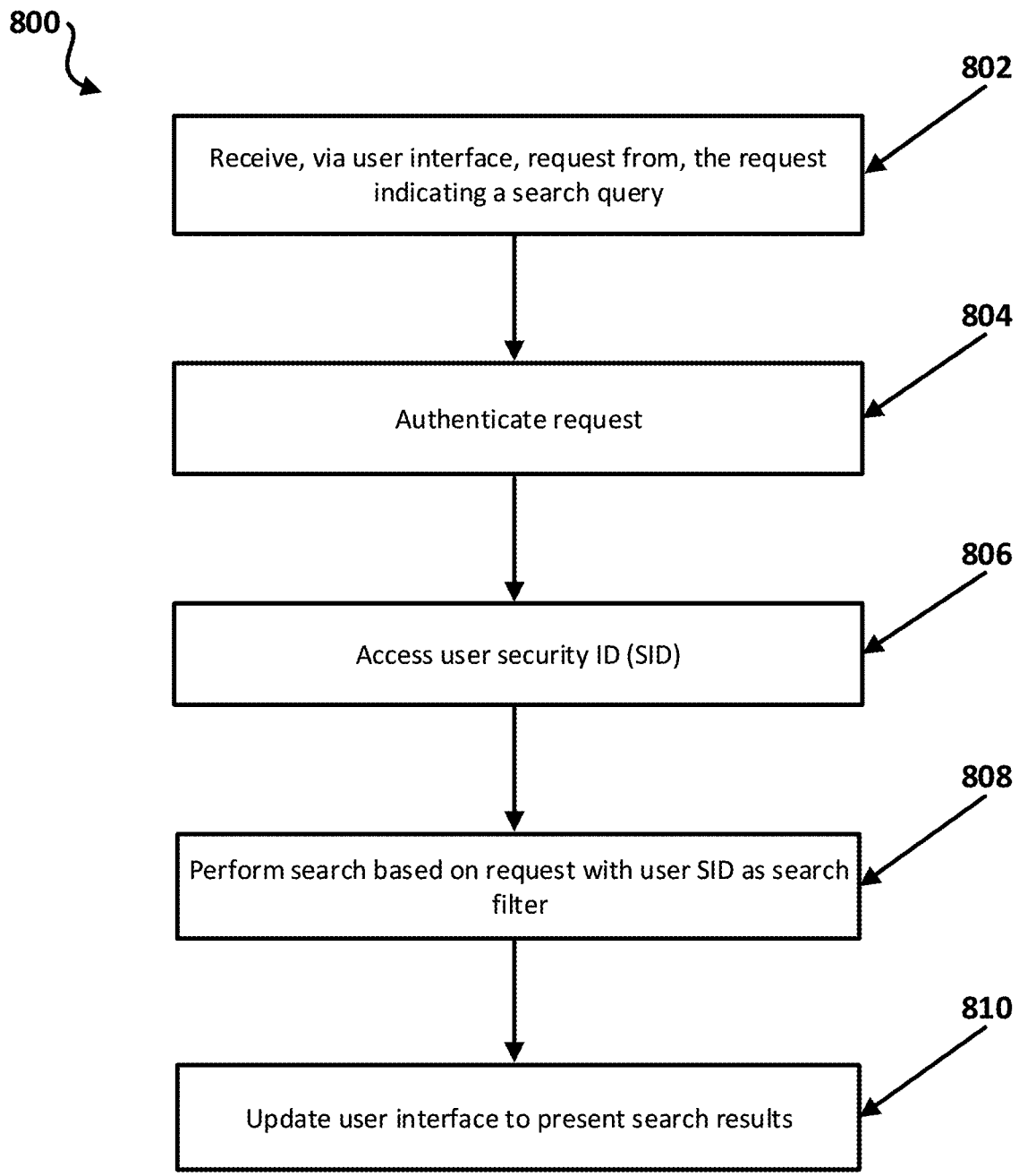
FIG. 8 is a flowchart of an example process for searching aggregated content according to the techniques described herein.

FIG. 8 is a flowchart of an example process 800 for searching aggregated content according to the techniques described herein. For convenience, the process 800 will be described as being performed by a system of one or more computers (e.g., the article aggregation system 100).

At block 802, the system receives a request indicating a search query from a user of the system. For example, the user may be using an application associated with the system. The user may also be using an application associated with a content provider. In this example, the application may include a module or add-on associated with the system.

At block 804, the system authenticates the request. The system may validate that the user is authorized to provide search queries. Additionally, the system may validate the user is accessing the system via established means. For example, the system may use a particular protocol.

At block 806, the system accesses one or more user security IDs (SIDs) associated with the user. As described above, with respect to at least FIG. 6A, user security SIDs may be determined for each user. These may inform the access or permission rights of the user.

At block 808, the system performs the search based on the request. The system may use the security IDs as a filter, such that only articles assigned the same security IDs may be surfaced. Additionally, the system may perform the search using the techniques described herein. For example, the system may access a tenant profile associated with the user. In this example, the tenant profile may specify custom information or preferences associated with the tenant. As described above, users associated with a same tenant may specify custom preferences. For example, the users may indicate that certain terms are to be provided greater weight or that certain terms have associated synonyms.

The system may optionally use Elasticsearch, and define certain terms which are required for matching (e.g., must or not clauses). The system may then determine boosting strategies. As described above, a boosting strategy may indicate that search result scores may be increased if all search query terms are found exactly in the order provided, or scores are increases to a lesser extent if bigrams are found. The system may additionally leverage machine learning information determined above. For example, the system may boost certain search results if they are directed to a topic the user specifies via the search query or search interface.

At block 810, the system updates the user interface to present search results. As described above, the system may present snippets of articles included in the search results. These snippets may optionally represent a portion of the article which is determined to be most similar to the search query. Furthermore, the articles included in the search results may include highlighting corresponding to portions of the article which are determined to satisfy the search query.

In some embodiments, the user may refine the search results. For example, the user may request similar articles to an article included in the search results. In this example, the system may use a similarity model provided the machine learning techniques described above. As an example, the system may use the vectorized representation of the selected article to locate other articles within a threshold distance of the vectorized representation in a learned feature space. The threshold distance may be, for example, determined according to a cosine distance.

Optionally, the user may provide text and the system may identify similar articles. In this case, the system may feed the text into the machine learning model which determines a vector representation. The system may then find one or more articles within a minimum threshold distance (e.g., cosine distance) of articles stored by the system.

The user may also request more articles like a selected article. In this example, the system may use a term frequency-inverse document frequency (tf-idf) based scoring algorithm to identify and score articles which have a lexical similarity to a selected article or text (e.g., selected or provided text).

Optionally, the user may request articles related to a particular article. In this example, the system may identify articles which have a relation to the particular article. For example, an article which refers to another article may have a relation. In this example, the system may update the search results to present all articles which refer to this other article. As an example, a .pdf may be referred to in a SLACK message. In this example, if the .pdf is included in search results then the search results may be updated to present one or more other times in which the .pdf was referenced. For example, an email may have referenced this .pdf, and so on. As another example, an article was generated from a same content item may have a relationship. In this example, and as described above, the system may generate multiple articles based on a same obtained content item.

Below are example user interfaces. These user interface may be generated by an application associated with the article aggregation system 100. The user interfaces may additionally be obtained from a browser executing on a user device of a user. For example, a front-end interface may be accessed via a web application rendered by the browser.

Figure 9A:
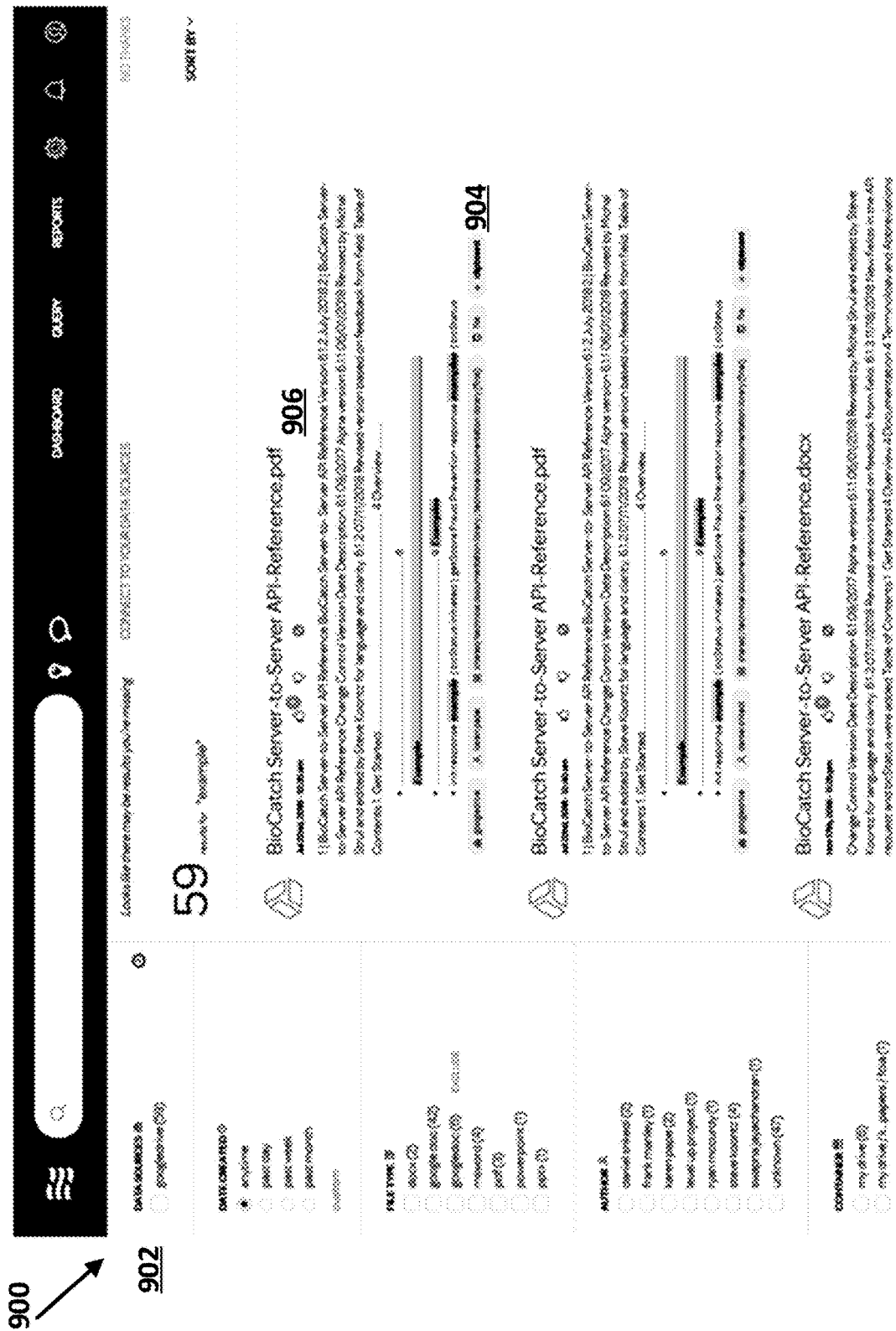
FIG. 9A is an example user interface for searching according to the techniques described herein.

FIG. 9A is an example user interface 900 for searching according to the techniques described herein. In user interface 900, the user has provided a search query, 'example.' In response, the user interface 900 has updated to reflect search results (e.g., '59' search results). As illustrated, the search results are from a particular content provider (e.g., GOOGLEDRIVE) 902.

A toggle is included next to this particular content provider. For search results which are from multiple content providers, the user may advantageously toggle on and off certain of the content providers. Thus, they may exclude search results which are from content providers toggled off by the user. For each search result, the user interface 900 includes additional information 904. For example, the additional information 904 indicates a content provider, an author, a file path, a type of the article (e.g., file), and so on.

Figure 9B:
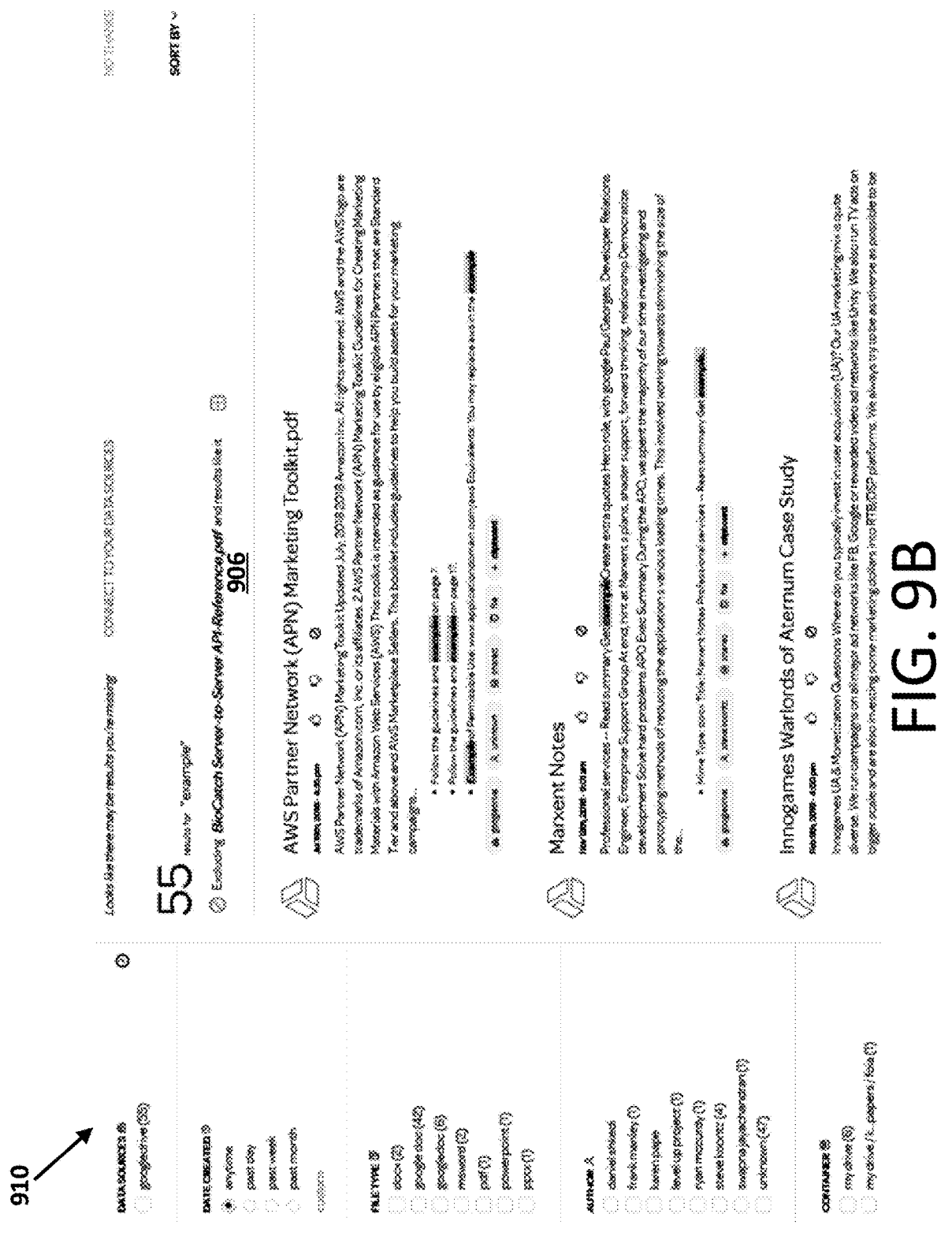

FIG. 9B is an example user interface 910 in which certain search results are excluded. In this example, the user of user interface 910 has indicated that one of the search results 906 is to be excluded. In response, the user interface 910 has updated to remove search results similar to this article 906. For example, the system may use machine learning techniques to exclude articles similar to that of article 906.

Figure 9C:
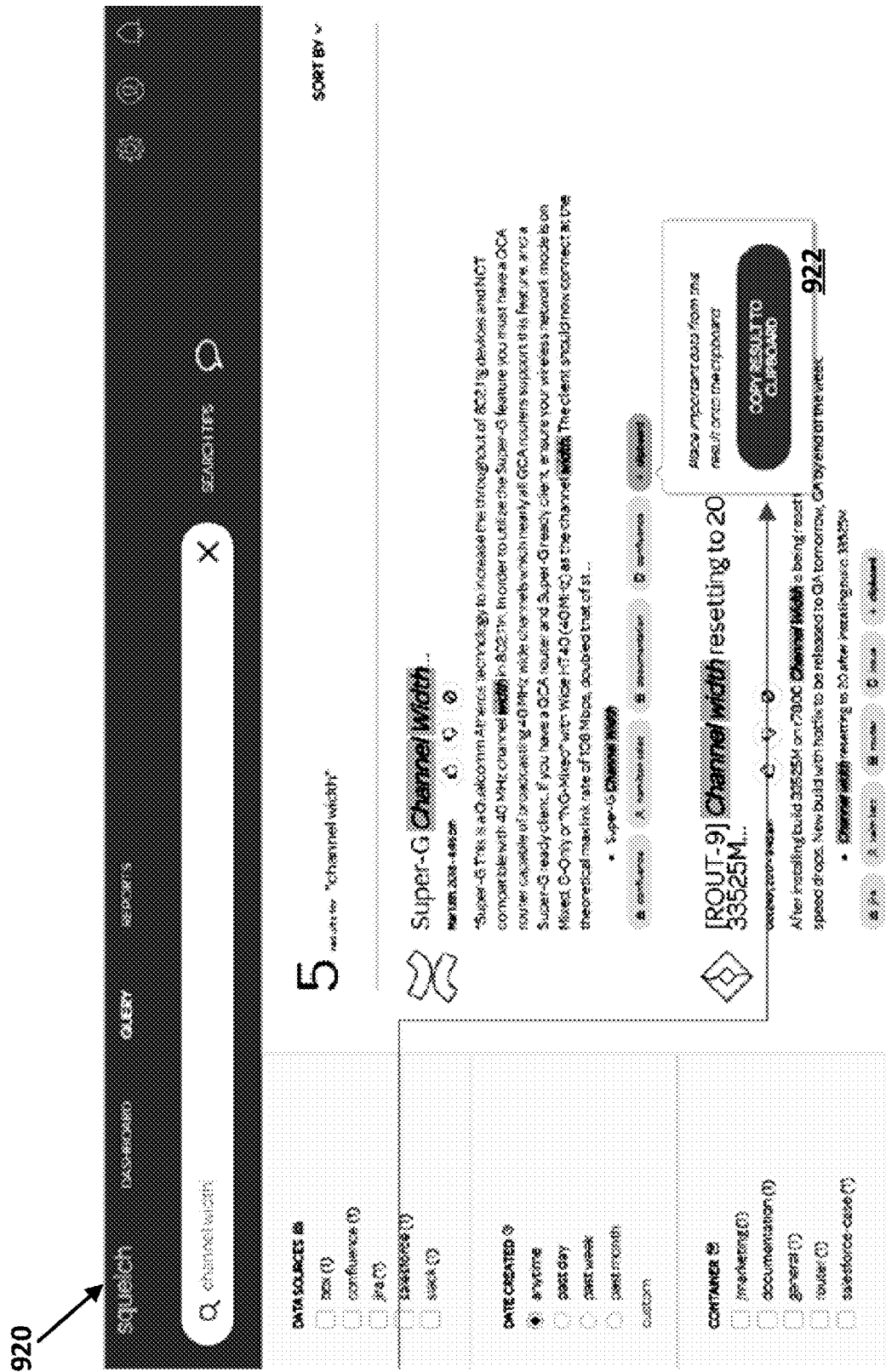
FIG. 9C is an example user interface in which a search result is copied.

FIG. 9C is an example user interface 920 in which a search result is copied. The article aggregation system 100 may allow for search results to be copied. For example, a user may click object 922 to copy not just the text of the result, but a URL to the native document it came from, as well as URL to get back to this exact result in the application used by a user of the user interface 920.

Figure 9D:
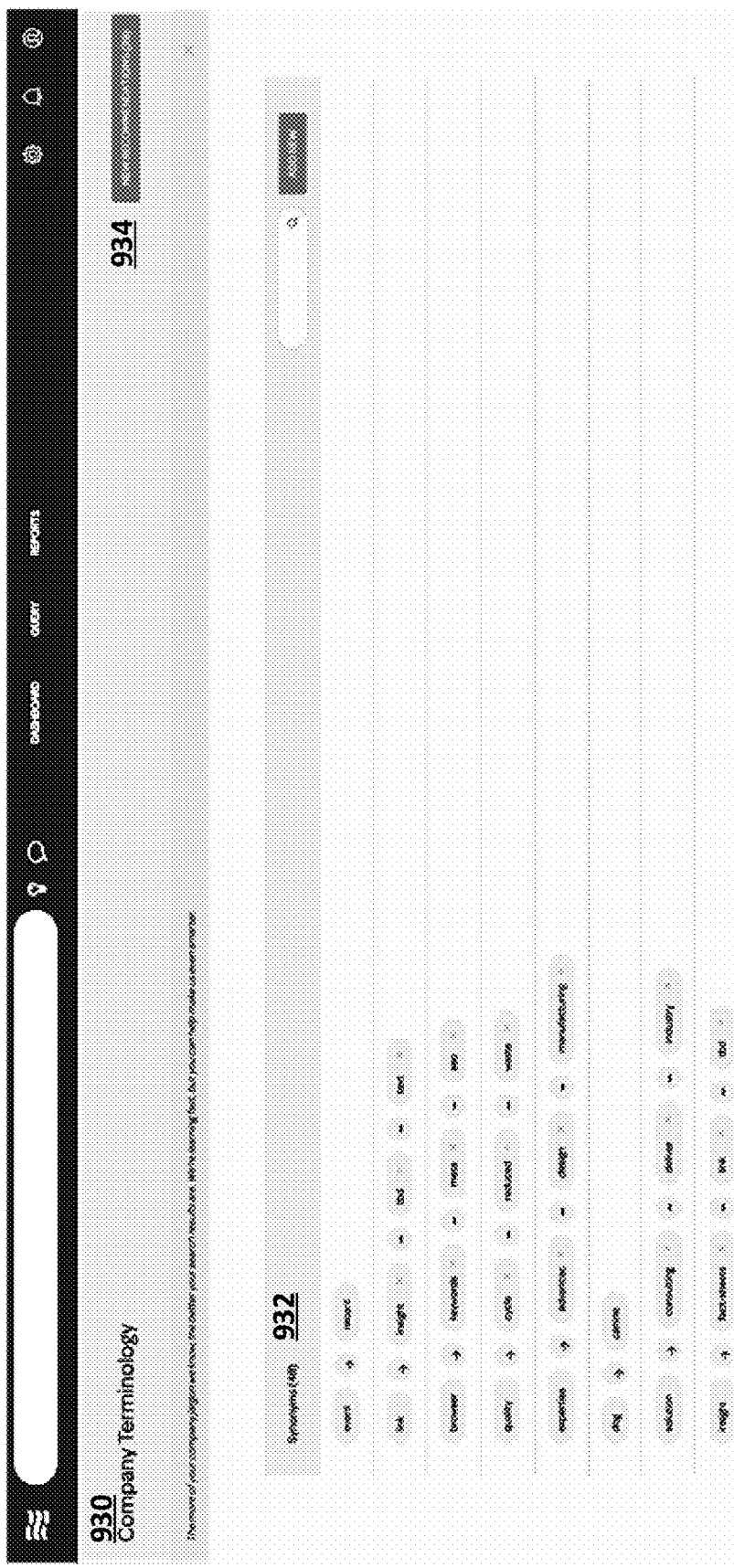
FIG. 9D is an example user interface for defining custom terminology.

FIG. 9D is an example user interface 930 for defining custom terminology. Example custom terminology may relate to specific products, services, and so on, of a particular tenant. Additionally, the custom terminology may define relationships between terms. These terms may be used when performing searches. In the example, an arrow is illustrated. This arrow may indicate that if a term on the left is used, then terms on the right may also be used (e.g., but not vice-versa). An equal mark is also illustrated, this indicates a two-way synonym such that terms are on the left may be used in place of terms on the right (e.g., and vice-versa). In user interface 930, an option to view recommendations 934 is included.

Figure 9E:
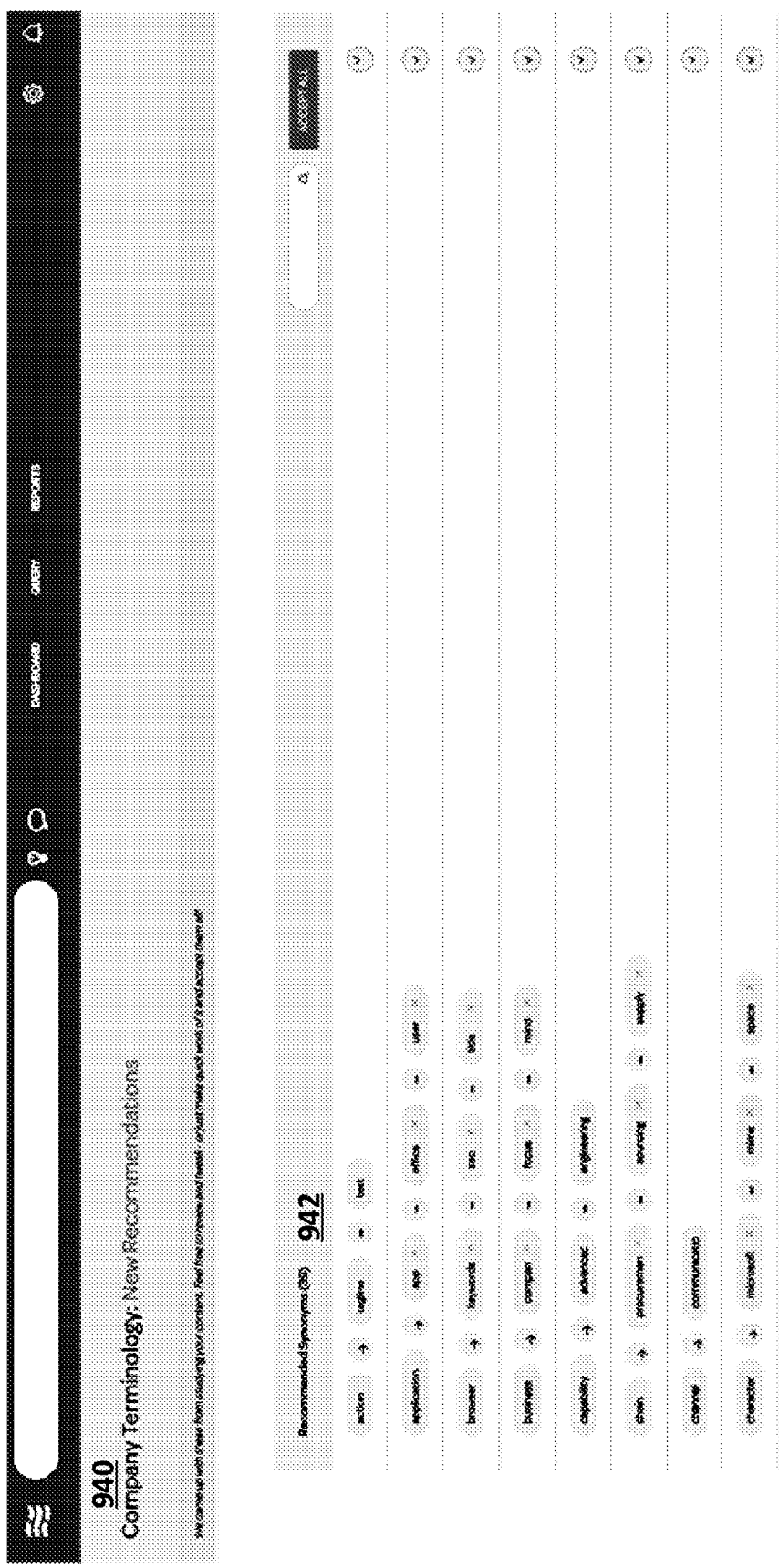
FIG. 9E is an example user interface presenting recommendations regarding custom terminology.

FIG. 9E is an example user interface 940 presenting recommendations regarding custom terminology. In this user interface, the article aggregation system 100 may present recommendations regarding relationships between terms. For example, the system may determine that certain terms are used interchangeably in articles. As another example, the system may determine that when users perform searches, they frequently view these terms interchangeably.

Figure 10A:
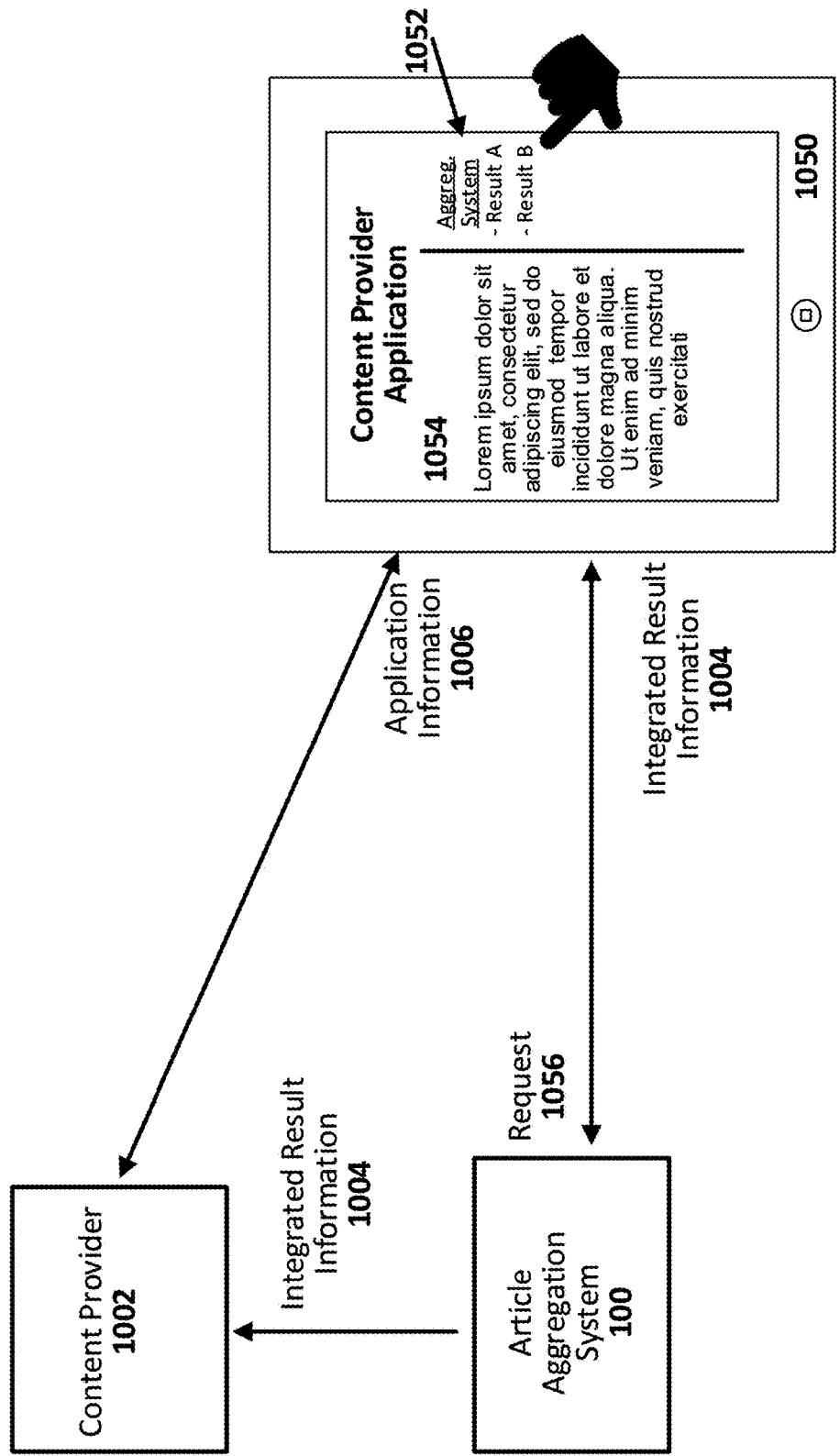
FIG. 10A is an example block diagram illustrating integration with the article aggregation system.

FIG. 10A is an example block diagram illustrating integration with the article aggregation system 100. In this example, the techniques described herein may be used inside existent applications associated with content providers. For example, a user is using a user device 1050 to present an application associated with a content provider. The application may represent a mobile or desktop application. The application may also be a web application. As illustrated, the content provider 1002 may provide application information 1106 to the user device. For example, the application information may reflect web-based information which the content provider may ordinarily provide to front-end interfaces of its application. The application may additionally include an add-on or module associated with the system 100.

As illustrated, the application includes a first portion 1054 associated with using the content provider. For example, if the content provider is associated with a team communication tool, then the first portion may reflect communications. The application further includes a second portion 1052 associated with the system 100.

In this second portion, the user may specify a search query. The search query may trigger a search request 1056 to the article aggregation system 100. The system may then determine result information 1004 for inclusion in the content provider's application. In some embodiments, the content provider 1002 may receive the result information 1004. For example, if the application is a web application then the content provider may route the results to the user device 1050. In some embodiments, the article aggregation system 100 may provide the result information 1004 to the module or add-in included in the application.

In some embodiments, the second portion 1052 may identify information which is specified in, or presented in, the first portion 1054. For example, if the user types a search query into the first portion 1054 to cause searching of the content provider 1002, the second portion 1052 may automatically copy the search query. The system 100 may then separately perform an aggregated search according to the techniques described herein.

Figure 10B:
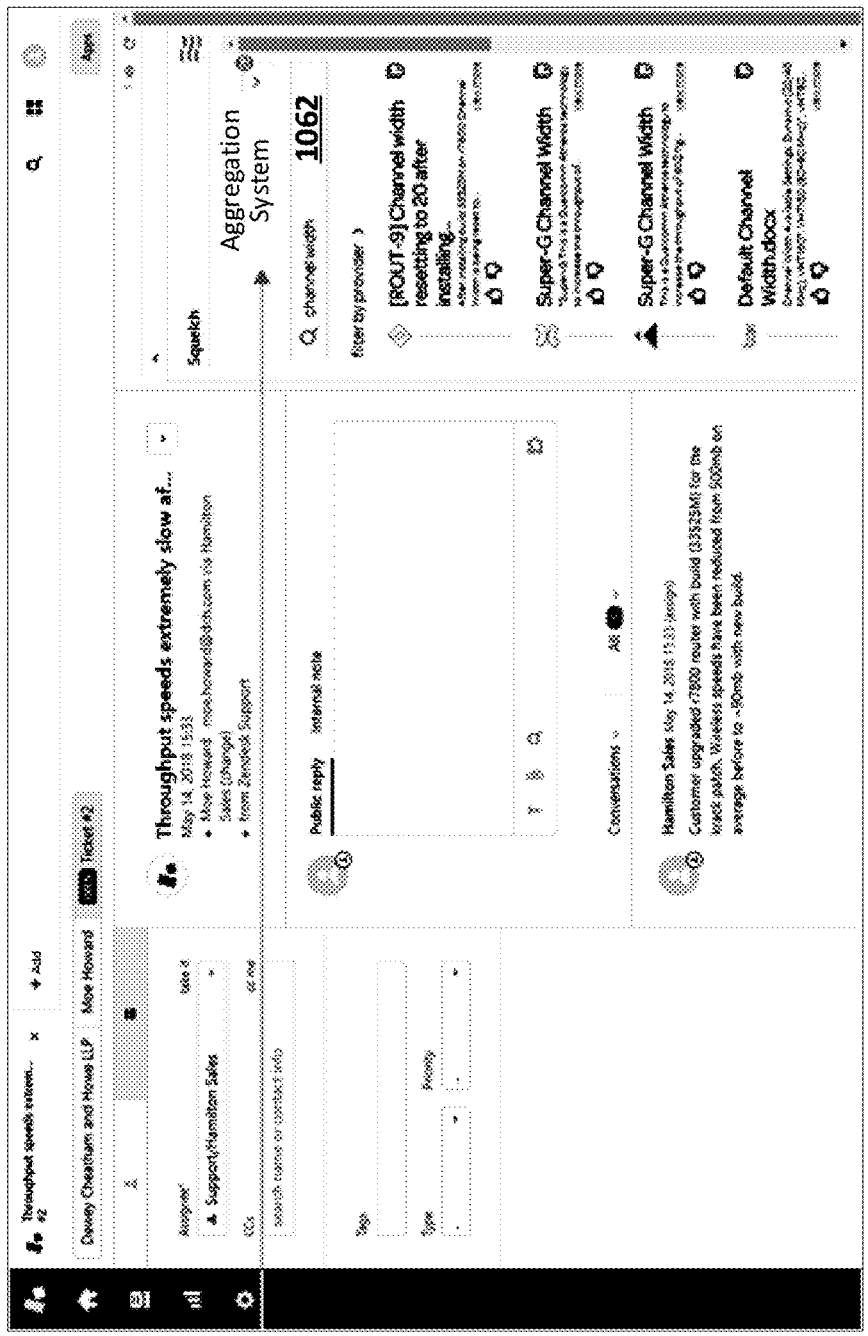
FIG. 10B is an example user interface of a content provider application with an integration to the article aggregation system.
Figure 10B:
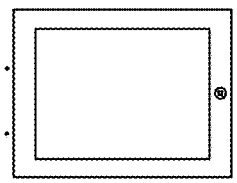

FIG. 10B is an example user interface 1060 of a content provider application with an integration to the article aggregation system. In the example of user interface 1060, the article aggregation system 100 has caused presentation of search results associate with a specified search query 1062 (e.g., 'channel width').

Figure 11A:
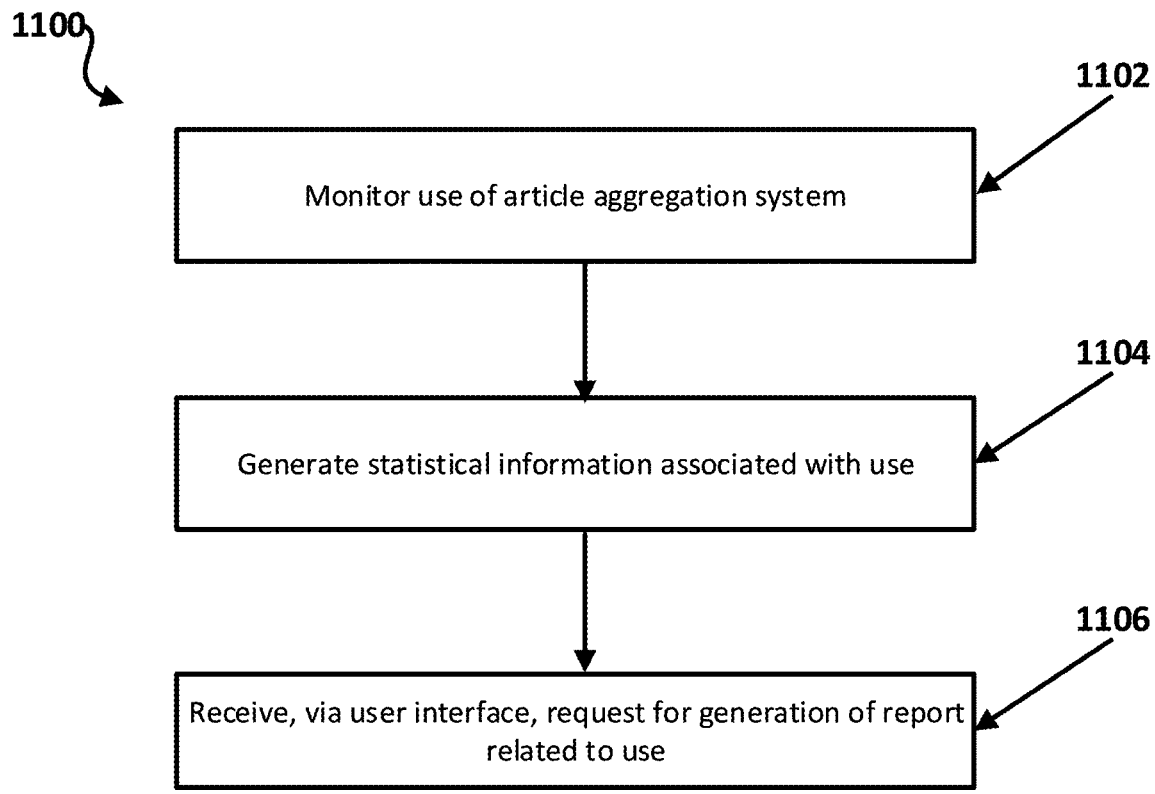
FIG. 11A is a flowchart of an example process for generating reports.

FIG. 11A is a flowchart of an example process 1100 for generating reports. For convenience, the process 1100 will be described as being performed by a system of one or more computers (e.g., the article aggregation system 1100).

At block 1102, the system monitors use of the system. For example, the system may monitor a number of search queries which are provided by users of a same tenant. The system may also monitor a number of content items, articles, and so on.

At block 1104, the system generates statistical information associated with the user. The system may determine averages associated with use. For example, if users are commonly selecting search results which are from a particular content provider the system may record this. As another example, the system may identify an average number of users who are using the system at a given time. Additional examples are illustrated in FIG. 11B.

At block 1106, the system generates one or more reports. As illustrated in FIGS. 12A-12E, the system may generate varying reports regarding use of the system.

Figure 11B:
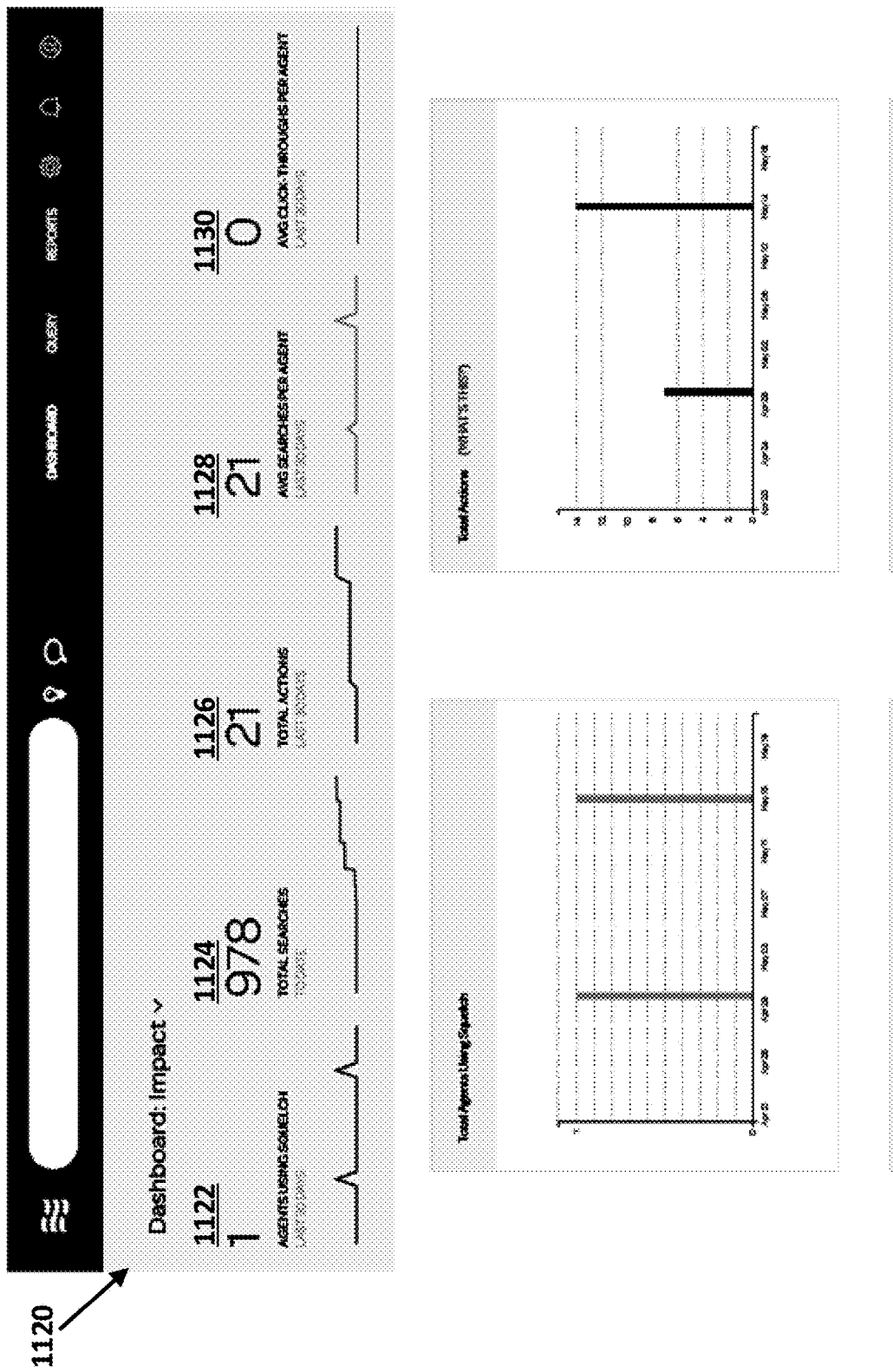
FIG. 11B is an example user interface of summary information associated with use of the article aggregation system.

FIG. 11B is an example user interface 1120 of summary information associated with use of the article aggregation system. As illustrated, the summary information may reflect a number of users presently using the system 1122. The system may present a total number of searches 1124. The system may also present a total number of actions performed via a front-end interface associated with the system 1126. The system may also present average searches per user 1128. The system may also present average click-throughs per user 1130. This information may optionally be reflected in graphical form, as illustrated in FIG. 11B.

FIGS. 12A-12F are example user interfaces illustrating example reports. FIG. 12 illustrates a user interface 1200 from which different reports may be selected. For example, report 1202 identifies the top search terms. Report 1204 identifies most used content providers. Report 1206 identifies user activity. Report 1208 identifies searches and click-throughs. Report 1210 identifies visibility. Report 1212 identifies a dashboard.

Figure 12A:
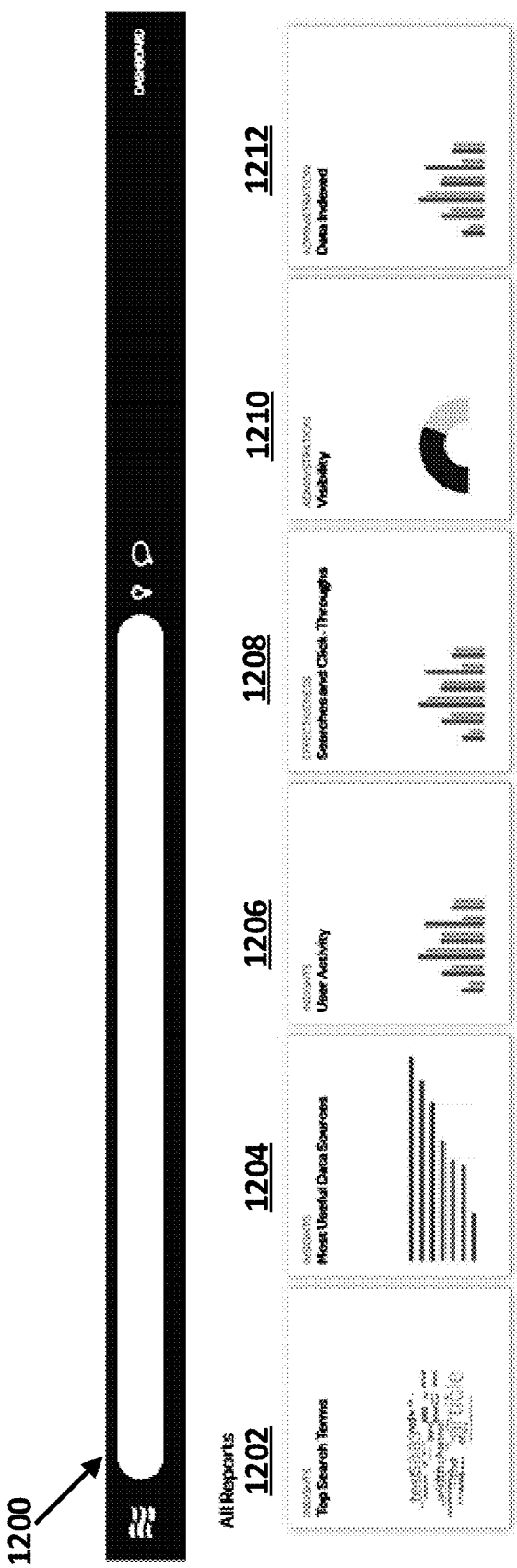
FIGS. 12A-12F are example user interfaces illustrating example reports.
Figure 12B:
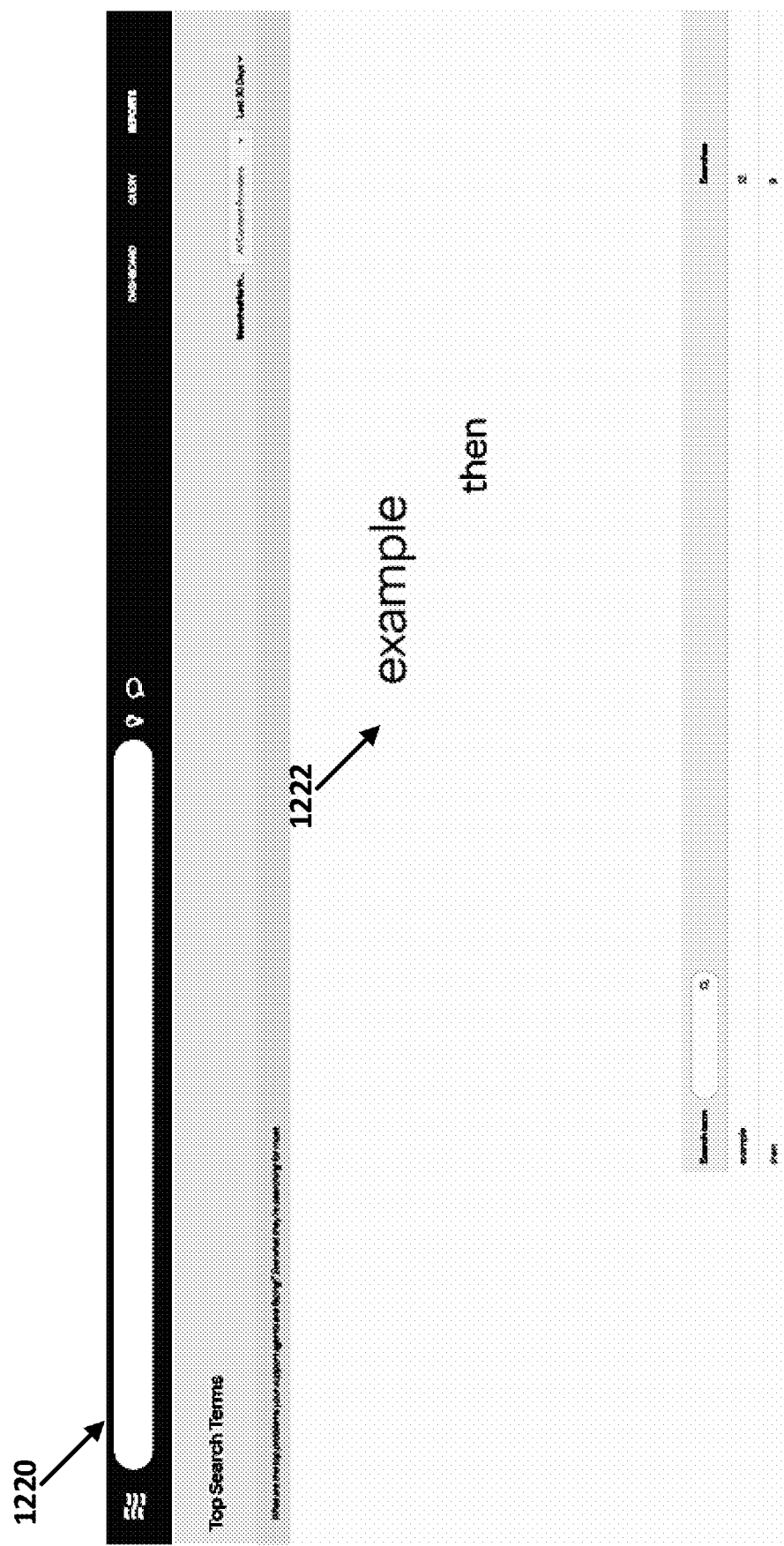
Figure 12C:
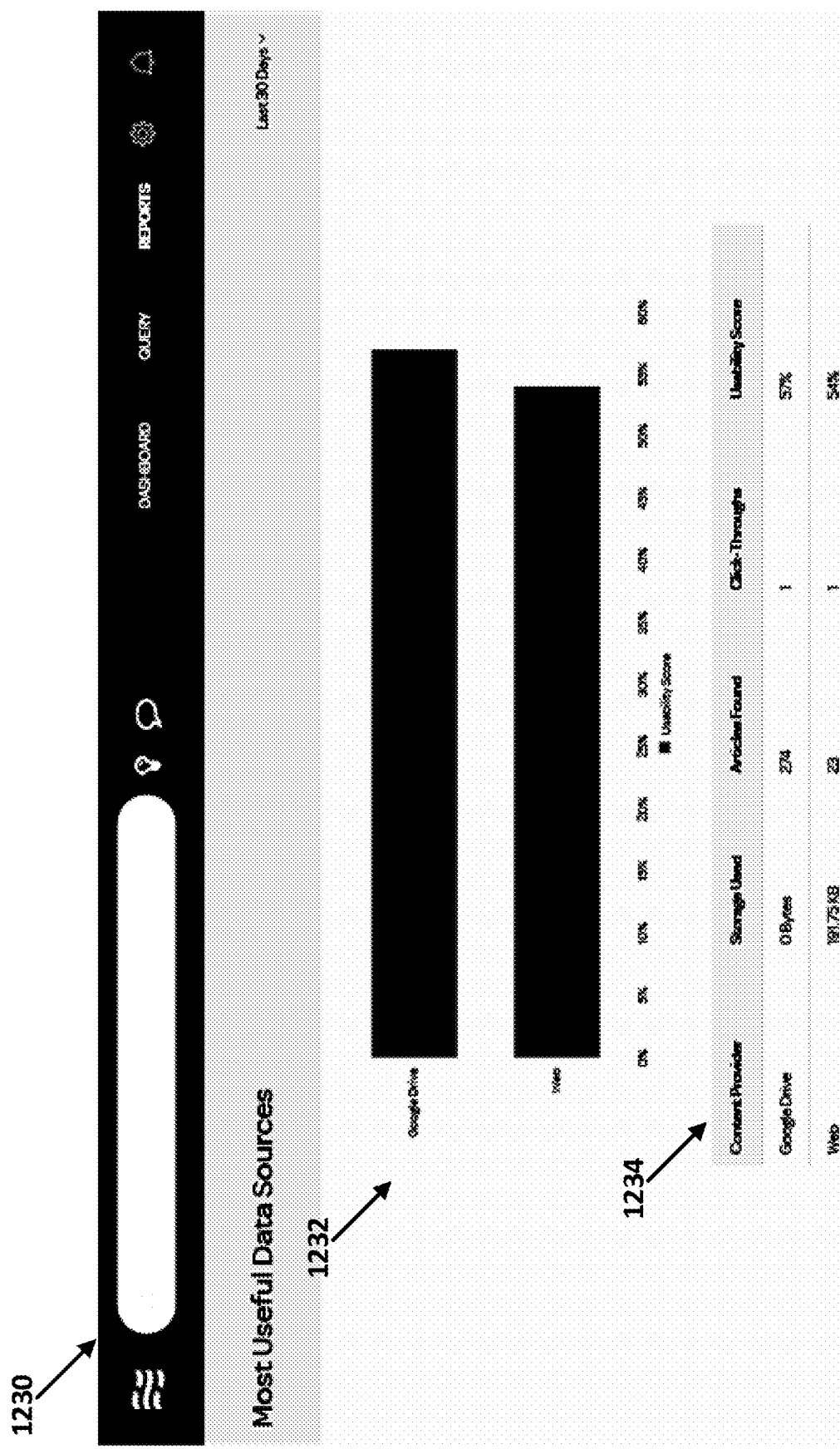
Figure 12D:
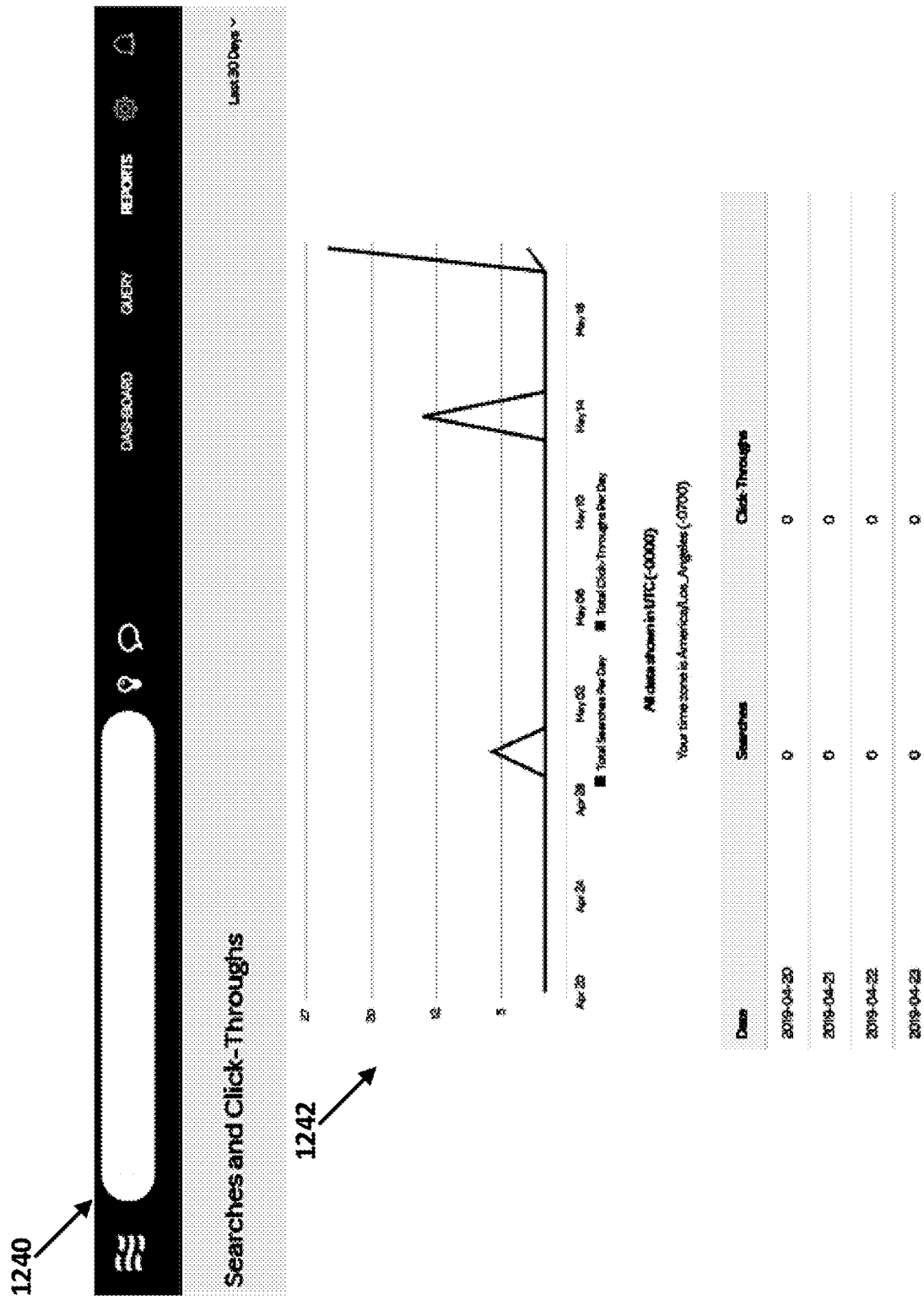

For example, FIG. 12B is a user interface 1220 illustrating top search terms 1222. FIG. 12C is a user interface 1230 illustrating most used data sources. For example, a chart 1232 is included which identifies usability. Additionally, detailed information 1234 is included regarding use. FIG. 12D is a user interface 1240 illustrating click-throughs 1242 in graphical form. For example, total searches per day and total click-throughs per day are illustrated.

Figure 12E:
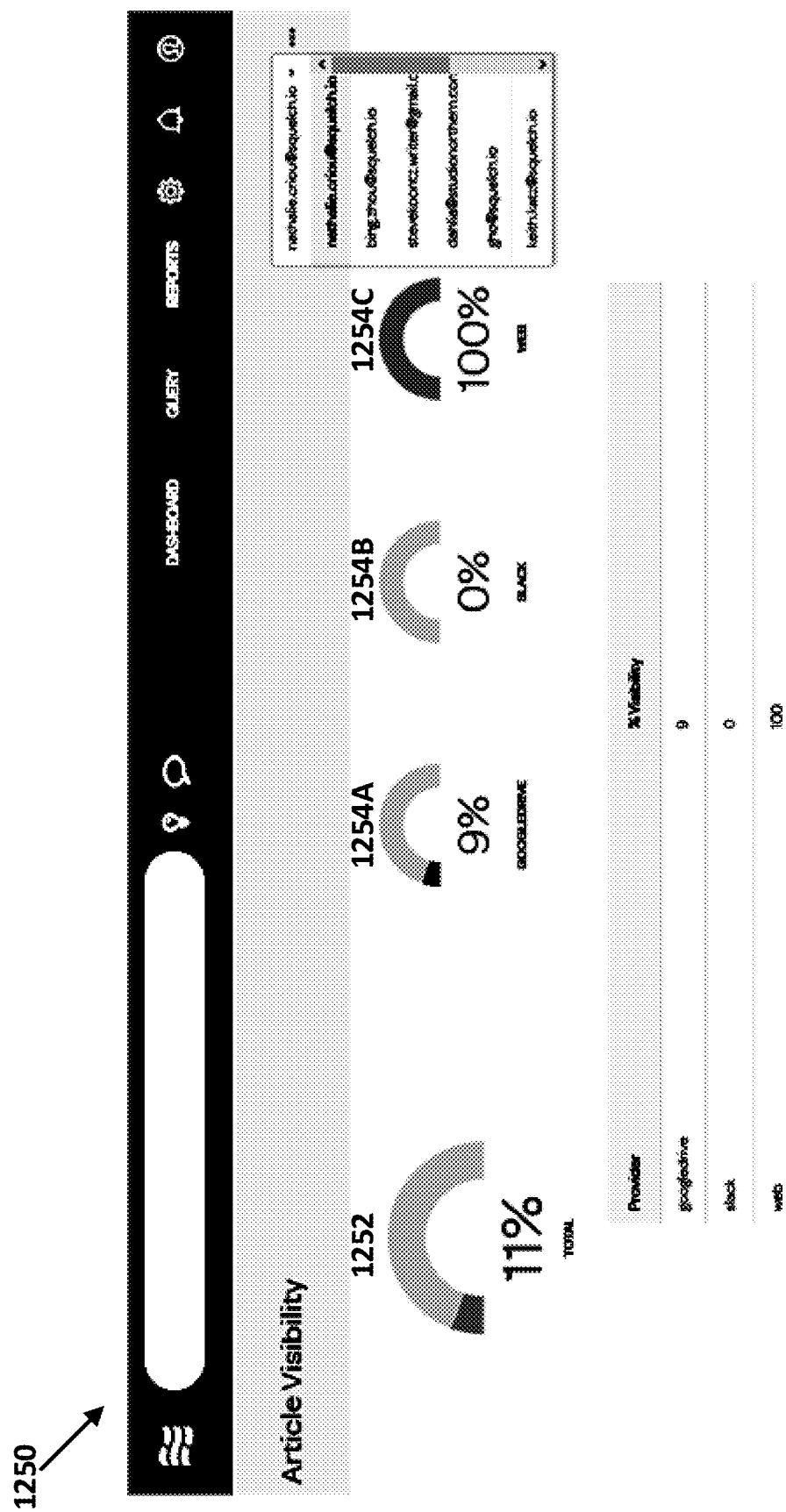
Figure 12F:
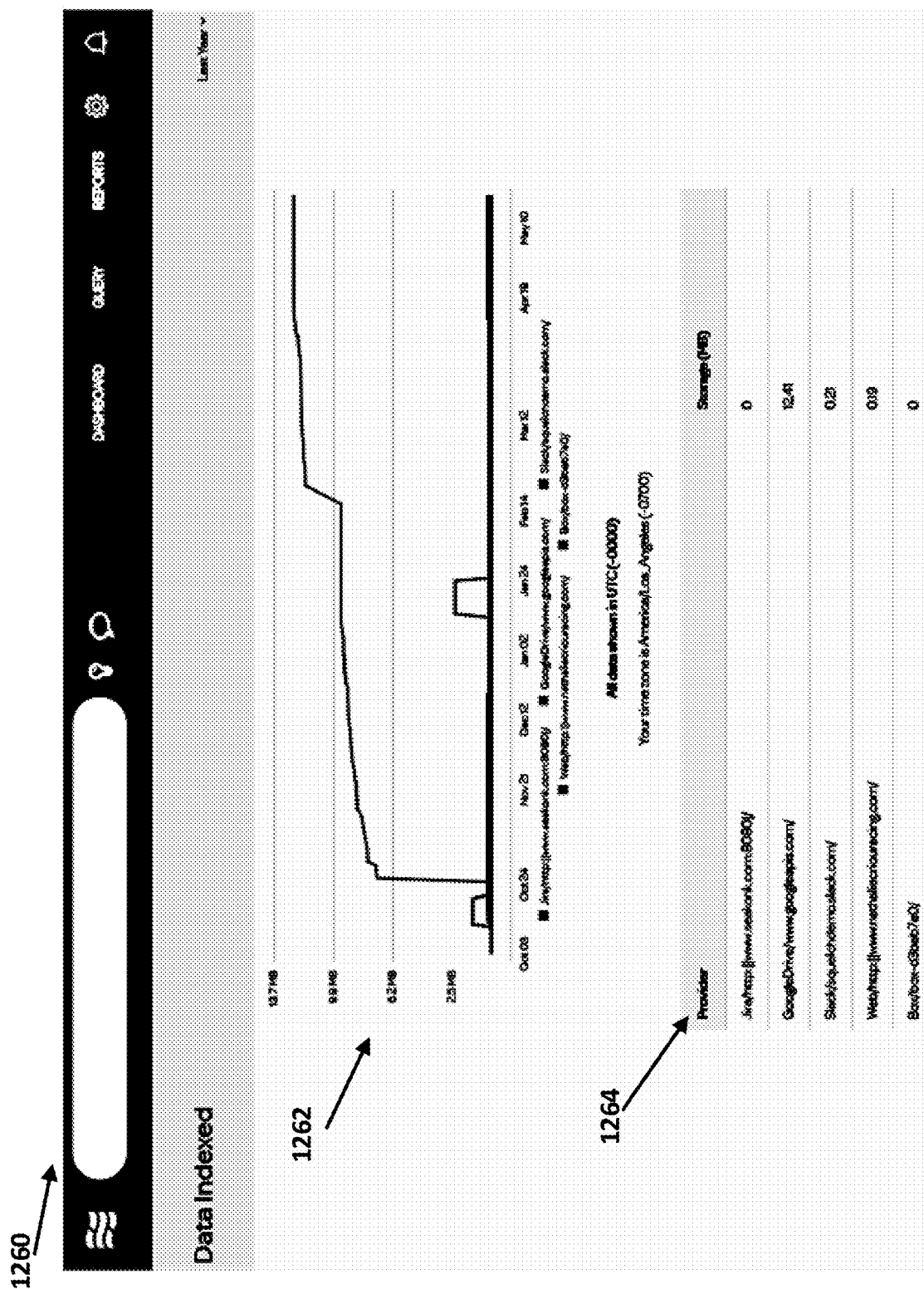

FIG. 12E is a user interface 1250 illustrating article visibility. As illustrated, the charts 1252 associated with visibility of articles from different content providers 1254A-1254C are illustrated. Visibility may indicate a percentage of the content which was surfaced in search results as compared to content stored by a content provider. FIG. 12F is a user interface 1260 illustrating content indexed by the article aggregation system. For example, a chart identifying content providers 1262 is included. Detailed information 1264 regarding indexing is included below.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system comprising:
a plurality of collectors, each collector assigned to one of a plurality of content providers, wherein the collectors obtain content items from the content providers based on authorization information associated with one or more users, wherein the collectors are configured to transform the content items into articles, and wherein an article represents a normalized form associated with a content item;
one or more computer systems and non-transitory computer storage media storing instructions that when executed by the computer systems, cause the computer systems to perform operations comprising:
obtaining, from the collectors, a plurality of articles and storing the articles in one or more databases;
assigning security identifiers to each of the articles, wherein a security identifier represents an abstraction of a discrete access right or permission associated with user access to an article;
generating respective indexing messages for enabling searching, wherein the indexing messages are included in a queue, and wherein each indexing message includes a reference to an article;
obtaining, by one or more ingestors, indexing messages, wherein for each indexing message, an ingestor is configured to obtain the associated article from the databases; and
indexing the articles referenced in the indexing messages, wherein the computing systems are configured to enable searching of the indexed articles, and wherein the search results comprise articles associated with two or more content providers.

2. The computing system of claim 1, wherein the computing systems are configured to receive a search query from a user, and wherein the operations comprise:
identifying security identifiers associated with the user, wherein the identified security identifiers are obtained based on access rights of user accounts of the user with respect to the plurality of content providers;
searching the index, wherein the identified security identifiers are used as a filter, such that articles included in the search results are assigned at least one of the identified security identifiers.

3. The computing system of claim 1, wherein each article is analyzed via machine learning techniques, and wherein searching the indexed articles uses information determined based on the machine learning techniques.

4. The computing system of claim 3, wherein the information determined based on the machine learning techniques comprises a vector representation of an article and/or one or more topics assigned to an article.

5. The computing system of claim 1, wherein each user is associated with a plurality of user accounts at the content providers.

6. The computing system of claim 1, wherein the indexing messages are included in a Kafka queue.

7. The computing system of claim 1, wherein the operations further comprise generating an article based on an obtained content item, and wherein generating an article comprises:
assigning one or more fields to information associated with the content item, the fields comprising one or more features extracted from the content item.

8. The computing system of claim 1, wherein the operations further comprise generating a plurality of articles based on an obtained content item.

9. The computing system of claim 8, wherein the content item is a document, and wherein the plurality of articles comprise a body portion, a title portion, or one or more comments included in the document.

10. The computing system of claim 8, wherein the content item is a communication between users, the communication comprising a plurality of messages, and wherein the each of the articles comprises respective messages which have been aggregated.

11. The computing system of claim 10, wherein aggregated messages are within a threshold time stamp of each other or are determined, by the computing system, to be directed to same, or similar, topics.

12. A method comprising:
obtaining content items, by a plurality of collectors, from content providers based on authorization information associated with one or more users, wherein the collectors are configured to transform the content items into articles, wherein an article represents a normalized form associated with a content item, and wherein each collector assigned to one of a plurality of content providers, wherein the collectors obtain content items;
obtaining, from the collectors, a plurality of articles and storing the articles in one or more databases;
assigning security identifiers to each of the articles, wherein a security identifier represents an abstraction of a discrete access right or permission associated with user access to an article;
generating respective indexing messages for enabling searching, wherein the indexing messages are included in a queue, and wherein each indexing message includes a reference to an article;
obtaining, by one or more ingestors, indexing messages, wherein for each indexing message an ingestor is configured to obtain the associated article from the databases; and
indexing the articles referenced in the indexing messages, wherein the computing systems are configured to enable searching of the indexed articles, and wherein the search results comprise articles associated with two or more content providers.

13. The method of claim 12, wherein a search query is received from a user, and wherein the method further comprises:
identifying security identifiers associated with the user, wherein the identified security identifiers are obtained based on access rights of user accounts of the user with respect to the plurality of content providers;
searching the index, wherein the identified security identifiers are used as a filter, such that articles included in the search results are assigned at least one of the identified security identifiers.

14. The method of claim 12, wherein each article is analyzed via machine learning techniques, wherein searching the indexed articles uses information determined based on the machine learning techniques, wherein the information determined based on the machine learning techniques comprises a vector representation of an article and/or one or more topics assigned to an article.

15. The method of claim 12 wherein the method further comprises generating an article based on an obtained content item, and wherein generating an article comprises:
   assigning one or more fields to information associated with the content item, the fields comprising one or more features extracted from the content item.

16. The method of claim 12, wherein the method further comprises generating a plurality of articles based on an obtained content item, wherein the content item is a document, wherein the plurality of articles comprise a body portion, a title portion, or one or more comments included in the document, wherein the content item is a communication between users, the communication comprising a plurality of messages, wherein each of the articles comprises respective messages which have been aggregated, wherein aggregated messages are within a threshold time stamp of each other or are determined, by the computing system, to be directed to same, or similar, topics.

17. Non-transitory computer storage media storing instructions that when executed by a system of one or more computers, cause the computers to perform operations comprising:
   obtaining content items, by a plurality of collectors, from content providers based on authorization information associated with one or more users, wherein the collectors are configured to transform the content items into articles, wherein an article represents a normalized form associated with a content item, and wherein each collector assigned to one of a plurality of content providers, wherein the collectors obtain content items;
   obtaining, from the collectors, a plurality of articles and storing the articles in one or more databases;
   assigning security identifiers to each of the articles, wherein a security identifier represents an abstraction of a discrete access right or permission associated with user access to an article;
   generating respective indexing messages for enabling searching, wherein the indexing messages are included in a queue, and wherein each indexing message includes a reference to an article;
   obtaining, by one or more ingestors, indexing messages, wherein for each indexing message an ingestor is configured to obtain the associated article from the databases; and
   indexing the articles referenced in the indexing messages, wherein the computing systems are configured to enable searching of the indexed articles, and wherein the search results comprise articles associated with two or more content providers.

18. The computer storage media of claim 17, wherein the computing systems are configured to perform a proof of identity and proof of access process during onboarding of each user.

19. The computer storage media of claim 17, wherein each collector implements a particular collection method associated with a content provider.

20. The computer storage media of claim 19, wherein the particular collection method comprises one or more of an enterprise method and a user method.

* * * * *